(12) United States Patent
Christoph et al.

(10) Patent No.: US 10,393,505 B2
(45) Date of Patent: Aug. 27, 2019

(54) DEVICE AND METHOD FOR MEASURING WORKPIECES

(71) Applicant: WERTH MESSTECHNIK GMBH, Giessen (DE)

(72) Inventors: Ralf Christoph, Giessen (DE); Ingomar Schmidt, Erfurt (DE); Benjamin Hopp, Giessen (DE); Sebastian Zoeller, Weilmuenster-Laubuseschbach (DE); Markus Hechler, Wetzlar-Garbenheim (DE); Stefan Gruenwald, Giessen (DE); Andreas Ettemeyer, Grabs (CH); Sabine Linz-Dittrich, Gamprin-Bendern (LI); Matthias Andraes, Florstadt (DE)

(73) Assignee: WERTH MESSTECHNIK GMBH, Giessen (DE)

( * ) Notice: Subject to any disclaimer, the term of this patent is extended or adjusted under 35 U.S.C. 154(b) by 451 days.

(21) Appl. No.: 15/102,033

(22) PCT Filed: Dec. 5, 2014

(86) PCT No.: PCT/EP2014/076713
§ 371 (c)(1),
(2) Date: Sep. 8, 2016

(87) PCT Pub. No.: WO2015/082683
PCT Pub. Date: Jun. 11, 2015

(65) Prior Publication Data
US 2016/0370172 A1    Dec. 22, 2016

(30) Foreign Application Priority Data

Dec. 6, 2013 (DE) .................. 10 2013 113 651
Jan. 31, 2014 (DE) .................. 10 2014 101 193

(Continued)

(51) Int. Cl.
*G01B 11/00* (2006.01)
*G01B 5/012* (2006.01)
*G01B 11/03* (2006.01)

(52) U.S. Cl.
CPC ............ *G01B 11/007* (2013.01); *G01B 5/012* (2013.01); *G01B 11/03* (2013.01)

(58) Field of Classification Search
CPC ...... G01B 11/007; G01B 15/00; G01B 11/03; G01B 11/005; G01B 15/04; G01B 11/24; G01B 11/245; G01B 5/0014

(Continued)

(56) References Cited

U.S. PATENT DOCUMENTS 5,665,896 A * 9/1997 McMurtry ........... G01B 21/042
73/1.75
5,669,150 A * 9/1997 Guertin ................ G01B 5/008
33/503

(Continued)

FOREIGN PATENT DOCUMENTS

CN     2032927 U     2/1989
CN     202031935 U   11/2011

(Continued)

OTHER PUBLICATIONS

International Search Report dated Jul. 10, 2015 for International Application No. PCT/EP2014/076713.

(Continued)

Primary Examiner — Yaritza Guadalupe-McCall
(74) Attorney, Agent, or Firm — Ladas & Parry LLP; Malcolm J. MacDonald

(57) ABSTRACT

The invention relates to a device and a method for tactile/optical measuring of geometric features and structures on a workpiece. In order to be able to precisely align the probe extension for performing precise measurements without (Continued)

Figure 1:
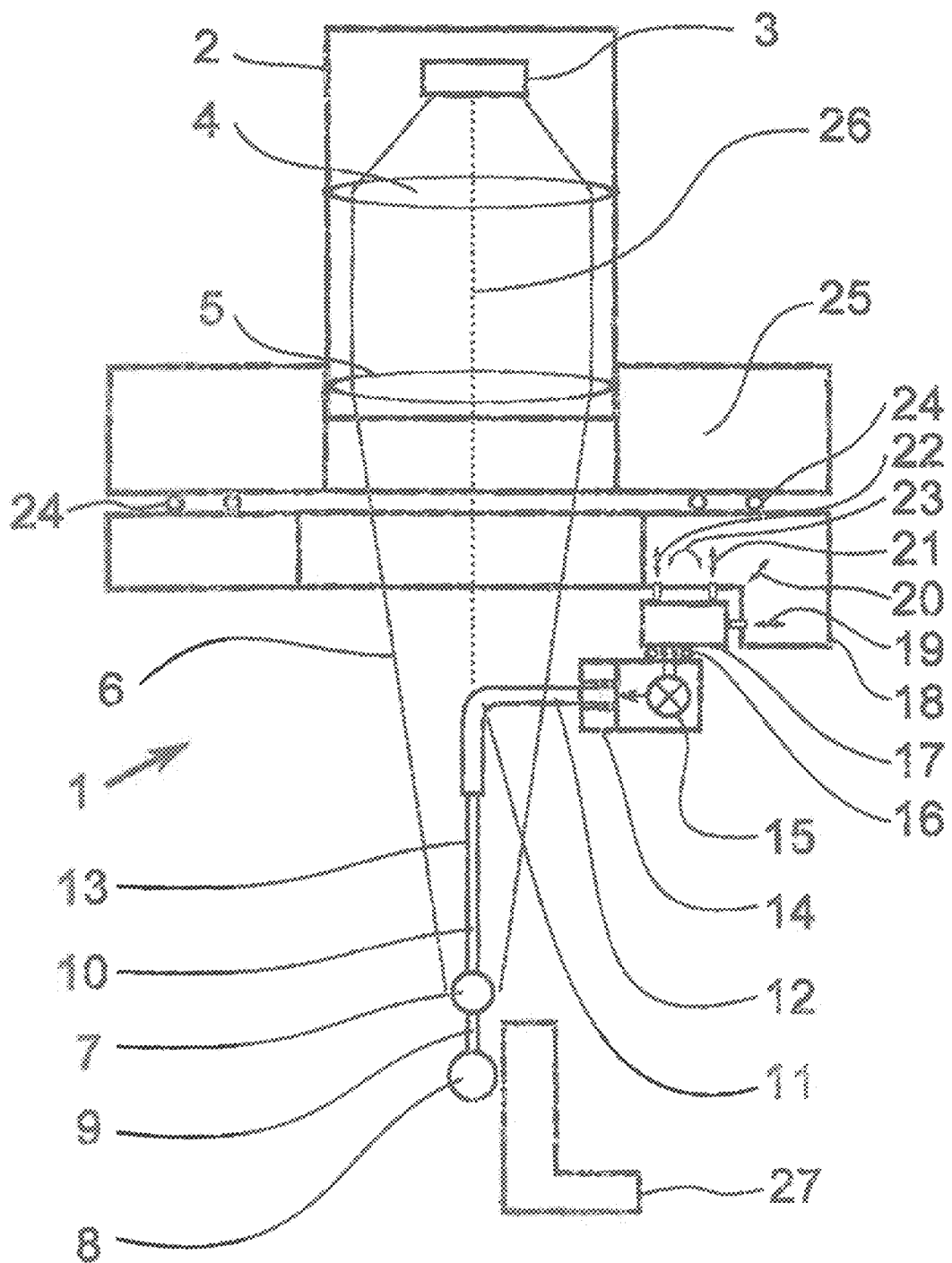

problems, a probe is proposed comprising a probe extension (13) having a flexurally elastic design at least in segments and having a mounting segment for mounting in a receptacle (14) comprising a mounting segment (60) implemented as a rotational lock.

38 Claims, 18 Drawing Sheets

(30) Foreign Application Priority Data

| | | | |
|---|---|---|---|
| Feb. 7, 2014 | (DE) | ......................... | 10 2014 101 537 |
| Apr. 2, 2014 | (DE) | ......................... | 10 2014 104 621 |
| Apr. 29, 2014 | (DE) | ......................... | 10 2014 106 022 |
| Aug. 5, 2014 | (DE) | ......................... | 10 2014 111 086 |
| Sep. 26, 2014 | (DE) | ......................... | 10 2014 114 027 |
| Oct. 30, 2014 | (DE) | ......................... | 10 2014 115 838 |

(58) Field of Classification Search
USPC .......................................................... 33/503
See application file for complete search history.

(56) References Cited

U.S. PATENT DOCUMENTS

| | | | | |
|---|---|---|---|---|
| 5,825,666 | A * | 10/1998 | Freifeld | G01B 11/005 702/153 |
| 6,240,651 | B1 * | 6/2001 | Schroeder | G01B 5/012 33/503 |
| 6,307,084 | B1 * | 10/2001 | Matsuki | G01B 7/012 33/503 |
| 6,441,910 | B1 | 8/2002 | Christoph | |
| 6,646,750 | B1 | 11/2003 | Christoph | |
| 6,651,351 | B1 * | 11/2003 | Christoph | G01B 11/007 33/503 |
| 6,665,080 | B1 | 12/2003 | Haertig et al. | |
| 7,227,647 | B2 * | 6/2007 | Ferger | G01B 5/285 250/433 |
| RE45,211 | E * | 10/2014 | McFarland | G01B 11/007 250/559.29 |
| 9,019,511 | B2 * | 4/2015 | Polidor | G01B 5/012 250/559.29 |
| 2001/0025427 | A1 * | 10/2001 | Lotze | G01B 21/045 33/559 |
| 2003/0098967 | A1 | 5/2003 | Christoph | |
| 2004/0264758 | A1 | 12/2004 | Christoph | |
| 2005/0000102 | A1 | 1/2005 | Christoph et al. | |
| 2005/0033184 | A1 | 2/2005 | Christoph | |
| 2005/0259271 | A1 | 11/2005 | Christoph | |
| 2012/0327221 | A1 * | 12/2012 | Christoph | G01B 5/016 348/135 |
| 2013/0222794 | A1 * | 8/2013 | Polidor | G01B 5/012 356/237.1 |
| 2016/0370172 | A1 * | 12/2016 | Christoph | G01B 5/012 |
| 2018/0106595 | A1 * | 4/2018 | Christoph | G01B 5/012 |

FOREIGN PATENT DOCUMENTS

| | | |
|---|---|---|
| DE | 198 24 107 A1 | 12/1999 |
| DE | 102 11 760 A1 | 10/2003 |
| DE | 103 41 666 A1 | 4/2005 |
| DE | 10 2004 022 314 A1 | 12/2005 |
| DE | 10 2004 058 655 A1 | 3/2006 |
| DE | 10 2010 060 833 A1 | 6/2011 |
| EP | 0 988 505 B1 | 3/2000 |
| EP | 1 157 313 B1 | 7/2003 |
| EP | 1 071 921 B1 | 8/2003 |
| EP | 1 082 581 B1 | 7/2004 |
| EP | 1 299 691 B1 | 12/2004 |
| EP | 1 319 164 B1 | 6/2007 |
| EP | 2 336 789 A1 | 6/2011 |
| WO | 98/57121 A1 | 12/1998 |
| WO | 02/25206 A1 | 3/2002 |
| WO | 2009/049834 A2 | 4/2009 |

OTHER PUBLICATIONS

Espacenet English abstract of DE 198 24 107 A1.
Espacenet English abstract of WO 2005/108916 A1 which is equivalent to DE 10 2004 022 314 A1.
Espacenet English abstract of DE 103 41 666 A1.
Espacenet English abstract of DE 10 2004 058 655 A1.
Ettemeyer, A, : "New three-dimensional fiber probe for multisensor coordinate measurement", Opt. Eng. 51(8), 081502 (May 14, 2012). ; http://dx.doi.org/10.1117/1.OE.51.8.081502.
Chinese Office Action, dated Sep. 7, 2018, corresponding to Application No. 201480075101.3.

* cited by examiner

DEVICE AND METHOD FOR MEASURING WORKPIECES

The invention relates to a device and a method for tactile/optical measuring of geometric features and structures on a workpiece. The invention further relates to a method for producing components of the tactile/optical sensor.

The invention relates to a probe for a tactile/optical sensor comprising a probe extension flexurally elastic at least in segments and having a mounting segment for inserting into a receptacle, the mounting segment being a segment of the probe extension or a segment of the mounting element receiving the probe extension.

Tactile/optical sensors are described in the following specifications of the applicant.

EP0988505 describes a method and a device wherein a probe element (first target mark) and optionally a further target mark emerge from a probe extension via a flexurally elastic shaft, the coordinates thereof when deflected being determined by means of an optical sensor.

A similar sensor is described in EP 1 071 921, wherein the contact force is adjusted by means of the rigidity of the flexurally elastic shaft, in that solely the bending length 1 is varied.

An opto-mechanical interface having an adjusting device for a corresponding sensor is described in EP 1 082 581.

DE 198 24 107 describes the use of a corresponding sensor for a surface profiling method.

A corresponding sensor is operated on a rotating or pivoting joint in DE 10 2004 022 314.

PCT/EP01/10826 describes coating a probe element or probe extension on the side facing away from the sensor in order to generate a luminous mark in the interior of the probe element by bundling the radiation reflected at the coating, said radiation being introduced into the interior of the shaft of the probe element or probe extension, the length thereof being measured, and a mark associated with the probe element and formed by a darkened region of the luminous shaft of the probe element.

DE 10 2010 060 833 describes a tactile/optical sensor wherein, in addition to determining the position of a contact shape element or at least a target mark associated therewith in the X and/or Y direction of the coordinate measuring machine using a first sensor such as an image processing sensor, a second sensor such as a distance sensor also determines the Z-direction, wherein at least one flexible connecting element is used for mounting the contact shape element and the target mark in a mounting element, said connecting element being penetrated by the beam path of the first sensor in the beam direction, wherein the at least one flexible connecting element is transparent and/or is severely defocused with respect to the first sensor. The distance sensor capturing the deflection in the Z direction (vertical direction) of the contact shape element or at least a target mark associated therewith is proposed to be, for example, an interferometer, particularly an absolutely measuring heterodyne interferometer.

Full reference is made to the disclosed contents of all previously named specifications of the applicant.

The fundamental object of the present invention is to retain the advantages of the prior art while simultaneously proposing a flexible, tactile/optical sensor for a plurality of different measurement tasks and a corresponding measurement method, wherein a desired alignment of the tactile/optical sensor shall particularly be made without trouble. The probe shall also be easily interchangeable in the receptacle or fiber receptacle thereof.

It is therefore particularly an object of the present invention to refine a probe of a tactile/optical sensor such that exact alignment can be made without trouble.

The object is achieved substantially according to the invention by a proposed probe for a tactile/optical sensor comprising a probe extension flexurally elastic at least in segments and having a mounting segment for inserting into a receptacle, the mounting segment being a segment of the probe extension or a segment of the mounting element receiving the probe extension, characterized in that the mounting segment is implemented as a rotational lock.

The invention is particularly characterized in that the mounting segment comprises an external geometry deviating from a circular geometry at least in regions in a plane running perpendicular to the longitudinal axis thereof.

The invention is further characterized in that the external geometry deviating from a circular geometry is formed by a flat area such as a planar segment of the mounting segment, by a protrusion protruding out of the mounting segment, by a cutout in the mounting segment, by a recess such as a groove running in the longitudinal direction of the segment, and/or by a polygonal design of the mounting segment.

A normal can preferably be associated with the external geometry deviating from a circular geometry, said normal running parallel or at an angle $\alpha$, where $\alpha \leq +/-5°$, to a region of the probe extension from which a contact shape element emerges.

According to the invention, the mounting element is preferably implemented as a hollow cylinder comprising an L-shaped geometry.

The invention is further characterized in that the probe extension, such as a fiber, is inserted into the interior of a hollow cylinder, at least in segments, wherein the hollow cylinder comprises a bend of 85° to 95°, preferably 90°, wherein preferably only non-drawn regions of the probe extension run within the hollow cylinder and preferably the probe extension and hollow cylinder are adhered to each other at the exit point of the probe extension out of the hollow cylinder facing toward the contact shape element.

The receptacle or fiber receptacle preferably comprises a contact surface for the mounting segment and adapted to the mounting segment, wherein the contact surface is preferably flat.

The invention particularly relates to a device for determining geometric features and structures on a workpiece by means of a tactile/optical sensor comprising at least a laterally measuring optical sensor, preferably an image processing sensor, preferably a vertically measuring optical distance sensor, and an at least partially flexurally elastic probe extension, at least the following emerging from the probe extension: a contact shape element for deflecting when contacting the workpiece, and preferably at least one target mark associated with the contact shape element for deflecting when the contact shape element contacts the workpiece, such that the lateral deflection of the contact shape element or of the target mark perpendicular to the optical axis of the laterally measuring optical sensor can be captured by means of the same, and the vertical deflection of the contact shape element or of the target mark along the optical axis of the laterally measuring optical sensor can be captured by means of the distance sensor.

At least some considerations of the objects are substantially achieved by a corresponding device, wherein a probe extension emerging from a fiber receptacle to which a flexurally elastic part is directly or indirectly connected is used, to which part the contact shape element and optionally the target mark is directly or indirectly connected, wherein the part of the probe extension running between the optional target mark, if present, and the contact shape element is flexurally rigid relative to the flexurally elastic part.

Here indirectly means that a flexurally rigid part is provided between the fiber receptacle and the flexurally elastic part, or that a flexurally rigid part is provided between the flexurally elastic part and the contact shape element.

Two types of the tactile/optical sensor are fundamentally differentiated. The first is a 2D sensor, wherein the deflection of the contact shape element or the target mark associated therewith is determined solely perpendicular to the optical axis of the laterally measuring optical sensor, preferably by means of image processing, and no vertical measurement of the deflection takes place and the corresponding vertically measuring distance sensor is not used or is not present. The contact shape element is typically a spherical or nearly spherical thickening on the end of the probe extension facing toward the workpiece. The optional target mark can be a further thickening above the contact shape element and is deflected together with the contact shape element. Only the contact shape element thereby makes contact with the workpiece.

Capturing the target mark is sensible whenever the contact shape element is inserted deep into an opening or next to an edge of the workpiece, for example more than about 1 to 5 millimeters, depending on the diameter of the contact shape element and the optics used, because in these cases shadowing can occur in the image of the contact shape element, whereby the accuracy of determining the deflection can be reduced. The target mark is preferably disposed so far above the contact shape element or inserted into the workpiece only so far that the target mark always remains above the surface of the workpiece, that is, is not inserted and thus is not shadowed. Here inserting means moving below a workpiece surface present directly adjacent to the contact shape element. Said surface itself can, for example, be present in a recess of the workpiece, wherein the probe extension has already been displaced within said recess. This does not cause a problem, however, because the edges of the recess are typically far enough away from the beam path of the laterally measuring sensor and thus do not shadow the same.

For the 2D sensor type, the probe extension is implemented as a fiber received by a fiber receptacle, that is, attached thereby, said receptacle in turn being mounted on the bottom side of the optic or an adjusting unit, for example by means of a magnetic changeout interface. Because the fiber receptacle should not influence the optical beam path, said receptacle is disposed laterally adjacent to the beam path. The end of the probe extension and optionally the region of the probe extension running between the contact shape element and the target mark run nearly parallel, in order to allow optimal capturing of the deflection, and as closely as possible to the optical axis of the optic associated with the laterally measuring optical sensor. The simplest solution for mounting in the fiber receptacle is redirecting the probe extension by about 90°, that is, providing a bend or kink point. After said redirection, the probe extension then runs to the fiber holder (fiber receptacle) approximately 90° to the optical axis The bend point and the region after the bend point, and the region running into the fiber holder (fiber receptacle) should preferably be flexurally rigid in comparison with the flexurally elastic part of the probe extension present above the contact shape element or optionally above the target mark. Said measure ensures that only those regions of the probe extension running along or parallel to the optical axis contribute to the elastic bending of the probe extension when contacting the workpiece and the resulting deflection, thereby resulting in a unique deflection behavior and particularly directionally independent contact forces in the lateral measurement plane. The increased rigidity of said regions can be produced, for example, in that the probe extension is enclosed by a rigid sleeve, for example a metal tube or the like, that is, said extension runs or is guided in the interior of a hollow cylinder. Alternatively, the probe extension can be implemented as a fiber having a greater diameter in said regions in comparison with the flexurally elastic segment.

The region between the target mark and the contact shape element is preferably flexurally rigid or more flexurally rigid than the flexurally elastic part, in order to transmit the deflection of the contact shape element during contact as fully as possible to the target mark. A high sensitivity of the deflection measurement is thereby ensured. Flexurally rigid implementation can be ensured, for example, in that the distance between the contact shape element and the target mark is small in comparison with the length of the flexurally elastic part, and even has preferably the same or approximately the same diameter. This has the advantage that a single fiber can be used for the probe extension, on which the contact shape element and the target mark are mounted, for example fused on or drawn out of the fiber. The flexurally elastic part can also be tapered by drawing, at least in segments, on the side of the target mark facing away from the contact shape element, while the region running between the contact shape element and the target mark is a separately produced segment having a constant or slightly tapering diameter, on which the contact shape element is fused, that is generated from the fiber itself by means of heat input, or a separate contact shape element is adhered, preferably under the influence of heat.

According to the invention, therefore, it can be provided that the probe extension comprises a flexurally rigid part, relative to the flexurally elastic part, at least in the region of the fiber receptacle, preferably in that the diameter of the probe extension is greater in comparison with the flexurally elastic part, or in that the probe extension runs through the interior of a hollow cylinder.

According to an embodiment of the invention, the probe extension runs at an angle of approximately 90°, particularly at an angle from 88° to 92° to the optical axis of the laterally measuring optical sensor in the region of the fiber receptacle, and the region having the contact shape element comprises a segment having a bend, wherein the segment is preferably flexurally rigid in design in comparison with the flexurally elastic part.

The second type provides a 3D sensor, wherein in addition to the lateral measurement of the deflection, the vertical deflection is also determined by means of a distance sensor.

Embodiments of this type are known, wherein the vertical deflection of the contact shape element itself is determined, such as is described by DE 10 2014 111 086.2, still unpublished at the time this application is submitted. The target mark described with respect to the 2D sensor type can also be captured by mans of the distance sensor when implemented correspondingly. A separate target mark is preferably used for the vertical deflection measurement, however, particularly preferably on the top side of the probe extension, as the side of the probe extension facing away from the workpiece and facing toward the optic. Said target mark can be the upper end of a fiber, for example, serving as a base body for the probe extension. Said upper end can be polished or coated or provided with a mirrored or partially mirrored plate in order to function as a reflector for the measurement beam of the distance sensor. The distance sensor uses the same front objective as the image processing sensor, therefore at least partially comprises a common beam path with the same. This is necessary in order to keep the size of the entire arrangement small and in order for the lateral and vertical deflection to be present in defined directions relative to each other.

Typical distance sensors are Foucault distance sensors, focus sensors, interferometric distance sensors, or chromatic or chromatic confocal distance sensors. The beam path of the distance sensor can run partially through the optic used for the laterally measuring sensor, particularly in the region facing toward the workpiece, that is, using the same front optic, or the distance sensor can have a dedicated beam path. The former can be implemented for Foucault distance sensors, focus sensors, and particularly chromatic confocal distance sensors, for example, such as is described in EP1299691 for Foucault distance sensors or in WO2009049834A2 for chromatic confocal distance sensors.

The distance sensor can also be a photogrammetric distance sensor.

For the 3D sensor type, contact forces in all three spatial directions should be independent of the direction, but at least the contact force in the vertical direction should be similar in comparison with that in the lateral directions. A flexural elasticity must therefore also be present in the vertical direction. This is preferably implemented in that the probe extension is mounted on a spring element such as a leaf spring or leaf spring arrangement extending perpendicular to the optical axis and dimensioned as appropriately thin in the direction of the optical axis and having a correspondingly low rigidity in the vertical direction. Said leaf spring arrangement thus serves as the fiber receptacle and comprises a corresponding chucking point for the probe extension. In order that the spring elements influence the optical imaging of the image processing sensor as little as possible, said elements are disposed outside of the focal plane of the beam path of the image processing sensor, thus above the contact shape element or optionally the target mark, and implemented alternatively or additionally transparent to the image processing sensor. Said elements thus appear out of focus in the image of the laterally measuring optical sensor, thus for example of the image processing sensor, and thus in practice merely limit the amount of light available for the analysis. The separate target mark for the distance sensor is mounted above the chucking point on the probe extension, whereby the measurement beam of the distance sensor is not influenced by the spring elements. The separate target mark is thereby also imaged only severely out of focus with respect to the image processing sensor. The spring elements emerge from a retaining element present outside of the beam path. Said element can have a stable ring structure, for example, attached to the bottom side of the optic or of an adjusting unit, for example by means of a magnetic changeout interface.

According to the invention, therefore, the fiber receptacle comprises at least one flexurally elastic element such as a leaf spring or leaf spring arrangement, wherein the flexurally elastic element

- emerges from a retaining element preferably disposed outside of the beam path of the laterally measuring optical sensor, and
- runs nearly perpendicular to the optical axis of the laterally measuring optical sensor, and
- comprises a clamping point for receiving the probe extension, and
- is preferably transparent and/or disposed out of focus relative to the beam path of the laterally measuring optical sensor.

The following embodiments apply equally to the 2D sensor and 3D sensor types.

Corresponding adjustment mechanisms are provided for adjusting the probe extension relative to the optical axis in both the translational and the rotational degrees of freedom. Said mechanisms can be manual or motorized means. The goal of the adjusting is to align the contact shape element or, if captured by the laterally measuring optical sensor, the target mark into the focal plane of the optic of the image processing sensor and along the optical axis, and setting the direction of the probe extension in the lower region facing toward the workpiece in a defined manner. Said direction is preferably set to an angle of 0°, that is, parallel to the optical axis, or a slight angle, for example 0°<Alpha<15°, preferably 0°<Alpha<5°, particularly preferably 0°<Alpha<1°. Standard measurements take place at 0° angle, while slight angles are particularly well suited for measurements wherein the probe extension is inserted into the workpiece a great distance along a wall or edge or where for other reasons shaft contact, that is, contact between the workpiece and the region of the probe extension above the contact shape element or the target mark, and therefore a false deflection can occur. A small angle of a few degrees can also be used for measuring the roughness of a workpiece surface. Depending on the location and orientation of the surface to be measured, particularly for vertically oriented surfaces on the workpiece, the direction of the angle must be set. To this end, various solutions according to the invention are available.

According to a first solution, the angle for the corresponding direction is set by means of adjusting means. This is very inconvenient when measuring surfaces of different orientations, however, as a new adjustment is needed every time. If different probe extensions are also planned in one measurement sequence, then the adjusting means may need to be set separately for each probe extension.

It can therefore also be provided that a changeout interface for mounting various probe extensions is provided on the adjusting means. Said changeout interface is implemented for changing out the fiber receptacle including the probe extension mounted therein. The changeout preferably takes place automatically and corresponding fiber receptacles are stored in a changeout magazine, for example. The changeout interface is preferably a magnetic interface. It is thereby possible, in the form of a second solution, to automatically change in probe extensions already having the corresponding angle without requiring another adjustment. To this end, the bend of the probe extension in the 2D sensor type already has a corresponding angle in the corresponding direction, or the clamping in the clamping point for the 3D sensor type is implemented correspondingly, that is, the probe extension is clamped at a corresponding angle. By means of the changeout interface, probe extensions having different lengths or equipped with contact shape elements of different thicknesses can be used automatically in a measurement sequence, thus providing very high flexibility.

According to a third solution, a changeout interface is provided for mounting the adjusting means and the fiber receptacle mounted thereon, or for mounting the fiber receptacle itself, if no adjusting means are used, or for mounting the mounting element used for the 3D sensor types on the laterally measuring optical sensor or a mount associated therewith, providing mounting at various angle positions about the optical axis. It is thereby possible to use to the same fiber in one automatic measurement sequence for differently oriented surfaces without any adjustment being necessary. The adjusting means can either be eliminated or must be set only once. The angle positions for mounting can be implemented in an arbitrary number of steps, but preferably four positions offset or rotated 90° from each other are preferably sufficient. For the case according to the invention that the light source for illuminating the contact shape element or the target mark is integrated in the fiber holder (fiber receptacle) for the embodiment as a 2D sensor and must be changed out or rotated along with the same, to which end corresponding electrical contacts for actuation must be present in the changeout interface, as few rotational positions as possible should be provided.

According to a particularly preferred solution, therefore, means are provided for adjusting the probe extension, particularly together with the fiber receptacle, relative to the laterally measuring optical sensor and comprise at least one manually driven or motorized translational or rotational adjusting mechanism, preferably that means are provided for adjusting at least two translational and at least two rotational degrees of freedom.

It is also preferable that the means for adjusting comprise a changeout interface, preferably a magnetic interface, for mounting interchangeable fiber receptacles.

In a further preferred embodiment of the invention, the region of the probe extension comprising the contact shape element is at an angle of $0°<\alpha<15°$ relative to the optical axis of the laterally measuring optical sensor, in that
  the bend of the probe extension is implemented between
    the region of the fiber receptacle and the region comprising the contact shape element, or
  the clamping point is implemented accordingly, or
  the means for adjusting can be set accordingly.

The idea is particularly emphasized that the means for adjusting comprise one, preferably additional changeout interfaces, preferably magnetic interfaces, for mounting on the laterally measuring optical sensor or a mount associated therewith, wherein the means for adjusting can be mounted in a plurality of positions, preferably four spaced 90° apart, rotationally offset about the optical axis of the laterally measuring optical sensor.

According to an alternative proposal, the mounting element comprises a changeout interface, preferably magnetic interface, for mounting on the laterally measuring optical sensor or a mount associated therewith, wherein the mounting element can be mounted in a plurality of positions, preferably four spaced 90° apart, rotationally offset about the optical axis of the laterally measuring optical sensor.

As further refinement of said idea, a device is provided wherein a light source such as an LED, SLED, laser diode, or the like is fixedly connected to the interchangeable fiber receptacle and the changeout interface for mounting the fiber receptacle comprises contacts for transmitting signals for actuating the light source.

Tactile/optical sensors according to the prior art are mounted on a rotary/tilting joint for measuring undercuts, particularly undercuts at any arbitrary orientation. This has the disadvantage that the accuracy of the measure is reduced due to inaccuracies in the rotary/tilting joint. In order to avoid said disadvantage, according to the invention, probe extensions protruding laterally or star-shaped or generally branching in a plurality of directions are provided, wherein a contact shape element is provided on each branch. The branching preferably takes place below a target mark, so that the same target mark can be used for determining the deflection of all contact shape elements.

It can therefore be provided according to the invention that the probe extension runs in a modified direction between the target mark and the contact shape element or comprises a preferably star-shaped branching to a plurality of contact shape elements.

In order to implement sensitive measuring by means of such laterally protruding contact shape elements, design measures must be taken such that the deflection of the contact shape element is transferred to a target mark or the target mark to a large degree, and does not lead to significant bending of the protruding region, that is, the region having a modified direction, or torsion of the probe extension, that is, rotation about the optical axis of the laterally measuring sensor, along which the part running about the target mark runs at least in part. To this end, it must be considered that the torque is transmitted to the target mark by means of the lever arm formed by the region of modified direction or branching as a function of the flexural rigidity thereof, thereby giving rise to the torsion of the probe extension. The greater the torsion, the less the proportion of deflection of the contact shape element transferred to the target mark for measuring, whereby the sensitivity is reduced and measurement accuracy decreases. In order to counteract said effect, the ratio between the distance between the contact shape element and the target mark perpendicular to the optical axis, that is, the length of the lever arm, and the flexural rigidity of the region of the modified direction and torsional rigidity of the region of the probe extension above the target mark is dimensioned as small as possible. The protruding region must therefore be implemented as rigid in itself, particularly flexurally rigid transverse to the potential contact forces. The least flexural rigidity occurs perpendicular to the protrusion, based on the type, thus in the direction running perpendicular to the modified direction and perpendicular to the optical axis, that is, perpendicular to the region in which the probe extension runs above the target mark. The protruding region can be implemented rigidly enough only in that said region is very short in design, such as only approximately 1 to 4 mm long. Typical diameters for the fiber present in the protruding region—as well as for the fiber present in the flexurally elastic part above the target mark—are generally in the range from 10 μm to approximately 300 μm. From said range, suitable ratios must then be found, so that a large proportion of the deflection is transferred to the target mark. To this end, the region of the probe extension running along the optical axis above the target mark must be implemented long enough to be flexurally elastic, but also short enough to remain torsionally rigid. As an example, for a fiber thickness of approximately 100 μm to 200 μm, preferably approximately 130 μm, and a typically glass material for the fiber, for a 1 mm to 2 mm, preferably 1.2 mm long protrusion, said requirement results in a fiber length above the target mark to the fiber mount of about 7 mm to 13 mm, preferably 10 mm. In a preferred embodiment, the transfer ratio between the deflection of the contact shape element and the deflection of the target, each in the direction perpendicular to the protrusion and to the optical axis, is approximately 1:0.83. Typical diameters for the contact shape element and the target mark are 200 μm to 300 μm, preferably 250 μm. The remaining deviation between the deflection of the contact shape element and the deflection of the target mark is corrected by calibrating said behavior, in that, for example, a so-called directionally dependent characteristic deflection curve is created.

In a further preferred embodiment of the invention, the torsional rigidity of the probe extension about the axis running along the optical axis of the image processing sensor is selected, by selecting the diameter and length thereof in the regions above the target mark and between the target mark and the contact shape element, to be great enough that the deflection of the contact shape element in the direction running perpendicular to the optical axis and perpendicular to the modified direction is transferred at least 50%, preferably at least 70%, particularly preferably at least 80% to the target mark.

The optic associated with the laterally measuring optical sensor and optionally also with the vertically measuring sensor is refined in order to increase the accuracy and/or flexibility thereof. For the lateral deflection measurement, a precise measurement requires that the imaging scale remains constant within vertical positions of the contact shape element or the target element resulting from the vertical deflections that occur. Otherwise the lateral deflection would be determined having a lateral offset depending on the vertical deflection, and therefore falsely. To this end, the optic is telecentric in design, for example in that a telecentric optic having a fixed imaging scale or a telecentric zoom stage of a zoom optic is used. Additionally or alternatively, it should be possible to set the accuracy for the lateral and/or vertical measurement or to adjust the imaging scale to the size of the contact shape element or target mark selected in each case, so that said elements can still be completely captured considering the maximum permissible lateral deflection and the measurement can take place at the maximum possible resolution and therefore accuracy. Said object is achieved according to the invention by using a zoom optic, wherein the various zoom stages should be available for the working distance required in each case due to different lengths of the probe extensions, in that preferably a zoom optic having a working distance adjustable independently of the imaging scale is used. If a zoom optic is also used for the distance sensor (for the 3D sensor type), then either a large measurement range or a high accuracy is possible for determining the vertical deflection.

It can therefore also be characteristic that a telecentric optic having a fixed imaging scale and/or a zoom optic having an adjustable working distance preferably independent of the imaging scale is used for the laterally measuring optical sensor and/or the vertically measuring optical distance sensor, wherein the zoom optic preferably comprises at least more than one zoom stage bringing about a telecentric image.

The idea is particularly emphasized that the laterally measuring sensor and the vertically measuring distance sensor at least partially have a common beam path, particularly in the region of the optic facing the workpiece, wherein the distance sensor is preferably a distance sensor using the Foucault principle or a focus sensor or a chromatic confocal sensor.

In order to increase the measurement range of the vertically measuring sensor, said sensor can be implemented as a Foucault distance sensor in a refined variant of the invention. According to the prior art, in a Foucault distance sensor the measurement beam is imaged in the direction of the workpiece after the Foucault knife-edge fills half the aperture of the optic. When the surface captured by the measurement beam is tilted and/or deflected, the reflected measurement beam is therefore partially shadowed by the optic, whereby the analyzed measurement beam is deformed and the analysis becomes less accurate, or the permissible range of deflection or tilting is limited. This is improved according to the invention in that the light source for the measurement beam is a lighting source filling only a limited region of the aperture of the optic, such as a severely collimated punctiform light source. A further increase in the measurement range is implemented according to the invention in that, in place of the differential diode arrangements typical in the prior art, a position-sensitive diode (PSD—position sensitive device) or a CCD or CMOS camera is used as the received and can detect a greater lateral deflection of the reflected measurement beam. Planar cameras or planar PSD can be used, as well as linear cameras or linear PSDs. In order to increase the scanning frequency for planar cameras, only an adjustably limited region, particularly a limited number of lines (line limitation), is read. The lines are thereby spaced apart from each other perpendicular to the direction of the deflection to be measured. The complete deflection can thereby take place even with line limitation. A gap limitation is advantageous, particularly for CMOS sensors, and is used if the expected deflections do not reach the edge of the camera chip.

The proposal is particularly emphasized that the vertically measuring optical distance sensor is a sensor using the Foucault principle, wherein a lighting source illuminates only a limited part of the aperture of the optic used for imaging on the workpiece, and/or wherein a linear or planar detection unit such as a position-sensitive diode (PSD) or camera is used for determining the location of the lighting reflected by the workpiece.

The invention further relates to a device, wherein the tactile/optical sensor is integrated in a coordinate measuring machine, preferably a multisensor coordinate measuring machine, together with other sensors, preferably tactile, optical, or computed-tomography sensors, preferably such that the laterally measuring optical sensor and the vertically measuring optical distance sensor can be operated independently of the tactile/optical sensor.

This means, for example, that the laterally measuring optical sensor and the vertically measuring optical distance sensor can be used alternatively for measuring the workpiece surface when the probe extension is set aside, that is, when the fiber receptacle, adjusting unit, or mount are set aside.

The invention further relates to a device for determining geometric features and structures on a workpiece by means of a tactile/optical sensor comprising at least a laterally measuring optical sensor, preferably an image processing sensor, preferably a vertically measuring optical distance sensor, and an at least partially flexurally elastic probe extension, at least the following emerging from the probe extension: a contact shape element for deflecting when contacting the workpiece, and preferably at least one target mark associated with the contact shape element for deflecting when the contact shape element contacts the workpiece such that the lateral deflection of the contact shape element or the target mark perpendicular to the optical axis of a laterally measuring optical sensor can be captured by means of the optical sensor, and preferably the vertical deflection of the contact shape element or of the target mark along or nearly along the optical axis of the laterally measuring optical sensor being able to be captured by means of the distance sensor, characterized in that the probe extension emerges from a fiber receptacle to which a flexurally elastic part is directly or indirectly connected is used, to which part the contact shape element or optionally the target mark is directly or indirectly connected, wherein the part of the probe extension running between the optional target mark, if present, and the contact shape element is flexurally rigid relative to the flexurally elastic part, and that means for adjusting the probe extension comprise a changeout interface for mounting interchangeable fiber receptacles.

The invention particularly relates to a device for determining geometric features and structures on a workpiece by means of a tactile/optical sensor comprising at least a laterally measuring optical sensor, preferably an image processing sensor, preferably a vertically measuring optical distance sensor, and an at least partially flexurally elastic probe extension, at least the following emerging from the probe extension: a contact shape element for deflecting when contacting the workpiece, and preferably at least one target mark associated with the contact shape element for deflecting when the contact shape element contacts the workpiece such that the lateral deflection of the contact shape element or the target mark perpendicular to the optical axis of a laterally measuring optical sensor can be captured by means of the optical sensor, and preferably the vertical deflection of the contact shape element or of the target mark along or nearly along the optical axis of the laterally measuring optical sensor being able to be captured by means of the distance sensor, characterized in that the probe extension emerges from a fiber receptacle to which a flexurally elastic part is directly or indirectly connected, to which part the contact shape element or optionally the target mark is directly or indirectly connected, wherein the part of the probe extension running between the optional target mark, if present, and the contact shape element is flexurally rigid relative to the flexurally elastic part, and that means are provided for adjusting the probe extension, particularly together with the fiber receptacle, relative to the laterally measuring optical sensor and comprise at least one manually operated or motorized translational or rotational adjusting mechanism, preferably that means for adjusting at least two translational and at least two rotational degrees of freedom are provided, that the means for adjusting comprise a changeout interface, preferably a magnetic interface, for mounting interchangeable fiber receptacles, and/or that the means for adjusting comprise one, preferably additional, changeout interface, preferably a magnetic interface, for mount on the laterally measuring optical sensor or a mount associated therewith, wherein the means for adjusting prefer can be mounted at a plurality of rotationally offset positions, preferably four spaced at 90°, about the optical axis of the laterally measuring optical sensor.

The invention further relates to a device for determining geometric features and structures on a workpiece by means of a tactile/optical sensor comprising at least a laterally measuring optical sensor, preferably an image processing sensor, preferably a vertically measuring optical distance sensor, and an at least partially flexurally elastic probe extension, at least the following emerging from the probe extension: a contact shape element for deflecting when contacting the workpiece, and preferably at least one target mark associated with the contact shape element for deflecting when the contact shape element (8) contacts the workpiece, such that the lateral deflection of the contact shape element or of the target mark perpendicular to the optical axis of the laterally measuring optical sensor can be captured by means of the same, and the vertical deflection of the contact shape element or of the target mark along the optical axis of the laterally measuring optical sensor can preferably be captured by means of the distance sensor, characterized in that the probe extension emerges from a fiber receptacle to which a flexurally elastic part is directly or indirectly connected, to which part the contact shape element or optionally the target mark is directly or indirectly connected, wherein the part of the probe extension running between the optional target mark, if present, and the contact shape element is flexurally rigid relative to the flexurally elastic part, and that the vertically measuring optical distance sensor is a sensor using the Foucault principle, wherein a lighting source illuminates only a limited part of the aperture of the optic used on the workpiece, and/or wherein a planar detection unit such as a position-sensitive diode (PSD) or camera is used for determining the location of the lighting reflected by the workpiece.

The invention further relates to a method for determining geometric features and structures on a workpiece using a probe of a tactile/optical sensor comprising a probe extension flexurally elastic at least in segments and having a mounting segment for inserting into a receptacle or fiber receptacle, the mounting segment being a segment of the probe extension or a segment of the mounting element receiving the probe extension, and characterized in that the mounting segment is implemented as a rotational lock.

In particular, according to the invention, the mounting segment has an external geometry deviating at least in segments from a circular geometry in the region thereof running in the receptacle in a plane running perpendicular to the longitudinal axis of the mounting segment, to which geometry the internal geometry of the receptacle is adapted.

The invention is further characterized in that the external geometry deviating from the circular geometry is formed by a flat area such as a planar segment of the mounting segment, by a protrusion protruding out of the mounting segment, by a cutout running in the mounting segment, by a recess such as a groove running in the longitudinal direction of the segment, and/or by a polygonal design of the mounting segment.

In particular, according to the idea having independent protection, the probe extension is implemented so that the probe extension comprises a partially planar flat area at least in the region of the fiber receptacle, preferably that the flat area is formed by an at least partially flattened external side of the hollow cylinder in which regions of the probe extension are inserted.

The object disassociated from the rest of the invention can thereby be achieved, that the probe extension is disposed at a defined location in the fiber receptacle. The advantage thereby arises that the direction of the region of the probe extension running parallel to or along the optical axis and comprising the contact shape element and optionally the target mark, is precisely determined, even if the probe extension is replaced with the same type of probe extension, for example due to wear.

The implementation of the flat area is preferably used for the "2D sensor" type. The flat area is particularly preferably formed on the region of the hollow cylinder inserted into the fiber receptacle, into which the probe extension is inserted, after the hollow cylinder has been bent by 90°. The fiber receptacle also comprises such a contact surface as a mating part. Alternative embodiments, wherein the probe extension or the hollow cylinder are cylindrical and the contact surface is implemented in the form of a V-groove, for example, have the disadvantage that the probe extension can be disposed at different rotational orientations in the V-groove.

In a particular embodiment of the invention, the fiber receptacle comprises a contact surface for the flattened region of the probe extension or the hollow cylinder, wherein the contact surface is preferably flat.

The normal direction of the flat area is preferably parallel to the direction of the region of the probe extension running parallel to or along the optical axis, and the hollow cylinder preferably has a bend of 90°.

The bending of the hollow cylinder or the probe extension is thus performed such that the bent part runs along the desired direction of the probe extension in the region of the contact shape element or target mark. This is achieved, for example, in that the flattened region is placed in a bending device on a contact surface having a defined orientation to the bending direction. The orientation of the flat area to the bend is thus set with reproducible accuracy.

An alternative embodiment of the bend of the hollow cylinder for special measurement tasks also provides for the bend to be made in the range from 85° to 95°.

The probe extension is particularly preferably adhered to the hollow cylinder at the exit thereof out of the hollow cylinder facing toward the contact shape element, in order to fix the probe extension in the hollow cylinder.

According to the invention, the probe extension runs within the interior of a hollow cylinder, at least in segments, wherein the hollow cylinder comprises a bend of 85° to 95°, preferably 90°, wherein preferably only non-drawn regions of the probe extension run within the hollow cylinder and preferably the probe extension and hollow cylinder are adhered to each other at the exit point of the probe extension out of the hollow cylinder facing toward the contact shape element.

A further advantage of the flat area is that the contact of the probe extension in the fiber receptacle defined thereby ensures that light source aligned toward the end of the probe extension facing away from the contact shape element and mounted in the fiber receptacle can couple light into the probe extension at a high coupling efficiency, even if the probe extension is changed out.

A flat area is synonymous with a geometric design bringing about a rotational lock.

The invention further relates to a method for determining geometric features and structures on a workpiece by means of a tactile/optical sensor comprising at least a laterally measuring optical sensor, preferably an image processing sensor, preferably a vertically measuring optical distance sensor, and an at least partially flexurally elastic probe extension, at least the following emerging from the probe extension: a contact shape element deflecting when contacting the workpiece, and preferably at least one target mark associated with the contact shape element and deflecting when the contact shape element contacts the workpiece, the lateral deflection of the contact shape element or of the target mark perpendicular to the optical axis of the laterally measuring optical sensor being captured by means of the same, and the vertical deflection of the contact shape element or of the target mark along the optical axis of the laterally measuring optical sensor being captured by means of the distance sensor.

At least some considerations of the objects are substantially achieved by a corresponding method, wherein a probe extension emerging from a fiber receptacle to which a flexurally elastic part is directly or indirectly connected is used, to which part the contact shape element or optionally the target mark is directly or indirectly connected, wherein the part of the probe extension running between the optional target mark, if present, and the contact shape element is flexurally rigid relative to the flexurally elastic part.

In order to be able to measure as flexibly as possible using adjustable point density, measurement speed, and accuracy, the invention proposes switching between single point measurements and various scanning methods. Different, correspondingly suitable probe extensions may be used for the different methods and are preferably automatically changed out.

In a first selectable operating mode for particularly high accuracies, the measurement points are recorded individually. To this end, the contact shape element is displaced toward the workpiece and deflected up to a predefined magnitude. The position of the sensor relative to the workpiece and the deflection are then determined and the measurement point is calculated and the contact is broken off. Alternatively, the position of the sensor and the deflection can be determined multiple times and/or even during the contacting process and a measurement point can be determined by averaging a plurality of value pairs.

According to a particularly preferred solution, according to the invention, a probe extension is changed in manually or automatically by means of which measurement points on the workpiece can each be determined in single-point mode, in that the following steps are performed:

the contact shape element and workpiece are displaced toward each other relative to each other until a predefined deflection of the contact shape element or the target mark has been achieved the contact shape element and workpiece are displaced relative to each other away from each other at least until the contact shape element or the target mark is no longer deflected the deflection of the contact shape element and/or the target mark is determined during the displacement toward each other and/or during the displacement away from each other and/or between the two displacements, one measurement point each is calculated from the one or more determined deflections and the location of the tactile/optical sensor relative to the workpiece in each case, preferably using the positions of the measurement axes of a coordinate measuring machine.

In a second selectable operating mode for particularly rapid recording of many measurement points on a track or in a region of the workpiece surface, various scanning methods are provided. General features of scanning are that after displacing toward the workpiece and deflecting the contact shape element to a specified value, a plurality of measurement points are recorded cyclically, wherein the contact shape element and the workpiece travel along a path relative to each other and remain in contact. Only after all planned measurement points have been recorded, that is, after the path has been travelled, is the contact broken off.

According to a particularly preferable alternative solution, according to the invention, a probe extension is changed in manually or automatically by means of which a plurality of measurement points, preferably offset from each other, on the workpiece can each be determined in scanning mode, in that the following steps are performed:

the contact shape element and workpiece are displaced toward each other relative to each other until a predefined deflection of the contact shape element or the target mark has been achieved the contact shape element and workpiece are displaced relative to each other along a path, wherein the contact shape element and the workpiece remain in contact, and wherein the deflection of the contact shape element and/or the target mark is determined cyclically during the displacement the contact shape element and workpiece are displaced relative to each other away from each other at least until the contact shape element or the target mark is no longer deflected the plurality of measurement points are calculated from the plurality of determined deflections and the location of the tactile/optical sensor relative to the workpiece in each case, preferably using the positions of the measurement axes of a coordinate measuring machine.

A plurality of methods are provided for defining the path along which the measurement points are recorded when scanning Methods wherein the deflection is controlled (controlled scanning) between a minimum and maximum value about a target value (target deflection) are differentiated from methods wherein no regulation takes place (uncontrolled scanning). Also differentiated are scanning on a specified path and scanning without a specification of the path. In the second case, the path is determined at least by defining a starting point and an ending point, wherein said method is usable in practice only for controlled scanning (with the exception of a workpiece surface having maximum deviations no greater than the permissible deflections along the direct line connecting the starting and ending points.)

When scanning along a specified path (target path), the relative motion between the sensor and workpiece on said target path is recorded, and in the uncontrolled case the deflections are recorded. Said uncontrolled scanning is used whenever the workpiece surface is known precisely enough in the context of the permissible deflections. Otherwise the permissible deflection would be exceeded. The deflection is monitored to this end and scanning is interrupted if necessary. The target path can thereby be arbitrarily located in space and all necessary axes of motion of the coordinate measuring machine are used for the relative motion between the workpiece and the tactile/optical sensor.

Alternatively, scanning takes place along a specified track as controlled scanning. The attempt is made to follow the target path and simultaneously regulate the specified deflection. This is preferably successful according to the invention if the target path is followed in the two coordinate directions defined by a so-called scanning plane and the deflection is controlled in the coordinate direction perpendicular thereto. The three coordinate directions are preferably parallel to the axis drives of the coordinate measuring machine used for executing the relative motion. Only one axis drive is thereby used for regulating the deflection and the other two axis drives are used for the motion on the target path. It is also provided, however, that regulating can occur in all three spatial directions, that is, that all axis drives are used for regulating. Because the motion along the path must be fundamentally tangential to the workpiece surface being contacted in each case, that is, perpendicular to the deflection in each case, in order to avoid losing contact with the workpiece surface, the regulating occurs perpendicular to the surface tangent, that is, in the direction of the deflection.

The target path is a spline, for example, defined by contours taken from a CAD model of the workpiece or previously measured contours on the workpiece, or basic geometric shapes such as the line, line segment, circle, segment of a circle, or segment of a helix.

It is therefore preferably provided that a target path such as a spline is defined for the path and is formed by one or more specified curves in space, wherein the curves are defined preferably based on previously measured points and/or a model such as a CAD model of the workpiece and/or from basic geometric shapes such as the line, line segment, circle, segment of a circle, or segment of a helix, and the path either corresponds to the target path (uncontrolled scanning) or follows the target path providing for the deflection of the contact shape element and/or the target mark, preferably in at least two coordinate directions defined by a scanning plane (controlled scanning).

When scanning without a specified target path, the path is defined in that at least one starting and one ending point are defined, between which the path is to run. It is further preferably provided that intermediate points through which the path runs are defined. The path to be traveled between the starting and ending points or the intermediate points is derived using the workpiece surface by controlling the deflection. In the general case, the control takes place in all three spatial direction, thus using all three axis drives. In order to avoid losing contact with the workpiece surface, the regulating occurs perpendicular to the surface tangent, that is, in the direction of the deflection, and the motion along the path is fundamentally tangential to the workpiece surface being contacted, that is, perpendicular to the deflection in each case, and in the direction of the path, that is, toward the ending point or the next intermediate point.

According to a particularly preferred solution, scanning without a specified path is successful if the path running between the starting and ending points is limited by specifying a scanning plane. This means that the path runs within said scanning plane. The deflection is preferably also controlled in the two spatial directions defining the scanning plane. In order to define the exact direction of the controlled motion and the direction of motion on the path, the direction of the deflection, preferably the direction of the deflection projected into the scanning plane, is first determined. Said direction is approximately perpendicular to the workpiece surface currently being contacted. The control therefore takes place subsequently in the direction of deflection, or of the deflection projected into the scanning plane, and the motion is perpendicular thereto, that is, along the corresponding surface tangent. The sense of direction of the motion is defined so that no motion in the opposite direction is suddenly introduced, that is, so that the smaller angle to the previous direction of motion is used.

In order to specify which direction the path should take when beginning from the starting point, it is preferably provided that a direction is specified, for example by indicating a directional point. The scanning motion then begins, as seen from the starting point, in the direct direction or in direction projected into the scanning plane toward the directional point. The definition of the scanning place can be made using the starting point or ending point in conjunction with a vector forming the normal vector to the scanning plane, for example.

Alternatively, a plane defined by two coordinate measuring machine axes and shifted to the starting point or the ending point can also be used as the scanning plane.

It can also be characteristic, therefore, that the path is defined by a starting point and an ending point, and preferably by one or more intermediate points, and preferably by a starting direction and/or a scanning plane, and that between the defined points the path is determined by providing for the deflection of the contact shape element and/or target mark (controlled scanning) by the location of the workpiece surface being contacted.

The idea is particularly emphasized that the deflection during the displacement on the path is controlled between a minimum and a maximum value about a target deflection by displacing corresponding coordinate measuring machine axes, wherein the control preferably takes place perpendicular to a scanning plane or in the two spatial directions within the scanning plane or in all three spatial directions.

It is preferably provided, when controlling in the two spatial directions within the scanning plane, that the control takes place in the direction of the deflection, preferably in the direction of the deflection projected into the scanning plane, and the displacement along the path within the scanning plane takes place perpendicular to the deflection projected into the scanning plane, wherein the sense of direction of the displacement is defined so as to form the smaller angle to the previous direction of displacement.

Special forms of scanning also exist, such as scanning while using a rotary axis. The rotation of the workpiece can thereby be understood as a further axis of motion of the coordinate measuring machine used for the relative motion between the tactile/optical sensor and the workpiece. The path can thereby be specified in the same way, thus comprises as a further coordinate an angle of rotation at each point on the path, or scanning is done without a specified path. Controlled and uncontrolled scanning are also possible. The considerations according to the invention about the scanning plane and the directions for control and motion can be applied to the use of the rotary axis. Rotary axis scanning is preferably used for rotationally symmetrical components such as shafts or tools, but also for crankshafts or the like. Contact thereby takes place perpendicular to the direction of the axis of rotation on the external circumference of the workpiece, that is, in a plane in which the axis of rotation also lies. The contact and control of the deflection preferably takes place in the lateral direction for the 2D sensor type, that is, perpendicular to the optical axis, and perpendicular to or along the optical axis for the 3D sensor type. The linear axis of motion perpendicular to the contact direction and axis of rotation is typically not used for rotary axis scanning, while instead the rotary axis is rotated in order to implement the motion along the workpiece surface.

In order to perform scanning, but also measurement of single points, using the tactile/optical sensor in a manner analogous to measurement using conventional tactile sensors, that is, as if using classical distance measurement systems, thereby reducing the effort for the corresponding method, according to the invention, the three Cartesian deflection signals are optionally derived from the images recorded by means of the laterally measuring optical sensor and the vertically measuring distance sensor, as with a conventional tactile sensor. Said signals can then be processed by an identical or even the same analysis unit or analysis software. For the greatest accuracy, the recording of the signals must be synchronized with determining the positions of the measurement axes of the coordinate measuring machine, such as by triggering via a trigger line.

According to a particular embodiment of the invention, probe extensions are used for scanning having greater flexural rigidity in comparison with single point measurement, so-called scanning fibers. This is achieved in that the region of the probe extension running directly above the contact shape element or the target mark transitions after a so-called free shaft length of about 0.5 mm to 1 mm into a thicker region of significantly greater flexural rigidity in comparison with the free shaft length. The transition from the thicker into the thinner region is preferably continuous, produced by means of a drawing process. For probe extensions for single point measurements, the free shaft length is greater, approximately 3 mm to 6 mm. For scanning fibers, a lesser depth of insertion into the workpiece is possible, namely only the range of the free shaft length, but a so-called shaft contact will occur only for larger deflections, as when measuring single points, wherein the part of the probe extension running above the contact shape element collides with the workpiece. The greater permissible deflections when using scanning fibers makes controlling the deflection while scanning easier, and allows greater scanning speeds.

Therefore, according to the invention, the probe extension transitions from a flexurally elastic region adjacent to and directly above the contact shape element or target mark into a region having a greater diameter, preferably at least double the diameter of the least diameter of the flexurally elastic region of the probe extension, preferably in that the flexurally elastic part is implemented by drawing and has a diameter continuously tapering in the direction toward the contact shape element, wherein the length of the region running directly above the contact shape element or the target mark to the region of the greater diameter is selected to be less than 2 mm, particularly 0.2 mm to 1.5 mm, for use for scanning measurement, or greater than 2.5 mm, particularly 3 mm to 6 mm, for single-point measurement.

It is therefore preferably provided that two deflection signals, preferably deflection signals perpendicular to each other, are extracted from each of the images recorded by the laterally measuring optical sensor and a third deflection signal, preferably perpendicular to the first two deflection signals, is provided by the vertically measuring distance sensor, the deflection signals are preferably processed by means of the same or identical analysis unit and/or analysis software as is used for a conventional tactile probe in order to determine the deflection of the contact shape element in 3D and to determine the measurement points therefrom.

The idea is particularly emphasized that the recording of the image used for determining the deflection of the contact shape element in 3D in each case and of the associated third deflection signal provided by the distance sensor are recorded at the same point in time, controlled by a trigger line, as the recording of the positions of the measurement axes of the coordinate measuring machine.

For determining the lateral deflection of the contact shape element or the target mark, the location or position of the image of the contact shape element or the target mark in the deflected state in the digital image recorded by the laterally measuring sensor is compared with the location or position in the non-deflected state. To this end, the location in the non-deflected state is calibrated in advance. A characteristic curve comprising the relationship of the position in the image to the actual deflection must also be calibrated.

The invention proposes two fundamental methods for rapidly and precisely determining the orientation or position of the image of the contact shape element or the target mark in the digital image recorded by the laterally measuring sensor. The first method is based on a contour analysis, and the second on image correlation.

For the contour analysis, a contour is extracted from the digital image by means of suitable mathematical algorithms. Measurement points are arranged in a row like beads along the curve of the edge and determined to subpixel accuracy by interpolating the edge curve. For an individual image capture of the round contact shape element, a circular contour having a plurality of measurement points thus arises. Subsequently, the center of the circular contour is typically used for determining the position and can be determined using the method of the least square ("best-fit circle"). Alternatively, other features such as the centroid of the contour can be analyzed.

Image correlation makes it possible to locate any arbitrary objects in the image. To this end, a reference image (template) of the non-deflected contact shape element or the target mark is generated and saved in advance. Said template is then searched for in the image when measuring (the deflected contact shape element or target mark). The location having the greatest similarity value corresponds to the center position of the contact shape element or the target mark. For image correlation, the template is shifted across the image pixel by pixel. A similarity value is derived from the two at each point of the image. The simplest similarity value is the sum of the absolute difference of the two images. If the template matches the segment of the image, then the difference between the two images is zero. The greatest match is achieved at said location. If, however, a change in the lighting intensity or brightness occurs in comparison with the condition when the template was recorded, then the difference between the images can no longer be zero using this method. A similarity value able to deal with this condition is the normalized cross-correlation used as an example according to the following equation, wherein a type of normalization of the template or the image takes place:

$$ncc(i,j) = \frac{1}{n} \sum_{(x,y) \in T} \left[ \frac{T(x,y) - \bar{T}}{\sqrt{s_T^2}} \cdot \frac{B(i+x, j+y) - \bar{B}(i,j)}{\sqrt{s_B^2(i,j)}} \right]$$

Where ncc: cross-correlation value at i,j: image position; T: template; B: image; $s_T^2$: greyscale value variance of the template; $s_B^2$: greyscale value variance of the image region (covered by the template).

This method thereby achieves the object of precisely determining the deflection even under poor imaging conditions or changed lighting conditions.

The result of the cross-correlation is a correlation matrix having the same dimensions as the camera image and comprising correlation values between +1 and −1, wherein +1 means an exact match between the template and the image. If the greyscale values are inverted, then the value is −1. The center position of the contact shape element or the target mark is represented by the pixel coordinates having the greatest correlation coefficient. Suitable interpolation methods such as linear or quadratic interpolation allow analysis of the location with subpixel accuracy. Optimizations of the calculation-intensive image correlation using the known standard methods are focused on reducing calculation times. Stepwise calculation in resolution stages using the pyramid method and the use of simple test variables for filtering the maximum value candidates have potential, wherein unsuitable regions in the image detected by means of image analysis are excluded from the correlation analysis.

According to a preferred solution according to the invention, the deflection signals are extracted from the images recorded by means of the laterally measuring optical sensor in that the location of the contact shape element or the target mark in each image is determined in comparison with the previously calibrated location in the non-deflected state, wherein the previously calibrated location and each particular location are determined by identifying the contour of the contact shape element or the target mark in the image and determining the centroid or center point of the contour, or are determined by means of correlation methods, wherein the maximum correlation to a previously determined template of the image of the contact shape element or the target mark is determined, wherein the correlation is analyzed in a plurality of different locations of the template relative to each image.

It can therefore be characteristic that a cross-correlation is applied, wherein the fact that the template and the image were recorded under different lighting, particularly brightness, is provided for as an additional parameter, thus the template and/or image are normalized accordingly prior to determining the correlation.

Particularly emphasized is the idea that the correlation or the correlation coefficient is determined first at reduced resolution of the image and/or template and a rough location of the contact shape element or the target mark is determined and then at increased resolution in a limited image region around the roughly determined location, wherein the method is preferably iteratively repeated at stepwise increasing resolution and stepwise limitation of the image region (pyramid method).

It is preferably provided that prior to determining a correlation, regions of the image excepted from the correlation analysis are determined, particularly using simple test parameters for filtering the maximum value candidates.

In order to achieve optimal alignment for the different probe extensions used for single point measurements or scanning, for example, said extensions are adjustable.

In a preferred refinement of the invention, the probe extension is adjusted relative to the laterally measuring optical sensor to this end, preferably in one, two, or three translational and/or one, two, or three rotational degrees of freedom.

According to a preferred solution according to the invention, the region of the probe extension comprising the contact shape element is adjusted to an angle of 0°<Alpha<15° relative to the optical axis of the laterally measuring optical sensor, in that
    a fiber receptacle comprising a probe extension is used, preferably changed in, said probe extension comprising a corresponding preset bend between the region comprising the contact shape element and the region of the fiber receptacle, or
    a fiber receptacle comprising a fixing location implemented accordingly is used, preferably changed in, or
    the means for adjusting are adjusted accordingly,
and that the contact shape element or the target mark are disposed in the focal region of the laterally measuring optical sensor, preferably for measuring the roughness of a workpiece surface.

Also characteristic is that a probe extension comprising a bend or a preferably star-shaped branching to a plurality of contact shape elements between the contact shape element and the target mark is used or changed in for measuring undercuts or other features inaccessible to straight probe extensions.

The idea is particularly emphasized that the imaging scale when deflecting in the vertical direction is held constant by using a telecentric optic having a fixed magnification or a telecentric zoom stage of a zoom optic, wherein the zoom optic preferably has a working distance adjustable independently of the imaging scale.

The precision of the measurement of the lateral deflection thereby does not change even if the captured contact shape element or target mark is deflected vertically.

In a preferred refinement according to the invention, a zoom optic, preferably a zoom optic having a working distance adjustable independently of the imaging scale, is used for determining the lateral deflection, wherein a zoom stage is selected comprising an imaging scale adapted to the diameter of the contact shape element or target mark being captured in each case, particularly adapted so that the image of the contact shape element or target mark, including the maximum permissible deflection thereof, is completely captured by the zoom optic and the resolution is maximized.

It is thereby ensured that contact shape elements or target marks of different sizes can be used, preferably by means of an automatic changer, and can nevertheless be completely captured and measured. The adaptation is preferably implemented such that a zoom stage is selected in which the entire image of the contact shape element or the target mark can just be captured when providing for the maximum permissible deflection. This ensures the maximum possible resolution and therefore the precision of the lateral measurement.

According to a preferred solution according to the invention, the vertically measuring optical distance sensor is a sensor using the Foucault principle, wherein a lighting source illuminates only a limited part of the aperture of the optic used on the object for imaging, and/or wherein a linear or planar detection unit such as a position-sensitive diode (PSD) or camera is used for determining the location of the lighting reflected by the workpiece, wherein the location is preferably determined by means of a camera, in that
- a differential signal is determined from the sum signals, preferably the sum signals of the measured intensities of the individual light-sensitive elements of the detection unit from at least two different regions of the camera, preferably equally sized regions adjacent to each other in the center of the camera area, and/or
- the beam centroid, preferably the photometric center, is determined by analyzing the intensities of the individual light-sensitive elements of at least one partial region of the camera area.

In addition to the previous explanations of said preferred refinement of a Foucault distance sensor, when using a camera as the detection unit it is proposed that the location of the lighting reflected by the workpiece is calculated, starting from a separate lighting source of the Foucault sensor, from the intensity distribution recorded using the various light-sensitive elements of the camera. The result of the difference is a signal passing through zero and used as the center of the measurement range. The centroid of the beam is used in the regions wherein the difference signal is saturated, that is, at least one of the selected regions is no longer illuminated, or as additional monitoring. In order to avoid blooming in the camera, the integration time of the camera is set correspondingly low. Due to the reading frequency thus achieved and supported by the limitation of lines or columns, as previously explained, a plurality of images recorded one after the other can be summed in order to achieve a high signal-to-noise ratio. The integration time adjustment is also used for regulating to a constant light intensity in order to implement an adjustment to a different surface reflection levels or surface tilts.

The tactile/optical sensor is preferably integrated in a coordinate measuring machine, preferably in a multisensor coordinate measuring machine, together with additional sensors, preferably tactile, optical, or computed-tomography sensors, preferably such that the laterally measuring optical sensor and the vertically measuring optical distance sensor are operated independently of the tactile/optical sensor.

This means, for example, that the laterally measuring optical sensor and the vertically measuring optical distance sensor can be used alternatively for measuring the workpiece surface when the probe extension is set aside, that is, when the fiber receptacle, adjusting unit, or mount are set aside.

The invention further relates to a method for determining geometric features and structures on a workpiece by means of a tactile/optical sensor comprising at least a laterally measuring optical sensor, preferably an image processing sensor, preferably a vertically measuring optical distance sensor, and an at least partially flexurally elastic probe extension, at least the following emerging from the probe extension: a contact shape element deflecting when contacting the workpiece, and preferably at least one target mark associated with the contact shape element and deflecting when the contact shape element contacts the workpiece, the lateral deflection of the contact shape element or of the target mark perpendicular to the optical axis of the laterally measuring optical sensor being captured by means of the same, and the vertical deflection of the contact shape element or of the target mark along the optical axis of the laterally measuring optical sensor being captured by means of the distance sensor, characterized in that a probe extension emerging from a fiber receptacle to which a flexurally elastic part is directly or indirectly connected is used, to which part the contact shape element or optionally the target mark is directly or indirectly connected, wherein the part of the probe extension running between the optional target mark, if present, and the contact shape element is flexurally rigid relative to the flexurally elastic part. that the probe extension is changed in manually or automatically by means of which a plurality of measurement points, preferably offset from each other, on the workpiece can each be determined in scanning mode, in that the following steps are performed:
- the contact shape element and workpiece are displaced toward each other relative to each other until a predefined deflection of the contact shape element or the target mark has been achieved
- the contact shape element and workpiece are displaced relative to each other along a path, wherein the contact shape element and the workpiece remain in contact, and wherein the deflection of the contact shape element and/or the target mark is determined cyclically during the displacement
- the contact shape element and workpiece are displaced relative to each other away from each other at least until the contact shape element or the target mark is no longer deflected
- the plurality of measurement points are calculated from the plurality of determined deflections and the location of the tactile/optical sensor relative to the workpiece in each case, preferably using the positions of the measurement axes of a coordinate measuring machine.

a target path such as a spline is defined for the path and is formed by one or more prescribed curves in space, wherein the curves are defined preferably based on previously measured points and/or a model such as a CAD model of the workpiece and/or from basic geometric shapes such as the line, line segment, circle, segment of a circle, or segment of a helix, and the path either corresponds to the target path (uncontrolled scanning) or follows the target path providing for the deflection of the contact shape element and/or the target mark, preferably in at least two coordinate directions defined by a scanning plane (controlled scanning), and the deflection during the displacement on the path is controlled between a minimum and a maximum value about a target deflection by displacing corresponding coordinate measuring machine axes, wherein the control preferably takes place perpendicular to a scanning plane or in the two spatial directions within the scanning plane or in all three spatial directions.

The invention further relates to a method for determining geometric features and structures on a workpiece by means of a tactile/optical sensor comprising at least a laterally measuring optical sensor, preferably an image processing sensor, preferably a vertically measuring optical distance sensor, and an at least partially flexurally elastic probe extension, at least the following emerging from the probe extension: a contact shape element deflecting when contacting the workpiece, and preferably at least one target mark associated with the contact shape element and deflecting when the contact shape element contacts the workpiece, the lateral deflection of the contact shape element or of the target mark perpendicular to the optical axis of the laterally measuring optical sensor being captured by means of the same, and the vertical deflection of the contact shape element or of the target mark along the optical axis of the laterally measuring optical sensor being captured by means of the distance sensor, characterized in that a probe extension emerging from a fiber receptacle to which a flexurally elastic part is directly or indirectly connected is used, to which part the contact shape element or optionally the target mark is directly or indirectly connected, wherein the part of the probe extension running between the optional target mark, if present, and the contact shape element is flexurally rigid relative to the flexurally elastic part. that the probe extension is changed in manually or automatically by means of which a plurality of measurement points, preferably offset from each other, on the workpiece can each be determined in scanning mode, in that the following steps are performed:
   the contact shape element and workpiece are displaced toward each other relative to each other until a predefined deflection of the contact shape element or the target mark has been achieved
   the contact shape element and workpiece are displaced relative to each other along a path, wherein the contact shape element and the workpiece remain in contact, and wherein the deflection of the contact shape element and/or the target mark is determined cyclically during the displacement
   the contact shape element and workpiece are displaced relative to each other away from each other at least until the contact shape element or the target mark is no longer deflected
   the plurality of measurement points are calculated from the plurality of determined deflections and the location of the tactile/optical sensor relative to the workpiece in each case, preferably using the positions of the measurement axes of a coordinate measuring machine.
the path is defined by a starting point and an ending point, and preferably by one or more intermediate points, and preferably by a starting direction and/or a scanning plane, and that between the defined points the path is determined by providing for the deflection of the contact shape element and/or target mark (controlled scanning) by the location of the workpiece surface being contacted, the deflection during the displacement on the path is controlled between a minimum and a maximum value about a target deflection by displacing corresponding coordinate measuring machine axes, wherein the control preferably takes place perpendicular to a scanning plane or in the two spatial directions within the scanning plane or in all three spatial directions. when controlling in the two spatial directions within the scanning plane, the control takes place in the direction of the deflection, preferably in the direction of the deflection projected into the scanning plane, and the displacement along the path within the scanning plane takes place perpendicular to the deflection projected into the scanning plane, wherein the sense of direction of the displacement is defined so as to form the smaller angle to the previous direction of displacement.

The invention further relates to a method for determining geometric features and structures on a workpiece by means of a tactile/optical sensor comprising at least a laterally measuring optical sensor, preferably an image processing sensor, preferably a vertically measuring optical distance sensor, and an at least partially flexurally elastic probe extension, at least the following emerging from the probe extension: a contact shape element deflecting when contacting the workpiece, and preferably at least one target mark associated with the contact shape element and deflecting when the contact shape element contacts the workpiece, the lateral deflection of the contact shape element or of the target mark perpendicular to the optical axis of the laterally measuring optical sensor being captured by means of the same, and the vertical deflection of the contact shape element or of the target mark along the optical axis of the laterally measuring optical sensor being captured by means of the distance sensor, characterized in that a probe extension emerging from a fiber receptacle to which a flexurally elastic part is directly or indirectly connected is used, to which part the contact shape element or optionally the target mark is directly or indirectly connected, wherein the part of the probe extension running between the optional target mark, if present, and the contact shape element is flexurally rigid relative to the flexurally elastic part, the deflection signals are extracted from the images recorded by means of the laterally measuring optical sensor in that the location of the contact shape element or the target mark in each image is determined in comparison with the previously calibrated location in the non-deflected state, wherein the previously calibrated location and each particular location are determined by identifying the contour of the contact shape element or the target mark in the image and determining the centroid or center point of the contour, or are determined by means of correlation methods, wherein the maximum correlation to a previously determined template of the image of the contact shape element or the target mark is determined, wherein the correlation is analyzed in a plurality of different locations of the template relative to each image, a cross-correlation is applied, wherein the fact that the template and the image were recorded under different lighting, particularly brightness, is provided for as an additional parameter, thus the template and/or image are normalized accordingly prior to determining the correlation.

The invention further relates to a method for determining geometric features and structures on a workpiece by means of a tactile/optical sensor comprising at least a laterally measuring optical sensor, preferably an image processing sensor, preferably a vertically measuring optical distance sensor, and an at least partially flexurally elastic probe extension, at least the following emerging from the probe extension: a contact shape element deflecting when contacting the workpiece, and preferably at least one target mark associated with the contact shape element and deflecting when the contact shape element contacts the workpiece, the lateral deflection of the contact shape element or of the target mark perpendicular to the optical axis of the laterally measuring optical sensor being captured by means of the same, and the vertical deflection of the contact shape element or of the target mark along the optical axis of the laterally measuring optical sensor being captured by means of the distance sensor, characterized in that a probe extension emerging from a fiber receptacle to which a flexurally elastic part is directly or indirectly connected is used, to which part the contact shape element or optionally the target mark is directly or indirectly connected, wherein the part of the probe extension running between the optional target mark, if present, and the contact shape element is flexurally rigid relative to the flexurally elastic part, the region of the probe extension comprising the contact shape element is adjusted to an angle of 0°<α<15° relative to the optical axis of the laterally measuring optical sensor, in that a fiber receptacle comprising a probe extension is used, preferably changed in, said probe extension comprising a corresponding preset bend between the region comprising the contact shape element and the region of the fiber receptacle, or a fiber receptacle comprising a fixing location implemented accordingly is used, preferably changed in, or the means for adjusting are adjusted accordingly, and that the contact shape element or the target mark are disposed in the focal region of the laterally measuring optical sensor, preferably for measuring the roughness of a workpiece surface.

In a preferred refinement according to the invention, the brightness of the light emitted by the contact shape element or target mark is determined by the camera of the image processing sensor and is regulated to a constant value by controlling the light source for illuminating the contact shape element or the target mark, preferably wherein the value is defined beforehand or is defined using the first image recorded for measuring by means of the image processing sensor.

Regulating the brightness of the image of the image processing sensor ensures that the imaging of the contact shape element or the target mark used for analyzing the lateral deflection occurs reproducibly in the so-called self-illumination mode. Particularly in case of deep insertion in a tight hole, at least slight shadowing occurs and can be thereby at least partially eliminated. Even deviations in the brightness in a standard condition present when calibrating the tactile/optical sensor, however, can bring about measurement deviations. If the value is thus determined in advance when calibrating and then adjusted for each measurement, that is, correspondingly controlled, then constant light conditions are present and particularly reproducibly precise measurements are possible.

The invention thus proposes devices and methods for tactile/optical sensors proposing solutions for:

Measuring using scanning methods, particularly the potential for switching between single point measuring and scanning arbitrarily and scanning on specified paths or freely (from a starting to an ending point) and scanning in a controlled or uncontrolled manner.

Simple and reproducible adjusting of the probe extension,

Measuring at an adjustable tilt of the probe extension, particularly a tilt for setting once or set once, and using for measuring surfaces of different orientations, for example for roughness measurements, and corresponding changeout interfaces therefore ensuring reproducible location and tilt of the probe extension at different tilt directions, A further changeout interface making an additional adjusting of different probe extensions unnecessary, Light sources integrated in interchangeable fiber holders (fiber receptacles) for illuminating the probe extension, Measuring undercuts, and undercuts at arbitrary orientation, at high precision (without using rotary joints or rotary/tilting joints), Implementing a precisely constant imaging scale when deflecting in the direction of the optical axis of the optic used for optically capturing the deflection of the contact shape element or the target mark of the probe extension, Implementing an adjustable precision for the deflection measurement, Arbitrarily large measurement range or high precision for determining vertical deflection.

A large measurement range of the vertically measuring sensors,

Using tactile/optical sensors analogously to tactile sensors,

Rapidly and precisely determining the lateral defection of the contact shape element or target mark under poor imaging conditions, and able to be provided in one or as few different arrangements as possible.

The object of an independent invention is to provide a method for producing the probe extension, including the contact shape element and optionally the target mark, by means of which a specified diameter, at least in the region of the probe extension facing the workpiece, and optionally a specified shape such as a bend for the probe extension, and a specified diameter for the contact shape element and optionally the target mark can be implemented having high precision, in order to use the probe extension for precisely measuring geometric features or structures on a workpiece by means of a tactile/optical sensor loaded in a coordinate measuring machine.

The invention thus further relates to a method for producing a probe extension, a contact shape element emerging from the probe extension, and preferably a target mark for a tactile/optical sensor for use in a coordinate measuring machine for measuring geometric features and structures on a workpiece.

In an independent solution according to the invention, a tapering diameter of the probe extension is produced by drawing under the influence of heat, preferably by means of laser, electric arc, or hot wire, and the contact shape element and/or target mark are produced by fusing and preferably by means of cohesion or adhesion, from one or more fiber pieces, preferably glass fiber pieces.

According to an independently protected proposal, the invention further relates to a method for producing a probe extension, a contact shape element emerging from the probe extension, and preferably a target mark for a tactile/optical sensor for use in a coordinate measuring machine for measuring geometric features and structures on a workpiece, the probe extension being at least one segment of a fiber, particularly an optical glass fiber, or a fiber pieces such as a glass fiber piece, and characterized in that the diameter of at least one segment of the fiber segment is tapered by drawing under the influence of heat, such as a laser, arc, or heating wire, and that the contact shape element and/or any present target mark are produced by melting and preferably by utilizing cohesion or adhesion.

The heat source is preferably such that a high temperature is achieved in as small a local environment as possible, such as is possible by means of plasma or electric arc, a laser beam, or a high-powered hot wire, for example. The regions of the glass fiber are guided to the heat source (e.g., for adhering or splicing) or intentionally guided along the same (e.g., for reducing or drawing, also known as "tapering") in order to locally melt said regions.

Fiber pieces having multilayer construction made of a glass core, particularly a quartz glass core, a cladding surrounding said core, a silicone layer surrounding said cladding, and a plastic layer in turn surrounding said layer and preferably made of ethylene-tetrafluoroethylene such as Tefzel (registered trademark of DuPont). The cladding can also be made of glass or quartz glass and can then in general no longer be removed from the quartz glass core, or of a different material and can be removed from the quartz glass core. When drawing, only the layers made of glass can remain, as any other layers present would burn. The silicone layer and plastic layer, and any cladding not made of glass, are therefore removed from the region intended for drawing. When drawing, a tapering of the diameter occurs due to the principle, wherein said diameter continuously decreases along the fiber. If the reduction occurs at an approximately constant rate, then the preferred conical shape of the drawn fiber piece arises. The drawn fiber piece is connected to a non-drawn region of the probe extension. The contact shape element is attached or formed or produced at the end facing away from the sensor, that is, in the region intended to be inserted into the workpiece.

After drawing the fiber, the drawn region having the tapering diameter in particular can be seen as the flexurally elastic region of the probe extension. The non-drawn part practically does not flex at all when the contact shape element is deflected, due to the greater diameter thereof.

A further process is cutting off a drawn fiber, for example, also known as cleaving. Alternatively, a tapered fiber is broken. A thick region is formed on a drawn, that is, tapered and broken or cut-off end of the fiber, for example, by means of a particular method, in that the break or cut point is heated by an electric arc. The surface tension of the molten glass causes a spherical drop to form, implementing the contact shape element or the target mark. In the second case, one or more separate fiber pieces are adhered to the target mark by adhesion, that is, again by local heating, a contact shape element being attached to the opposite end of said piece, the contact shape element in turn being produced by means of the previously described method for forming a thick region. Alternatively to thickening, a contact shape element can also be produced separately and adhered to the end of the fiber, again by local heating. The separate fiber piece having a contact shape element runs in the direction of the segment of the probe extension connected to the target mark, for example, that is, in the direction of the optical axis of the laterally measuring sensor, or in the modified direction as previously described. A plurality of separate fiber pieces form a star shape, for example.

The idea is therefore particularly preferred that the contact shape element or the target mark at the end of the probe extension having a tapered diameter is produced by thickening the probe extension during the melting operation, or a separately produced contact shape element or target mark is adhered.

The target mark can alternatively be produced by thickening within the probe extension itself, in that said probe extension is upset while being heated.

In a particular embodiment according to the invention, therefore, the target mark is produced within the part of the probe extension having a tapered diameter by thickening the probe extension during the melting operation, preferably by upsetting.

According to the invention, one or more separately produced fiber pieces are adhered to the target mark and run in the direction of the segment of the probe extension emerging from the target mark or in one or more modified directions, wherein the contact shape element or each contact shape element emerges from the end of the fiber piece or pieces opposite the adhesion.

In the previously described embodiment of the 2D sensor, the probe extension must be bent by approximately 90°. To this end, according to a first embodiment of the invention, the weight of the fiber itself is used and the fiber is guided past in the heat source in a defined manner. In order to produce a uniform radius, the fiber is then guided across a ceramic bar lowering in a defined motion. A vertical motion is thereby superimposed on a horizontal one.

The motion of the fiber segment—also called a fiber piece—and support element such as a ceramic bar are mutually tuned, wherein the distances traveled relative to each other are correlated, particularly at a constant ratio, particularly one. The bar-shaped support element extends in the direction of the longitudinal axis perpendicular to the direction of motion of the fiber segment, that is, in the longitudinal axis thereof running in the region of the support element.

Therefore, preferably the probe extension is bent under the influence of heat and utilizing gravity, preferably by 90° or by 85° to 95°, wherein the probe extension is guided past the heat source by means of a feeding motion, the bending is preferably performed at a constant radius in that the fiber piece is supported over a support bar such as a cylindrical ceramic bar downstream of the heat source, said bar undergoing at least a vertical displacement, preferably at least at times a superimposed vertical and horizontal displacement, wherein particularly the feeding motion of the probe extension and the displacement of the support bar are mutually tuned at a correlated ratio, preferably a constant ratio.

In a second embodiment of the invention, the bend is produced in that the fiber itself is not plastically deformed; instead the rigid sleeve, such as the metal tube and in general the hollow cylinder indicated above. The non-bent region of the fiber piece is then placed, for example inserted, into the metal tube. The fiber piece thereby follows the shape of the tube, previously bent by approximately 90°. The drawn region of the fiber piece remains outside of the tube. In the non-drawn region, the plastic layer and silicon layer are preferably not removed, because the fiber could otherwise break during inserting and deflecting in the tube. The tube preferably runs past the bend point into the fiber holder. On the contact shape element side, the non-drawn region protrudes out of the tube, for example a few millimeters, for example 1 mm to 10 mm, for particular shapes also up to 50 mm to 100 mm, before the drawn region begins. At the point that the non-drawn region exits the tube on the contact shape element, said region is adhered to the tube.

In a particular embodiment of the invention, the probe extension is inserted into the interior of a hollow cylinder, at least in segments, wherein the hollow cylinder comprises a bend of 85° to 95°, preferably 90°, wherein preferably only non-drawn regions of the probe extension run within the hollow cylinder and preferably the probe extension and hollow cylinder are adhered to each other at the exit point of the probe extension out of the hollow cylinder facing toward the contact shape element.

In the case of the 3D sensor, according to the invention a target mark associated with the distance sensor, such as a reflector, is attached to the end of the probe extension facing away from the contact shape element. This is done preferably by adhesion, particularly under the influence of heat. The end of the probe extension facing away from the contact shape element is thereby not drawn.

The idea is particularly emphasized that fiber pieces constructed in multiple layers are used, preferably comprising a cladding about a glass core, preferably a quartz glass core, preferably a quartz glass cladding, and at least in segments having a silicone layer and a plastic layer, preferably made of ethylene tetrafluoroethylene such as Tefzel (registered trademark of DuPont), and preferably only the regions made of glass are subjected to the influence of heat.

In order to perform the previously explained production method at high precision, according to the invention, the process is computer-controlled. Particularly the feeding motion and aligning of the fiber can then take place quickly and precisely. The aligning in particular is needed during adhesion. A defined alignment of the fiber is also needed when drawing and cutting the fiber. Said processes are also monitored optically by means of a camera or image processing sensor and controlled accordingly. According to the invention, cleaning by means of plasma is performed before adhering.

According to a preferred solution according to the invention, the melting operation, drawing operation, and adhering operation, and preferably the feeding motion, cutting operation, and operation for cleaning the fiber ends by means of plasma are controlled by a computer, preferably in that computer-controlled translational and rotational alignment of the ends to be adhered takes place prior to adhering at least in the two directions running perpendicular to the fiber direction and preferably in the two tilting directions about said perpendicular directions.

The production of the probe extension can also be characterized by monitoring by means of a camera, preferably an image processing sensor, and/or controlling by means of signals generated by means of the camera, preferably by an image processing sensor.

According to an idea having independent protection, a method for producing a probe extension for a tactile/optical sensor is provided, wherein the probe extension is designed for being received in a fiber receptacle, wherein the method is characterized in that a planar flat area is formed in regions on the outside of the probe extension at the end of the probe extension facing away from the contact shape element, preferably the outside of the hollow cylinder receiving the probe extension.

The idea is thereby particularly preferred that the normal direction of the flat area is parallel to the direction of the region of the probe extension running parallel to or along the optical axis, and that the hollow cylinder is bent by 90°, preferably by bending in a fixture, wherein the flat area of the hollow cylinder is placed against a contact surface and the bending direction is aligned to the normal of the contact surface.

A further object of an independent invention is a device and a method for using a tactile/optical sensor for measuring surface point on a workpiece.

The independent invention particularly relates to a device for determining geometric features and structures on a workpiece by means of a tactile/optical sensor comprising a mounting element for an at least partially flexurally elastic probe extension, at least the following emerging from the probe extension: a contact shape element for deflecting when contacting the workpiece and a first target mark associated with the contact shape element for deflecting when the contact shape element contacts the workpiece, such that the deflection, preferably the lateral deflection, thereof can be captured by means of a first laterally measuring optical sensor, preferably an image processing sensor.

Tactile/optical sensors are described in the following specifications of the applicant.

EP0988505 describes a method and a device wherein a probe element (first target mark) and optionally a further target mark emerge from a probe extension via a flexurally elastic shaft, the coordinates thereof when deflected being determined by means of an optical sensor.

A similar sensor is described in EP 1 071 921, wherein the contact force is adjusted by means of the rigidity of the flexurally elastic shaft, in that solely the bending length 1 is varied.

An opto-mechanical interface having an adjusting device for a corresponding sensor is described in EP 1 082 581.

DE 198 24 107 describes the use of a corresponding sensor for a surface profiling method.

A corresponding sensor is operated on a rotating or pivoting joint in DE10 2004 022 314.

Finally, DE 10 2010 060 833 describes a tactile/optical sensor wherein, in addition to determining the position of a contact shape element or at least a target mark associated therewith in the X and/or Y direction of the coordinate measuring machine using a first sensor, a second sensor also determines the Z-direction, wherein at least one flexible connecting element is used for mounting the contact shape element and the target mark in a mounting element, said connecting element being penetrated by the beam path of the first sensor in the beam direction, wherein the at least one flexible connecting element is transparent and/or is severely defocused with respect to the first sensor.

Full reference is made to the disclosed contents of all previously named specifications of the applicant.

The object of the present invention is to implement precise measuring even for features accessible only by means of a relatively long and thin probe pin or a so-called probe extension having a length of preferably greater than five millimeters and a diameter of preferably less than 0.5 mm, wherein low contact forces must be ensured in order to protect the workpiece against damage and preferably also very small dimensions in the range of less than 0.5 mm in diameter should be achieved for the contact shape element used for contacting, in order to ensure high structural resolution, for example, or to enable measuring difficult-to-access features such as holes having a small diameter. The probe pin or probe extension can thereby run in the direction of the optical axis of the measurement system used for measuring the deflection of the contact shape element or a target mark associated therewith, or can also protrude laterally (L-probe). A plurality of lateral protrusions in different directions and lengths (star probe) having great lengths from several millimeters to a few centimeters shall also be able to be implemented.

In order to achieve the object, the contact shape element must be attached to a long probe extension. If the contact shape element is then inserted very far into the workpiece, such as into a hole, then the image on the optically laterally measuring image processing sensor is partially shadowed by the workpiece, giving rise to measurement deviations. As an improvement, EP 0 988 505 therefore proposes integrating an additional target mark in the probe extension above the contact shape element, said mark always remaining away from the workpiece, such as slightly above a hole. Said mark can then be captured by the image processing sensor unhindered. A previous disadvantage thereof, however, is that the probe extension is made of a single piece, wherein the entire probe extension must be very thin in order to achieve a low contact force (and associated low risk of damaging the workpiece), typically less than 0.5 mm in diameter, and implemented as a glass or plastic fiber, for example. When making contact, the probe extension thereby bends, wherein only a portion of the deflection of the contact shape element is transferred to the target mark, said portion decreasing as the length of the probe extension increases. The sensitivity of the entire system is thereby reduced, that is, the signal-to-noise ratio becomes lower the greater the distance between the contact shape element and the target mark. Said problem also cannot be solved in that a greater diameter is selected for the probe extension, as otherwise measurements can no longer be taken in holes having a very small diameter, such as injection orifices in fuel injectors. In addition, very small diameters for the probe extension in conjunction with the selected material can lead to lower rigidity and therefore to so-called shaft contact, wherein the shaft makes contact with the workpiece and causes erroneous measurement results.

At least some considerations of said object are substantially achieved by a device and a method using a tactile/optical sensor comprising a probe pine or a probe extension having a first region having higher rigidity, such as a first elastic modulus, and a second region having lower rigidity, such as a second elastic modulus, wherein optionally the first elastic modulus is greater than the second elastic modulus. Dimensioning accordingly results in favorable conditions for transferring the deflection of the contact shape element to the deflection of the target mark captures by means of the measurement system or sensor or plurality of measurement systems or sensors, particularly if the first region of greater rigidity is disposed between the contact shape element and the target mark or marks. The second region of lower rigidity extends at least partially between the attachment or mounting element of the probe extension on the tactile/optical sensor and thus on the measuring machine, such as a coordinate measuring machine, and the or one of the target marks or the connection between the contact shape element and the target mark or the connection between the plurality of target marks, thereby achieving a low contact force.

The second region of lower rigidity begins at the mounting element or near the mounting element and ends, in a first preferred solution according to the invention, at the first target mark or one of the plurality of target marks, if present. If a plurality of target marks are present then the second region particularly ends after the target mark nearest to the mounting element.

In an alternative solution according to the invention, the second region ends at the connection between the target mark and the contact shape element or the connection between the plurality of target marks, that is, at the first region of higher rigidity.

The first region of higher rigidity can thus also extend between the plurality of target marks. Thus a plurality of target marks are also provided according to the invention. A second target mark is thereby provided for capture by a second measurement system, particularly a distance sensor, capturing the deflection of the second target mark perpendicular, hereafter referred to as the vertical deflection, to the deflection of the first target mark, hereafter referred to as the lateral deflection. The first region of higher rigidity then extends between the contact shape element and the first target mark and the first and second and optionally further target marks. It is thereby achieved that the deflection of the contact shape element is transferred as fully as possible to all target marks in use.

As a refinement of said idea according to the invention, the dimensioning of the first region is implemented so that only one component of the deflection of the contact shape element, for example the vertical deflection, is transferred as fully as possible to a particular target mark, for example the second target mark. In general, the component determined by the measurement system associated with the corresponding target mark should be transferred as fully as possible to said particular target mark.

According to DE102010060833, for example, at least one flexible connecting element is used for attaching the contact shape element and the optionally at least one target mark associated therewith in a mounting element, said connecting element being penetrated by the beam path of the first sensor in the beam direction and wherein at least one flexible connecting element is transparent and/or is disposed severely out of focus with respect to the first measurement system or the first sensor. According to the present invention, said flexible connecting elements can be seen as part of the probe extension and preferably implement the or part of the second region of lower rigidity according to the invention.

A region of higher rigidity is particularly understood as a region dimensioned with respect to the region of lower rigidity such that, according to the formula from EP 1 071 921 B1:

$$F = \frac{3 \cdot E \cdot f \cdot I}{l^3}$$

where F is the contact force and E is the elastic modulus, l is the effective length and I is the axial moment of area (or moment of inertia) of the region of the probe extension under consideration, and f is the deflection of the contact shape element, the parameters E, l, and I, preferably the elastic modulus E, are adjusted accordingly, for example by selecting different materials for the two regions, such that when a contact force acts, that is, when the contact shape element contacts the workpieces, deformation is nearly completely avoided, preferably limited to a value of no greater than 10%, particularly preferably no greater than 1%.

The invention thus further relates to a device for determining geometric features and structures on a workpiece by means of a tactile/optical sensor comprising a mounting element for an at least partially flexurally elastic probe extension, at least the following emerging from the probe extension: a contact shape element for deflecting when contacting the workpiece and a first target mark associated with the contact shape element for deflecting when the contact shape element contacts the workpiece, such that the deflection, preferably the lateral deflection, thereof can be captured by means of a first laterally measuring optical sensor, preferably an image processing sensor.

The object of the invention is achieved in that the probe extension comprises a higher rigidity in a first region disposed at least between the contact shape element and the first target mark than in a second region disposed between the mounting element and the first target mark, or between the mounting element and the first region.

The invention further relates to a device for determining geometric features and structures on a workpiece by means of a tactile/optical sensor, the first and preferably a second target mark emerging from the at least partially flexurally elastic probe extension, the first and, if present, the second target mark being associated with the contact shape element for deflecting when the contact shape element contacts the workpiece, the deflection of the first and, if present, the second target mark perpendicular or nearly perpendicular to the deflection of the first target mark captured by means of the first optical sensor being determined by means of a second optical sensor, preferably an optical distance sensor, characterized in that the first region of greater rigidity is disposed between the contact shape element and the first target mark and, if the second target mark is present, between the first and second target marks, and if the second mark is present the second region of lower rigidity is disposed between the mounting element and the region between the first and second target marks.

In a first preferred refinement according to the invention, the first and preferably also a second target mark emerge from the at least partially flexurally elastic probe extension, the first and preferably also the second target mark being associated with the contact shape element for deflecting when the contact shape element contacts the workpiece, the deflection of the first or preferably the second target mark perpendicular or nearly perpendicular to the deflection of the first target mark captured by means of the first optical sensor being determined by means of a second optical sensor, preferably an optical distance sensor, wherein the first region of greater rigidity is disposed between the contact shape element and the first target mark and, if a second target mark is present, between the first and second target mark, and, if a second target mark is present, preferably the second region of lower rigidity is disposed between the mounting element and the region between the first and second target marks.

The idea is particularly emphasized that at least one part of the probe extension is implemented as one or more flexible connecting elements for attaching the contact shape element and the first and optionally second target mark to a mounting element, said connecting elements being penetrated by the beam path of the first sensor in the beam direction, and that the at least one flexible connecting element is transparent and/or is disposed severely out of focus with respect to the first sensor.

According to a particularly preferred solution according to the invention, the first region has a greater elastic modulus E than the second region, for example due to selecting appropriately different materials or hardening the first region.

It is therefore also characteristic that the first region is made of at least one of the materials steel, diamond, graphene, or tungsten, and/or the second region is made of a material having a lesser elastic modulus such as glass, glass fiber, plastic, or plastic fiber such as polyethylene, polypropylene, polyvinylchloride, or polyethyleneterephthalate.

In a second preferred refinement according to the invention, the first region has a greater moment of area I, preferably a greater thickness, and/or a lesser length 1 than the second region.

According to an embodiment of the invention, the contact shape element is spherical or nearly spherical or disc-shaped in design at the end of the probe extension on the object side, and the first target mark is spherical or ball-shaped or nearly spherical or ellipsoidal or cylindrical or rectangular or nearly rectangular or disc-shaped or nearly disc-shaped or is implemented as a thickening of the probe extension.

The probe extension is preferably divided into a plurality of single parts, particularly into the first and second regions, and the single parts are connected to each other and/or to the first and/or the second target mark and/or to the contact shape element by adhering or welding or splicing, and/or form units by splicing or forming.

The idea is particularly emphasized that the probe extension is L-shaped or star-shaped in design, wherein one contact shape element is present at each end of the star.

According to an embodiment of the invention, the tactile/optical sensor is integrated as a sensor in a coordinate measuring machine, preferably a multisensor coordinate measuring machine, together with additional sensors.

The present invention relates to a method for determining geometric features and structures on a workpiece by means of the tactile/optical sensor according to the invention.

The method according to the invention is further characterized in that the tactile/optical sensor is used in a coordinate measuring machine, preferably a multisensor coordinate measuring machine together with additional sensors.

An independent invention relates to a device and a method for tactile/optical measuring of geometric features and structures on a workpiece.

An independent invention further relates to the coating of a tactile/optical sensor for measuring geometric features and structure on workpieces, wherein an improved coating is used.

The independent invention particularly relates to a method and a device for determining geometric features and structures on a workpiece by means of a tactile/optical sensor at least made of an at least partially flexurally elastic probe extension, at least the following emerging from the probe extension: a contact shape element for deflecting when contacting the workpiece, and a target mark associated with the contact shape element for deflecting when the contact shape element contacts the workpiece such that the lateral deflection thereof, perpendicular to the optical axis of a laterally measuring optical sensor can be captured by means of the optical sensor, preferably an image processing sensor.

Tactile/optical sensors are described in the following specifications of the applicant.

EP 0 988 505 describes a method and a device wherein a probe element (first target mark) and optionally a further target mark emerge from a probe extension via a flexurally elastic shaft, the coordinates thereof when deflected being determined by means of an optical sensor.

A similar sensor is described in EP 1 071 921, wherein the contact force is adjusted by means of the rigidity of the flexurally elastic shaft, in that solely the bending length 1 is varied.

An opto-mechanical interface having an adjusting device for a corresponding sensor is described in EP 1 082 581.

DE 198 24 107 describes the use of a corresponding sensor for a surface profiling method.

A corresponding sensor is operated on a rotating or pivoting joint in DE 10 2004 022 314.

DE 10 2010 060 833 describes a tactile/optical sensor wherein, in addition to determining the position of a contact shape element or at least a target mark associated therewith in the X and/or Y direction of the coordinate measuring machine using a first sensor, a second sensor also determines the Z-direction, wherein at least one flexible connecting element is used for mounting the contact shape element and the target mark in a mounting element, said connecting element being penetrated by the beam path of the first sensor in the beam direction, wherein the at least one flexible connecting element is transparent and/or is severely defocused with respect to the first sensor.

Finally, PCT/EP01/010826 describes coating a probe element or probe extension on the side facing away from the sensor in order to generate a luminous mark in the interior of the probe element by bundling the radiation reflected at the coating, said radiation being introduced into the interior of the shaft of the probe element or probe extension, the length thereof being measured, and a mark associated with the probe element and formed by a darkened region of the luminous shaft of the probe element.

Full reference is made to the disclosed contents of all previously named specifications of the applicant.

The object of the present invention is to implement precise measuring of features difficult to access, particularly in holes or similar recesses more than one millimeter deep and having a diameter of less than approximately 0.5 mm, and thereby able to be measured at high precision only by using a target mark associated with the contact shape element and emerging from the shaft of the probe extension above the contact shape element and entering the recess only slightly or not at all and thus able to be completely captured by the optical sensor, and thereby achieving improved lighting for the optical measuring of the deflection of the target mark.

Previously known devices and methods have the problem that the target mark appears at only low brightness in the optical sensor. Coating the side of the mark or target mark facing away from the sensor according to the means of the prior art improves said problem, but based on experience sufficient brightness cannot be ensured, particularly for long probe pin or probe extension lengths and thus great distances between the optical sensor and the target mark, because large portions of the light entering the shaft run through the target mark and can exit the probe element or probe extension through the uncoated shaft and the uncoated contact shape element. Said radiation exiting the probe element or probe extension also cause interfering reflections under some conditions, due to light portions reflected or scattered at the workpiece, and can falsify the measurement.

In order to achieve the object it is necessary to significantly increase the portion of the light entering the probe element or probe extension available for analysis.

At least some considerations of said object are substantially achieved by a device for determining geometric features and structures on a workpiece by means of a tactile/optical sensor at least made of an at least partially flexurally elastic probe extension, at least the following emerging from the probe extension: a contact shape element for deflecting when contacting the workpiece, and a target mark associated with the contact shape element for deflecting when the contact shape element contacts the workpiece such that the lateral deflection thereof, perpendicular to the optical axis of a laterally measuring optical sensor can be captured by means of the optical sensor, preferably an image processing sensor, wherein the side of the target mark facing away from the optical sensor at least partially has a reflecting or fluorescing layer, and wherein the region of the shaft of the probe extension running between the target mark and the contact shape element is at least partially coated and/r the contact shape element is at least partially coated with a reflecting or fluorescing layer.

According to a refinement of this idea, the region of the shaft of the probe extension running between the target mark and the contact shape element is entirely coated and the contact shape element is entirely coated with a reflecting or fluorescing layer.

According to a particularly preferred solution according to the invention, the layer is a metal layer and is preferably covered by a hard-surfaced or wear-resistance protective layer such as a silicon nitride layer at least in the region thereof making contact with the object.

It is further characteristic that the target mark is spherical or nearly spherical in design and is coated with the reflecting or fluorescing layer on the area thereof facing away from the optical sensor up to or approximately up to the equator.

According to an embodiment of the invention, the light emitted by the reflecting or fluorescing layer produces an image associated with the target mark, preferably a light spot arising due to bundling on the optical sensor, such that the lateral deflection thereof can be captured by the laterally measuring optical sensor.

In a further preferred embodiment according to the invention, a second target mark emerges from the probe extension and can be captured by means of a second sensor, preferably a distance sensor.

The idea is particularly emphasized that the tactile/optical sensor is integrated in a coordinate measuring machine, preferably a multisensor coordinate measuring machine, together with additional sensors, preferably tactile, optical, or computed-tomography sensors.

The present invention relates to a method for determining geometric features and structures on a workpiece by means of the device according to the invention.

The object of the invention is thus achieved by a method for determining geometric features and structures on a workpiece by means of a tactile/optical sensor at least made of an at least partially flexurally elastic probe extension, at least the following emerging from the probe extension: a contact shape element for deflecting when contacting the workpiece, and a target mark associated with the contact shape element and deflecting when the contact shape element contacts the workpiece such that the lateral deflection thereof, perpendicular to the optical axis of a laterally measuring optical sensor having the optical sensor, preferably an image processing sensor, is captured, characterized in that the beam emitted by at least one part of the reflecting or fluorescing layers is imaged on the laterally measuring optical sensor by means of a device according to at least one or the preceding claims, and that the lateral deflection of the contact shape element is determined from the image.

In a first preferred refined according to the invention, the second target mark emerging from the probe extension is captured by the second sensor, preferably a distance sensor, preferably in that the measurement beam of the distance sensor is at least partially reflected at the second target mark.

The idea is particularly emphasized that the tactile/optical sensor is used in a coordinate measuring machine, preferably a multisensor coordinate measuring machine, together with additional sensors, preferably tactile, optical, or computed-tomography sensors.

An independent invention relates to a method for automatically determining geometric features and/or contours on workpieces by means of a coordinate measuring machine.

The independent invention further relates to automatically optically measuring geometric features and/or contours on workpieces by means of an image processing sensor.

Features refer, for example, to diameters, distances, angles, surface parameters such as shape and roughness or the like of geometric elements such as lines or line segments, circles, segments of circles, surfaces, etc. Contours in particular refer to edges, typically shown as a string of points on lines, circles, segments of circles, free-form lines, etc. Features such as contours are associated with actual dimensions by analyzing the location of measured points. This is done, for example, by selecting the measurement points associated with a feature or a contour. Said selection is made, for example, by setting a measurement window within a recorded image or overall images assembled from a plurality of single images or automatically by means of a measurement program. The images can already be preprocessed, for example by means of filters, or be present in a generalized representation comprising edges already detected in the images, for example. Within the measurement window, already present measurement points are selected or measurement points are derived by means of suitable image processing methods, preferably at object edges, steps, or the like.

In order to select the measurement window position to be associated with a particular feature according to the prior art, it is necessary to teach a corresponding measurement program, wherein the user detects the feature using at least one recorded image and manually defines the measurement window position. Alternatively, the definition can take place in advance using a CAD model of the workpiece, in that the CAD model is imported into the measurement program. Automated measurement without user intervention is not possible, however, because the association of the measurement program with the previously selected CAD model and the present workpiece must be made by the user for measuring the particular workpiece, and the orientation of the workpiece, that is, the position and rotation as well as potentially mirroring on the measurement bench must be derived by measuring selected features (so-called preliminary measurement) and a workpiece coordinate system derived therefrom with respect to the CAD coordinate system, and the coordinate systems must be adapted to each other so that the previously determined measurement window can be placed at the correction location on the workpiece, that is, the position of the particular feature.

Other methods exist wherein features, particularly regular geometric elements, are automatically detected in the image, as described in EP1319164, for example. A disadvantage thereby, however, is that no link to specified data exists, for example in the form of a technical drawing such as a CAD drawing or an inspection plan, and often comprising tolerances associated with the features. Said link and the alignment of the coordinate systems of the workpiece and the specified data are necessary, however, in order to determine whether the specified data have been met, optionally considering the tolerances, or how great the deviation from the specified data or specified dimensions or specified geometries of the features are. The fitting of measured data to specified data is known under the terms best fit or Gaussian fit. Fitting considering the tolerances is described in EP1157313, to which reference is made to the full extent.

The object of the present invention is to enable simple and rapid measuring, using as little user intervention as possible, for a plurality of features on a workpiece arbitrarily present from a plurality of known workpieces, wherein the result of the measurement is the actual dimensions of the features and optionally also a statement about compliance with or the degree of underrun or overrun with respect to the specified tolerances or the specified geometry.

The features or contours to be measured should preferably be detected by means of a specified geometry or plurality of specified geometries, such as an inspection plan associated with a CAD model or a technical drawing or a similar computer-readable representation such as a file, wherein said file or an additional computer-readable representation such as a file comprises the tolerances associated with the features.

In order to achieve the object it is necessary to automatically select the specified data such as the CAD model and tolerance data associated with the particular present workpiece.

At least some considerations of the objects are achieved in that the selection of the specified data associated with the particular workpiece takes place automatically, in that the image or overall image is compared with previously determined images or overall images (templates) of the plurality of eligible workpieces, preferably by means of correlation analysis, and the specified data associated with the previously determined image of the workpiece for which the greatest match is present are selected.

Automatically means that the least possible user intervention should take place during the actual measuring of the workpiece. This means that the user simply places the workpiece on the measurement bench and the measuring begins, wherein the placing and starting can also be done by a feeder system such as a robot. Starting a measurement means that an arbitrary means of input is actuated, such as a physical button or a button in a computer program by means of a mouse click or the like. Alternatively, the measuring starts automatically when the measuring machine detects the presence of a workpiece, for example due to the increased mass of the measurement bench using a corresponding sensor such as a force sensor or using the change in continuously captured images of the optical sensor. Automatically further means that after the measurement is started, no further user intervention is required until the results of the measurement are read, that is, the dimensions of the detected features or deviations from the specified dimensions of the features, that is, in particular no measurement windows must be set for selecting the features to be measured and for selecting the specified data associated with the workpiece. The reading of the measured values can also take place only after automatic further processing, such as automatic export to a CAQ system or the like. Automatic measuring is further characterized in that a measurement program does not need to be created in advance especially for the present workpiece. A previously created measurement program, valid for all eligible workpieces, is thus started. A plurality of measurement programs can thereby optionally exist, from which the user can make a selection, wherein the measurement programs use different analysis strategies or detection algorithms, for example, but can always be used independently of the present workpiece. As preparation for automatic measuring, however, it is necessary to record and to save the specified data and all tolerances associated with the specified data and previously determined images or overall images (tolerances) of workpieces such as master parts, in order to be able to access said records during the automatic measuring. The term automatic measuring used below refers, therefore, to the parts of the method according to the invention between starting a measurement program after placing a workpiece on the measurement bench of a measuring machine and reading out the measurement results, wherein the measurement program is started without knowledge of the present workpiece or the orientation thereof.

The invention thus relates to a method for automatically determining geometric features and/or contours of an eligible workpiece from a plurality of workpieces by means of an optical sensor, preferably an image processing sensor, one or more images of the workpiece being recorded and optionally merged into an overall image, features and/or contours being extracted from the image or the overall image, a fit being performed between the extracted features and/or contours and the specified geometries of the features and/or contours, the specified geometries being taken from the specified data associated with the particular workpiece and preferably the tolerances of the features and/or contours present in said specified data being provided for during the fit, and the actual dimensions and/or the deviations from the specified geometries for the features and/or contours being made available, wherein the selection of the specified data associated with the particular workpiece takes place automatically, in that the image or overall image is compared with previously determined images or overall images (templates) of the plurality of eligible workpieces, preferably by means of correlation analysis, and the specified data associated with the previously determined image of the workpiece for which the greatest match is present are selected.

Specified data refers to all data describing the specified geometry of a workpiece. Said data include, for example, drawing data from technical drawings or CAD data present in the form of a file, and can also be present in the form of inspection plans. Tolerances are typically also associated with the features described by the specified geometry in the geometry or dimensions thereof. Said tolerances are thus also included in the specified data. Also included in the specified data are any images of master parts previously recorded according to the invention, that is, workpieces corresponding at least approximately to the specified geometry of the particular workpiece. Said images are saved as templates, for example, and are associated with the further specified data, particularly the tolerances, or vice versa, the tolerances are associated with templates.

It is therefore emphasized that the specified data are drawing data such as CAD data and are preferably the tolerances associated with the features and/or contours present in the drawing data.

In a preferred refinement according to the invention, the tolerances associated with the specified geometries of the features and/or contours are provided for when fitting individual features and/or contours or a plurality of or all of the features and/or contours, wherein the fit is performed such that none of the tolerances are exceeded, wherein preferably the minimum underrun of the tolerances is maximized, or that if the tolerances are exceeded then the maximum overrun is minimized.

The corresponding requirements for maximum underrun or minimum overrun of the tolerance limits are fulfilled by optimization methods known to the prior art. It is first differentiated whether a fit of all features and/or contours, particularly to the measurement points associated therewith, can be fully fit into the zones about the specified geometry defined by the tolerances. If this is the case, then the fit is made such that the deviations from the tolerance limits, that is, the outer edges of the zones, are maximized, that is, the measurement points are fit so as to be as far from the tolerance limits as possible. Maximum underrun thereby means that the distance of the point nearest the tolerance limits is as great as possible. Said maximum underrun is the target function of the optimization task, under the secondary condition that the measurement points must all further lie within the tolerance limits. For ideally present measurement data, that is, corresponding precisely to the specified data, the fit leads to the measurement data and specified data being identical, that is, the deviation of the value nearest the tolerance limits corresponds precisely to the value of the tolerance at said location. In the second case, it is not possible to fit all measurement points within the tolerance zones, that is, at least one measurement point is outside of the tolerance zones. Said deviation should be minimal. If said measurement points are outside of the tolerance limits, then the fit should occur such that the maximum deviation from the tolerance limits is minimized by means of the optimization task.

It is further characteristic that the deviations from the specified geometries provided as a result of the fit comprise information about conformance to the tolerances and/or the maximum and/or minimum underrun and/or overrun of the tolerances and/or specified geometries.

In order to select the specified data matching the present workpiece according to the invention, it is necessary to compare the recorded image or overall image with the templates of all previously measured workpieces or master parts and to find the greatest match.

Corresponding comparisons of the match can be performed according to the invention by determining the correlation. The information present in the images, namely the greyscale values in the case of a greyscale value image, or the intensity values of the color channels in the case of a color image, are thereby compared and the deviations are determined. This is performed for all templates and for different relative positions and rotations and optimally mirroring of the specified or actual image in order to detect the correct workpiece and the position and rotation thereof on the measurement bench, and optionally to determine whether the workpiece has been placed in opposite orientation or the representation is distorted or shown at a slightly incorrect magnification. The greatest of the correlation coefficients determined in the plurality of comparisons, that is, for which the greatest match is present, and the corresponding associated specified data are used for further analysis. In the correlation analysis, the user can limit degrees of freedom in advance in order to enable more rapid comparison.

The proposal is therefore particularly emphasized that the comparison of the image or overall image with the templates is performed by means of correlation analysis, wherein a translation and/or rotation and/or mirroring and/or linear or non-linear scaling or distortion of the image is implemented as a degree of freedom for the correlation, preferably such that the user can limit the degrees of freedom.

In order to produce the templates, for example, the invention proposes that images of master parts of the corresponding workpieces are recorded and saved, and associated with the specified data of the corresponding workpiece. In order to account for the fact that different light settings can be present for the actual measuring of the workpiece, templates are also preferably saved at various light settings. Alternatively, the templates can be synthesized from the CAD data. Synthetic images can be generated, for example, by using the location of edges, raised areas, etc. from the specified data and optionally a simulated light impingement corresponding to the lighting of the measuring machine, in order to compute a theoretical, synthetic image. Here again, various light settings can be used for generating a plurality of templates.

According to a particularly preferred solution according to the invention, the templates are created in advance from one or more measurements of master parts of the plurality of workpieces or that the templates are synthetic images determined from the CAD data of the plurality of workpieces and preferably from the provision for the type of light set for the measurement of the particular workpiece, such as transmitted light, darkfield incident light, or brightfield incident light, and the light intensity, and the templates are associated with the specified data of the particular workpiece.

According to an embodiment of the invention, a plurality of templates are created for each workpiece from the plurality of workpieces, wherein the parameter of type of light, such as transmitted light, darkfield incident light, or brightfield incident light and/or the light intensity are varied and the parameters set for measuring the particular workpiece are provided for in the comparison of the image or overall image with the templates.

After the associated template and thereby the relevant workpiece and the location thereof have been identified by means of correlation analysis, the comparison of the specified and actual data, such as dimensions of features, should then take place. To this end, the features must be extracted from the recorded image or overall image. Because the specified location of the features is known from the specified data, corresponding measurement windows can be set automatically in an image aligned to the template and thus also to the drawing data.

It is therefore preferably provided that a first at least rough fit of the image or overall image of the workpiece to the template is performed using the location of the particular workpiece determined by means of the correlation analysis, particularly the position, rotation, and mirroring.

The idea is particularly emphasized that only the parts of the image or the overall image associated with the location of the features and/or contours using the specified data are automatically provided for, preferably by automatically placing windows, for extracting the features and/or contours from the image or overall image, wherein the association is made using the first at least rough fit.

According to an embodiment of the invention, a plurality of images of segments of the workpiece are recorded in different relative positions between the sensor and the workpiece and are merged into an overall image, wherein the relative positions determined by means of measurement axes are preferably provided for when merging and preferably a uniform pixel raster is generated for the overall image by means of resampling.

Corresponding methods, for example, can be found in DE10341666 and DE102004058655, but also in DE10211760, to which reference is made in full.

In an independent solution according to the invention, the selection of the specified data associated with the particular workpiece is performed automatically in that all features and/or contours are automatically extracted from the image or overall image and are fit into all specified geometries of the plurality of eligible workpieces, and the specified data for which the greatest match is present during the fit are selected, particularly the least deviation from the specified geometries.

Said solution of the object of the invention thus uses known methods for automatically detecting features and/or contours from unknown images. Subsequently, rather than comparing the images themselves with the templates, the automatically detected features and contours are compared with the specified geometries known from the specified data. Said method is significantly more subject to false associations, but is faster for simple features.

The invention thus relates to a method for automatically determining geometric features and/or contours of an eligible workpiece from a plurality of workpieces by means of an optical sensor, preferably an image processing sensor, one or more images of the workpiece being recorded and optionally merged into an overall image, features and/or contours being extracted from the image or the overall image, a fit being performed between the extracted features and/or contours and the specified geometries of the features and/or contours, the specified geometries being taken from the specified data associated with the particular workpiece and preferably the tolerances of the features and/or contours present in said specified data being provided for during the fit, and the actual dimensions and/or the deviations from the specified geometries for the features and/or contours being made available, wherein the selection of the specified data associated with the particular workpiece is performed automatically in that all features and/or contours are automatically extracted from the image or overall image and are fit into all specified geometries of the plurality of eligible workpieces, and the specified data for which the greatest match is present during the fit are selected, particularly the least deviation from the specified geometries.

The method according to the invention is further characterized in that the method is applied in a coordinate measuring machine, preferably a multisensor coordinate measuring machine, together with additional sensors, preferably tactile, optical, tactile/optical, or computed-tomography sensors.

An independent invention relates to a device for dimensionally measuring geometric features and contours on workpieces by means of a multisensor system made of at least one optical and one tactile sensor, wherein the multisensor system is preferably used in a coordinate measuring machine.

In order to address as great a number of measurement tasks as possible, different sensors are often combined in one machine, such as a coordinate measuring machine. Optical sensors are used thereby, for example image processing sensors or optical distance sensors, tactile sensors such as measuring probes, or tactile/optical sensors such as are described in EP0988505 or DE 10 2010 060 833. The sensors are typically disposed adjacent to each other, for example on one or more rams of a coordinate measuring machine. The sensors thereby have different measurement locations or working points, that is, an offset (sensor offset), and therefore measure in the corresponding measurement position of the ram with respect to the workpiece at different points on the workpiece or different locations in the measurement volume of a coordinate measuring machine. This is disadvantageous in that the measurement range jointly usable by the sensors is limited and the measurement range of the machines may possibly need to be larger in design and therefore more expensive.

The sensor offset must be calibrated at a fixed point, for example the measurement location of a reference sensor, prior to measuring by means of the particular sensor, and must be considered when combining the measurement results of different sensors in a coordinate system. The greater the offset, the greater the errors that occur due to mechanically or thermally induced strains or bends.

The object is therefore always to integrate a plurality of sensors with each other so that said sensors measure at approximately the same position, that is, have common measurement locations or working points. It is further already advantageous if the measurement locations are identical in at least two directions, preferably the horizontal, so that only the third, vertical axes of motion and measurement must be correspondingly larger in design.

Corresponding integration of a plurality of sensors is known in the prior art for a plurality of optical sensors, for example a plurality of zoom stages of a zoom optic or selectively usable laser distance sensors integrated in the optic using the Foucault principle (also known as TTL lasers—through-the-lens lasers) or for combining with a tactile/optical sensor. A plurality of tactile sensors, particularly a plurality of probe inserts or measurement systems associated with the particular probe system, can also be interchangeably disposed for determining the probe deflection. Typically changeout interfaces are used, allowing automated changeout by using the axes of the coordinate measuring machine and placing in parking stations, or manual changeout by the operator. Corresponding changeout interfaces have magnetic connections, for example, and provide, in addition to the mechanical coupling, releasable electrical or optical connections between the various sensor heads or probe inserts and the measuring machine.

Not known, however, is a corresponding combination of optical sensors and conventional tactile sensors such as probes for coordinate measuring machines, such as are produced by the Renishaw plc company, for example.

The object of the present invention is to provide a multisensor system by means of which optical and tactile measurements can be performed using interchangeable sensors, wherein the disadvantages of the prior art are to be avoided.

The object is achieved in that a multisensor system is designed so that a plurality of optical and tactile sensors can be disposed so as to have a nearly common measurement location or the measurement locations of the sensors nearly lie in a straight line defined by the imaging direction or optical axis of the optical sensor or sensors and passing through the measurement location.

According to the invention, the various sensors can be integrated such that the measurement location at which the sensors record the measurement data of the workpiece is identical or nearly identical for as many sensors as possible, but at least various measurement locations lie on a line in the imaging direction of the optical sensors or on the optical axis.

In the context of the present invention, nearly identical or nearly common measurement locations is understood to mean that the locations at which the measurements are taken are identical or at least nearly identical, that is, only a few millimeters apart, preferably less than 10 mm apart, particularly preferably no greater than one millimeter apart. In the case of planar measuring optical sensors, such as image processing sensors, the measurement location is preferably the center of the planar measurement region, for example the center of the imaged sensor chip. For tactile sensors, the center of the probe element, for example the center of the probe sphere, or the extreme point such as the pole of the probe sphere facing toward the workpiece, defines the measurement location.

At least some considerations of said objects are thus substantially achieved by a multisensors system for measuring features and/or contours on a workpiece made of at least one optical and one tactile sensor, wherein at least some of the various sensor heads of the sensors can be interchangeably disposed in that the sensors can be disposed so as to have a nearly common measurement location, or the measurement locations of the sensors nearly lie on a straight line defined by the imaging direction or the optical axis of the optical sensor or sensors.

The idea is emphasized that the interchangeable sensor heads can be releasably connected to the multisensor system by means of at least one changeout interface, preferably a magnetic changeout interface, preferably automatically interchangeably by means of at least one parking station.

In a first preferred refinement according to the invention, the interchangeable sensor heads can be connected to the multisensor system by means of a first changeout interface and a first parking station, or by means of a second changeout interface and a second parking station provided by one or more adapters for disposing on the first changeout interface and interchangeable by means of the first parking station, wherein the adapter is preferably a rotary or tilting or rotary/tilting device.

By means of adapters it is particularly easily possible to connect the different sensor heads of different tactile sensors. Examples of tactile sensors are the TP200 switching probe system and the SP25 measuring probe systems from Renishaw plc. A probe system thereby typically comprises a permanently installed base element and an interchangeable probe head comprising the measuring system and interchangeable probe inserts in turn. The probe inserts typically comprise a plate, the probe pin, and the probe or contact element, or probe pin arrangements having a plurality of contact elements such as star probes. The probe inserts are interchangeably attached to the measurement system by means of the plate. The second changeout interface present at the adapters allows the measurement system, including the attached probe insert, that is, the probe head, to be changed out. The adapter thus already comprises the base element and the second changeout interface is thus copied from the already present interfaces of the particular tactile sensor for changing out the measurement system. Alternatively, the measurement system can also already be integrated in the adapter and the second changeout interface enables the probe insert to be changed out. The first changeout interface, in contrast, allows the particular adapter and thus the entire probe system to be set aside, for example in order to change in a tactile/optical sensor or an auxiliary lens for a permanently integrated optical sensor, or to measure solely by means of the optical sensor.

It is therefore further characteristic that the interchangeable sensor heads comprise tactile or tactile/optical probe elements, particularly different probe inserts and/or probe pines or probe pin arrangements such as star probes, wherein the sensor heads comprising different tactile probe elements can preferably be interchangeably connected to one of the adapters by means of the second parking station and the sensor heads comprising different tactile/optical probe elements are interchangeably disposed by means of the first changeout interface and by means of the first parking station.

The idea is particularly emphasized that a plurality of optical sensors are formed by a zoom optic, preferably a zoom optic having a working distance adjustable independently of the imaging scale, and/or a distance sensor such as a focus sensor or Foucault sensor or chromatic sensor integrated in the optic, and/or an auxiliary lens for disposing at the first changeout interface.

According to a particularly preferred solution according to the invention, an optical sensor comprising an optic is permanently integrated in the multisensor system and the first changeout interface is disposed on the object side in front of and/or all around the optic.

According to an embodiment of the invention, therefore, the multisensor system comprises brightfield illumination integrated in the optic and/or darkfield illumination disposed all around the optic.

It is preferably provided that the multisensor system and/or the one or more parking stations are integrated in a coordinate measuring machine, preferably in a multisensor coordinate measuring machine, together with additional sensors, such as tactile, optical, tactile/optical, or computed-tomography sensors.

It is further characteristic that a controller is associated with the multisensor system and preferably with the coordinate measuring machine and provides the calibrated sensor offset for the analysis automatically and independently of the sensor used, preferably in a common coordinate system.

An independent invention relates to a device and a method for tactile/optical measuring of geometric features and structures on a workpiece.

An independent invention further relates to interferometrically determining the vertical deflection of a contact shape element or a mark associated therewith emerging from a flexurally elastic probe extension.

Tactile/optical sensors are described in the following specifications of the applicant.

EP0988505 describes a method and a device wherein a probe element (first target mark) and optionally a further target mark emerge from a probe extension via a flexurally elastic shaft, the coordinates thereof when deflected being determined by means of an optical sensor.

A similar sensor is described in EP 1 071 921, wherein the contact force is adjusted by means of the rigidity of the flexurally elastic shaft, in that solely the bending length l is varied.

An opto-mechanical interface having an adjusting device for a corresponding sensor is described in EP 1 082 581.

DE 198 24 107 describes the use of a corresponding sensor for a surface profiling method.

A corresponding sensor is operated on a rotating or pivoting joint in DE 10 2004 022 314.

PCT/EP01/10826 describes coating a probe element or probe extension on the side facing away from the sensor in order to generate a luminous mark in the interior of the probe element by bundling the radiation reflected at the coating, said radiation being introduced into the interior of the shaft of the probe element or probe extension, the length thereof being measured, and a mark associated with the probe element and formed by a darkened region of the luminous shaft of the probe element.

DE 10 2010 060 833 describes a tactile/optical sensor wherein, in addition to determining the position of a contact shape element or at least a target mark associated therewith in the X and/or Y direction of the coordinate measuring machine using a first sensor such as an image processing sensor, a second sensor such as a distance sensor also determines the Z-direction, wherein at least one flexible connecting element is used for mounting the contact shape element and the target mark in a mounting element, said connecting element being penetrated by the beam path of the first sensor in the beam direction, wherein the at least one flexible connecting element is transparent and/or is severely defocused with respect to the first sensor. The distance sensor capturing the deflection in the Z direction (vertical direction) of the contact shape element or at least a target mark associated therewith is proposed to be an interferometer, particularly an absolutely measuring heterodyne interferometer. In a preferred solution, the measurement beam of the interferometer is thereby coupled into the flexurally elastic probe extension (fiber). Details on beam guiding, particularly for the reference beam path, are not explained. DE 10 2010 060 833 further proposes that the measurement beam of a distance sensor is reflected at a mark mounted on the sensor-side end of the flexurally elastic extension. The disadvantage occurs thereby that due to the bending of the fiber only one component of the vertical deflection is captured, but not the entire deflection, thus limiting the sensitivity. The association between the deflection of the contact shape element and the captured measured value of the distance sensor must therefore be calibrated. Measurement deviations thereby occur due to the potentially directionally dependent behavior of said association, wherein said behavior cannot be fully captured during calibration.

In a further solution, for example as disclosed in Andreas Ettemeyer: "New three-dimensional fiber probe for multi-sensor coordinate measurement", Opt. Eng. 51(8), 081502 (May 14, 2012); http://dx.doi.org/10.1117/1.OE.51.8.081502, direct interferometric measuring of the contact shape element is proposed in order to improve sensitivity. The measurement beam (laser light) coupled into the fiber is thereby output from the fiber by the contact shape element and is superimposed on the reference beam (and made to interfere) and the interference pattern thus produced (speckle) is analyzed. Two beam sources of different wavelength spectrum, particularly laser diodes having peak wavelengths of 635 nm and 675 nm, are preferably used in order to achieve an absolute measurement of the deflection or position of the captured contact shape element or the captured target mark. In the preferred solution shown for the construction of the optical beam path of the interferometric sensor coupled to the beam path of the image processing sensor used for determining the lateral deflection (X and Y directions), it is disadvantageous that the amount of light available is very low due to the total of four optical splitters. Particularly the splitter disposed directly ahead of the coupling of the measurement beam is passed through twice. The optical imaging of the image processing sensor further passes through said optical splitter and the amount of light thereof is thereby reduced. It is further disadvantageous that the superposition of the measurement and reference beams does not take place until after an imaging optic. Because only the measurement beam passes through the imaging optic, but the reference beam does not, different beam geometries are present and the interference produced is disturbed or at least not optimal. A complex and fixed construction also results for the beam guiding of the reference beam. Said construction requires a great deal of space and is further subject to drift effects, for example due to changes in temperature. It must be noted that the optical path length for the reference beam prior to the superposition with the measurement beam must correspond to the optical path length of the measurement beam, except for the coherence length of the beam used, in order to produce interferences. In order that particularly long probe extensions of greater than 20 mm, for example, or even greater than 100 mm in length can be used, for example in order to measure poorly accessible regions of the workpiece, correspondingly large optical path lengths must also be provided for the reference beam. A disadvantage of the fixed construction of the reference beam path is further that said path cannot be adapted to probe extensions having different lengths.

Full reference is made to the disclosed contents of all previously named specifications of the applicant and to the publication named above.

The fundamental object of the present invention is to avoid the disadvantages of the prior art or at least to reduce the effects thereof.

One object of the present invention is therefore to disclose an improved arrangement for directly interferometrically capturing the vertical deflection of a contact shape element emerging from a flexurally elastic extension, particularly enabling compact construction, even for large probe extensions of varying lengths, wherein drift effects due to beam guiding of the measurement and reference beams are reduced and wherein the amount of light available for analysis for the interferometric sensor (vertical Z direction) and for the image processing sensor (lateral X and Y direction) is increased.

A further object of the invention is to disclose a method by means of which a more precise measurement is made possible, even for large or variable lengths of the probe extension, particularly directly determining the vertical deflection of the contact shape element and optionally also determining the bending of the contact shape element. Further parameters such as the contact force or the direction of the contact force can be determined more precisely from the latter.

According to a first solution achieving at least part of the object according to the invention, a compact construction is achieved in that the optical splitting of the beam of the interferometric sensor into a measurement beam and a reference beam is performed by an optical splitting layer, for example a pellicle, that is, a film or mirror layer partially transparent and partially reflective on both sides, disposed directly above the side of the probe extension facing away from the workpiece, that is, on the probe extension side on the side further away from or facing away from the contact element. Said splitting layer is also used for deflecting the reference beam reflected back by a reference mirror on the side of the probe extension facing away from the workpiece into the optical axis or parallel or at an angle to said axis, that is, in the direction of the analysis unit, such as a camera, of the distance sensor. The advantage thereof in comparison with the prior is that the number of splitting layers has been reduced. The amount of light for the distance sensor and for the optically laterally measuring sensor is thereby increased.

It can further be provided that particularly the dimensions transverse to the optical axis of the optically laterally measuring sensor used are kept small, in that the reference beam is deflected, for example in the direction of the optical axis or at an angle thereto, optionally deflected a plurality of times (folded). The corresponding deflecting means, such as a mirror, together with the reference mirror form the reference beam path. This is particularly advantageous if large lengths are to be achieved for the probe extension, whereby correspondingly long optical paths are require for the reference beam path.

At least some considerations of the objects are thus substantially achieved by a device for determining geometric features and structures on a workpiece, said device comprising at least a laterally measuring optical sensor, preferably an image processing sensor, a vertically measuring interferometric distance sensor, and an at least partially flexurally elastic probe extension, at least the following emerging from the probe extension: a contact shape element for deflecting together with the probe extension when contacting the workpiece and preferably a target mark associated with the contact shape element for deflecting together with the probe extension when the contact shape element contacts the workpiece, wherein the lateral deflection of the contact shape element or the target mark perpendicular to the optical axis of the laterally measuring optical sensor can be determined by means of said sensor and the vertical deflection along or nearly along the optical axis of the laterally measuring optical sensor can be determined by means of the distance sensor, wherein the measurement beam of the interferometric distance sensor can be coupled into the probe extension and emitted by the contact shape element or the associated target mark and can be superimposed on the reference beam of the interferometric distance sensor and the interferences (speckle) thus produced can be analyzed, and wherein the device is characterized in that an optical splitting layer is disposed on the probe extension side on the far side with respect to the contact shape element and is penetrated by the optical axis of the laterally measuring optical sensor, particularly spaced apart from the probe extension, such that the optical splitting layer is implemented for splitting the measurement beam and reference beam, such that the splitting layer deflects the reference beam reflected by a reference mirror in a direction
    parallel to, or
    at an angle to, or
    along the optical axis of the laterally measuring sensor with respect to the side facing away from the contact shape element,
wherein one or more reflectors are disposed optionally between the splitting layer and the reference mirror and together with the reference mirror form a reference beam path, wherein the reference beam can preferably be deflected into a direction parallel to the optical axis or into a direction at an angle to the optical axis of the laterally measuring sensor.

According to a second alternative solution, at least part of the object is achieved according to the invention in that a compact construction is achieved in that the optical splitting of the beam of the interferometric sensor into a measurement beam and a reference beam is performed by an optical splitting layer also disposed directly above the side of the probe extension facing away from the workpiece, that is, on the probe extension side on the side further away from or facing away from the workpiece with respect to the contact element, but is disposed laterally spaced far enough apart from the optical axis of the optically laterally measuring sensor so as to be outside of the beam path of the optically laterally measuring sensor. The splitting thus occurs prior to entry into the aperture of the image processing sensor, and the beam path thereof is thereby not split by the splitting layer, thereby increasing the amount of light available. Splitting outside of the optical axis does necessarily mean, however, that the measurement beam still must be deflected once more in the direction of the probe extension in order to be coupled into the probe extension on the side facing away from the workpiece. To this end, a deflecting device is provided comprising a surface implemented as a reflector such as a mirror. A second surface is preferably present on said deflecting device and brings about the deflecting of the reference beam in the direction of the analysis unit such as a camera of the distance sensor after said beam has travelled the reference beam path. The analysis unit is preferably present on the side of the probe extension facing away from the workpiece, particularly in the direction of the optical axis or parallel to the direction of the optical axis or at an angle to the direction of the optical axis. A corresponding deflection generally is performed by at least two reflectors. A first reflector is necessary in order to deflect the reference beam running after splitting at the splitting layer along a path in the direction of the optical axis adjusted to correspond to the length of the probe extension. The second or last reflector brings about the deflection in the direction of the analysis unit. Depending on the length of the probe extension, as is also the case for the first solution according to the invention, further reflectors can be disposed in the reference beam path in order to fold the same, that is, to achieve large path distances in a small space. This is advantageous primarily if probe extensions having different lengths are to be interchangeable in design together with the reference arm. The reflectors in the reference beam can thereby be disposed in many potential variants so that the reference beam runs in one or more directions parallel to the optical axis or at an angle to the optical axis. The reflectors, other than the last one, are thereby disposed laterally adjacent to the optical beam path of the optically laterally measuring sensor in order to avoid disturbing said beam path.

At least some considerations of the objects are thus also substantially achieved by a device for determining geometric features and structures on a workpiece, said device comprising at least a laterally measuring optical sensor, preferably an image processing sensor, a vertically measuring interferometric distance sensor, and an at least partially flexurally elastic probe extension, at least the following emerging from the probe extension: a contact shape element for deflecting together with the probe extension when contacting the workpiece and preferably a target mark associated with the contact shape element for deflecting together with the probe extension when the contact shape element contacts the workpiece, wherein the lateral deflection of the contact shape element or the target mark perpendicular to the optical axis of the laterally measuring optical sensor can be determined by means of said sensor and the vertical deflection along or nearly along the optical axis of the laterally measuring optical sensor can be determined by means of the distance sensor, wherein the measurement beam of the interferometric distance sensor can be coupled into the probe extension and emitted by the contact shape element or the associated target mark and can be superimposed on the reference beam of the interferometric distance sensor and the interferences (speckle) thus produced can be analyzed, and wherein the device is characterized in that an optical splitting layer is disposed on the probe extension side on the side facing away from the contact shape element and adjacent to the beam path of the laterally measuring optical sensor, that the splitting layer is implemented for splitting the measurement beam and reference beam, that the measurement beam can be deflected in the direction of the probe extension after passing through the splitting layer by means of a reflector present on a first surface of a deflecting device, and that the reference beam can be deflected by means of at least two reflectors for forming at least part of the reference beam path in a direction that is
- parallel to, or
- at an angle to, or
- along the optical axis of the laterally measuring sensor with respect to the side facing away from the contact shape element, wherein the last acting reflector is preferably provided on a second surface of the deflecting device, and wherein the reference beam preferably runs between the at least two reflectors in one or more directions parallel to the optical axis or at an angle to the optical axis of the laterally measuring sensor.

According to a further embodiment of the invention, the plurality of reflectors are disposed adjacent to each other or laterally adjacent to the optical beam path of the optically laterally measuring sensor for deflecting the reference beam, with the exception of the last acting reflector or the splitting layer.

As a refinement of this idea, a device is provided wherein a target mark implemented as a reflector is mounted on the side of the probe extension facing away from the contact shape element and the vertical deflection of the target mark can be captured by means of the beam path of a further distance sensor such as a Foucault laser sensor or focal sensor, preferably in that the last acting reflector or splitting layer is implemented such that less than the entire aperture of the beam path of the further distance sensor is covered.

The measurement beam associated with the further distance sensor thereby runs laterally about the splitting layer or laterally about the deflecting device comprising the reflector passed through last, and is therefore not completely shadowed. By means of said construction it is additionally possible to measure the deflection of the contact shape element indirectly. The comparison with the deflection measured by the interferometric sensor can be used for evaluating the bending of the probe extension and optionally the contact force, or for calibrating the further distance sensor.

According to a particularly preferred solution according to the invention, the interferometric distance sensor comprises one or more beam sources and the beam thereof is coupled in the direction of the optical splitting layer perpendicular to or nearly perpendicular to the optical beam path, wherein the guiding of the beam between the beam source and the coupling point preferably occurs by means of optical fibers.

The beam sources can thereby be constructed spaced apart, wherein optical fibers or optical waveguides are preferably used, or near the optical splitter and forming a unit at least with the same, said unit being interchangeable, for example. In the second case, only the signals for electrically actuating must be transmitted into the unit from outside.

It is further characteristic that the interferometric distance sensor comprises two beam sources having different wavelength spectra, wherein the beam sources are preferably laser diodes.

The absolutely measuring heterodyne methods known from the prior art can thereby be applied.

According to a further preferred embodiment of the invention, at least the one reflector, the splitting layer, the probe extension, and optionally the reference mirror form a unit or are disposed in a device such as a housing or mounting element for forming a unit, said unit being manually and/or automatically interchangeable by means of a changeout interface, preferably a magnetic changeout interface, connected directly or indirectly to the laterally measuring optical sensor, preferably to an optic associated with the laterally measuring optical sensor, wherein the changeout interface preferably further comprises a coupling location for guiding in the beam of the interferometric distance sensor, or a coupling location for electrically actuating the one or more beam sources of the interferometric distance sensor integrated in the unit.

It is thereby made possible using particularly simple means to use different probe extensions, particularly probe extensions having different lengths, in a preferably automatic measurement sequence. Each unit thereby comprises a reference beam path adapted to the particular probe extension and thus changed out with said unit. Units not in use are placed in known changeout stations for coordinate measuring machines, for example.

The idea is particularly emphasized that the tactile/optical sensor is integrated in a coordinate measuring machine, preferably a multisensor coordinate measuring machine, together with additional sensors, preferably tactile, optical, or computed-tomography sensors.

The present invention further relates to a method for determining geometric features and structures on a workpiece, preferably by means of the device according to the invention.

The object of the invention is thus achieved by means of a method for determining geometric features and structures on a workpiece by means of a tactile/optical sensor comprising at least a laterally measuring optical sensor, preferably an image processing sensor, a vertically measuring interferometric distance sensor, and an at least partially flexurally elastic probe extension, at least the following emerging from the probe extension: a contact shape element deflecting together with the probe extension when contacting the workpiece, and preferably a target mark associated with the contact shape element and deflecting when the contact shape element contacts the workpiece, the lateral deflection of the contact shape element or of the target mark perpendicular to the optical axis of the laterally measuring optical sensor being captured by means of the same, and such that the vertical deflection of the contact shape element or of the target mark along the optical axis of the laterally measuring optical sensor can be captured by means of the distance sensor, the measurement beam of the interferometric distance sensor being coupled into the probe extension and being emitted by the contact shape element or the associated target mark and superimposed with the reference beam of the interferometric distance sensor, and the interferences (speckle) arising thereby being analyzed, characterized in that an optical splitting layer is disposed on the probe extension side on the far side with respect to the contact shape element and is penetrated by the optical axis of the laterally measuring optical sensor, particularly spaced apart from the probe extension, such that the optical splitting layer is implemented for splitting the measurement beam and reference beam, such that the reference beam reflected by a reference mirror is deflected by the splitting layer in a direction
- parallel to, or
- at an angle to, or
- along the optical axis of the laterally measuring sensor with respect to the side facing away from the contact shape element, wherein optionally one or more deflections of the reference beam path occur between the splitting layer and the reference mirror by means of one or more reflectors forming a reference beam path together with the reference mirror, wherein preferably the reference beam is deflected preferably in a direction parallel to the optical axis or in a direction at an angle to the optical axis of the laterally measuring sensor.

At least some of the objects of the invention are thus achieved by means of an alternative method for determining geometric features and structures on a workpiece by means of a tactile/optical sensor comprising at least a laterally measuring optical sensor, preferably an image processing sensor, a vertically measuring interferometric distance sensor, and an at least partially flexurally elastic probe extension, at least the following emerging from the probe extension: a contact shape element deflecting together with the probe extension when contacting the workpiece, and preferably a target mark associated with the contact shape element and deflecting when the contact shape element contacts the workpiece, the lateral deflection of the contact shape element or of the target mark perpendicular to the optical axis of the laterally measuring optical sensor being captured by means of the same, and such that the vertical deflection of the contact shape element or of the target mark along the optical axis of the laterally measuring optical sensor can be captured by means of the distance sensor, the measurement beam of the interferometric distance sensor being coupled into the probe extension and being emitted by the contact shape element or the associated target mark and superimposed with the reference beam of the interferometric distance sensor, and the interferences (speckle) arising thereby being analyzed, wherein an optical splitting layer is disposed on the probe extension side on the far side with respect to the contact shape element and adjacent to the beam path of the laterally measuring optical sensor, such that the optical splitting layer is implemented for splitting the measurement beam and reference beam, such that the measurement beam is deflected in the direction of the probe extension by means of a reflector present on a first area of a deflecting device after passing through the splitting layer, and that the reference beam is deflected by means of at least two reflectors for forming at least one part of the reference beam path in a direction
- parallel to, or
- at an angle to, or
- along the optical axis of the laterally measuring sensor with respect to the side facing away from the contact shape element, wherein a second area of the deflecting device is preferably used as the last acting reflector, and wherein the reference beam runs between the at least two reflectors in one or more directions parallel to the optical axis or at an angle to the optical axis of the laterally measuring sensor.

According to a preferred refinement of the invention, the vertical deflection of a side of a target mark additionally implemented as a reflector mounted on a side of the probe extension facing away from the contact shape element is captured by means of the beam path of a further distance sensor, such as a Foucault laser sensor or focus sensor, and the flexion of the probe extension and/or the magnitude and/or the direction of the contact force is preferably determined from the measured values of the interferometric distance sensor and the measured values of the further distance sensor, wherein an area is preferably used as the reflector passed through last or as the splitting layer and is implemented such that less than the entire aperture of the beam path of the further distance sensor is covered.

According to a particularly preferred solution according to the invention, the reference beam is deflected by means of a plurality of reflectors, wherein, except for the reflector passed through last or the splitting layer, the reflectors are disposed adjacent to each other or laterally adjacent to the optical beam path of the optically laterally measuring sensor.

According to an embodiment of the invention, therefore, the beam of the one or more beam sources of the interferometric distance sensor is coupled in the direction of the optical splitting layer perpendicular to or nearly perpendicular to the optical beam path, wherein the guiding of the beam between the beam source and the coupling point preferably occurs by means of optical fibers.

It is preferably provided that two beam sources having different wavelength spectra, preferably laser diodes, are used for the interferometric distance sensor, and absolute values are preferably determined for the deflection or position of the captured contact shape element or the captured target mark.

It is further characteristic that different units, each made of the reflectors forming the reference beam, the splitting layer, and the probe extension, and optionally the reference mirror, are changed out manually and/or automatically by means of a changeout interface, preferably a magnetic changeout interface, wherein the different units each comprise a different probe extension, particularly a probe extension having a different length, and a correspondingly adapted reference beam path, particularly a reference beam path having a different length, and preferably correspondingly adapted positions and/or quantity of reflectors.

The idea is particularly emphasized that the tactile/optical sensor is used in a coordinate measuring machine, preferably a multisensor coordinate measuring machine, together with additional sensors, preferably tactile, optical, or computed-tomography sensors.

An independent invention relates to a method for non-contacting measuring of geometric features and contours on workpieces by means of at least one optical and/or at least one computed tomography sensor in a coordinate measuring machine.

In particular, the invention relates to merging a plurality of images of a workpiece recorded by means of an optical sensor such as an image processing sensor, for example by means of a camera.

Recording a plurality of images of a workpiece or a region by means of an optical sensor such as an image processing sensor and merging said plurality of recorded individual images into an overall image, said overall image then being analyzed, is described for example in DE10341666. Resampling methods are also used, for example, as described in DE 102004058655, in order to generate a uniform pixel raster for the merged overall image. Reference is made in full to the contents of both specifications. In both of said specifications of the applicant, a solution for precisely merging the individual images is disclosed wherein the location of the individual images relative to each other is determined in that the positions of the drives for implementing the relative motion between the workpiece and sensor are determined by means of scales. Corresponding scale systems are expensive and the effort required for receiving and processing the scale signals is high.

An alternative solution for merging individual images into an overall image is known to the person skilled in the art as stitching. The fact that overlapping recorded individual images comprise the same image regions of the workpiece is thereby utilized. Said regions are associated by means of correlation determination. A prerequisite for a good correlation, however, is that sufficient structures are present in the overlapping regions. Said method is therefore disadvantageous in that no merging can take place unless sufficient contrast and easily associated structures are present in the particular overlapping regions, so that the imaged workpiece is correspondingly structured. This cannot always be ensured, however, such as for homogenous or reflective workpiece surfaces.

An object of the present invention is to enable simple and rapid merging of individual images of a workpiece having any arbitrary surface into an overall image without using scale systems for determining the location of the individual images relative to each other.

Said object is achieved in that a reference such as structures is mounted on the measurement bench on which the workpiece is placed or on a mounting element receiving the workpiece, for example, said reference being at least partially captured when recording the individual images of the workpiece. The location of said reference or structures in the individual images is used for determining the location of the individual images relative to each other, whereby precise merging of the individual images is made possible.

At least some considerations of said objects are substantially achieved in that the location of the individual images to each other is determined in that structures mounted on the measurement bench are captured in the individual images and the location of the structures is determined.

The invention thus relates to a method for measuring geometric features and/or contours on a workpiece disposed on a measuring table by means of an optical sensor, preferably an image processing sensor, wherein a plurality of single images of the workpiece or of a region of the workpiece are recorded at different relative positions between the workpiece and the sensor and are merged into an overall image, wherein the location of the single images to each other corresponding to the relative positions are provided for when merging, and the features and/or contours are extracted from the overall image, wherein the location of the individual images to each other is determined in that structures mounted on the measurement bench are captured in the individual images and the location of the structures is determined.

In order that at least part of the structure can be captured in all individual images, regardless of the size and shape of the workpiece, the structures are preferably mounted in the edge region of the measurement bench not covered by the workpiece. The distribution of the individual images is thereby limited, such that each individual image must capture at least part of the edge region of the measurement bench. In at least one direction, therefore, only a maximum of two adjacent individual images can be recorded, wherein any arbitrary number of individual images can be recorded in the direction perpendicular thereto.

The idea is therefore emphasized that the structures in the edge region of the measuring table are captured and a maximum of two single pictures are recorded adjacent to each other in a first direction and an arbitrary number of single pictures are recorded in a second direction perpendicular to the first direction.

Said conditions are intended to ensure that a region of the structures or reference is captured in each image.

The images themselves are recorded in a plane.

The individual two-dimensional images are recorded in transmitted light and/or incident light.

Two potential interpretations can be understood for the location of the structure in the context of the invention. In a first variant, the position of a part of the structure, namely the part of the structure captured in an individual image in each case is understood with respect to an absolute location of the overall structure or structures. To this end, the overall structure is fully captured and saved in advance. This can be done, for example, by means of an image processing sensor preferably recording a plurality of individual images of the measurement bench, particularly of the structures. The positions taken by the image processing sensor when recording are thereby determined, for example in that the image processing sensor is integrated in a coordinate measuring machine having measurement axes, in order to compose a precise overall image. The measurement bench is thereby measured by means of a different coordinate measuring machine, for example, prior to being installed in a coordinate measuring machine according to the present invention. The location of each part of the structure in a coordinate system is thereby known and thus the location of different parts relative to each other is also known. For the actual measurement, a particular part of the structure is recorded in each case. Said part must be detected again in the previously recorded overall image. This is done by means of correlation methods, for example. It must thereby be noted that the rough position of the structure on the measurement bench, that is, the rough position of the individual image in each case, is typically already known, so that the correlation must be examined in only a part of the prior image. Otherwise the structures must be unique patterns and not be repeated.

In a second variant, the position of a part of the structure, namely the part of the structure captured in each individual image, is understood simply with respect to the part of the structure present in the adjacent recorded individual images. To this end, it is necessary that adjacent individual images overlap each other, whereby parts of the structure are also uniformly present in adjacent individual images. By means of correlation, the identical parts of the structure can be detected and the relative location of the adjacent individual images can be determined therefrom.

According to a first preferred refinement of the invention, the location of the structures on the measuring table is determined prior to measuring the workpiece, for example by recording a plurality of images by means of an image processing sensor, the positions thereof being determined when recording the images, and that the current location relative to the location of the structures determined beforehand is determined by means of a correlation method when measuring the workpiece.

According to a second preferred refinement of the invention, adjacent single images at least partially overlap each other and the location of the structures in the single pictures relative to each other is determined by means of a correlation method.

It is further characteristic that the structures are patterns such as bars or other geometric shapes, preferably non-repeating patterns, disposed at least in the edge regions of the measuring table, preferably along the entire edge region of the measuring table.

A corresponding device is further provided for implementing the method according to the invention.

The invention thus further relates to a device for measuring geometric features and/or contours on a workpiece, at least comprising a measuring table on which the workpiece can be disposed and an optical sensor, preferably an image processing sensor, and means for relative displacement between the workpiece and the sensor, for recording and saving a plurality of single images of the workpiece or a region of the workpiece, merging into an overall image, and analyzing the overall image, and means for extracting features and/or contours from the overall image.

At least some considerations of the object of the invention are achieved in that structures, particularly patterns such as bars or other geometric shapes, preferably non-repeating patterns, are disposed on the measuring table at least in the edge regions of the measuring table, preferably along the entire edge region of the measuring table, and that the patterns can be captured by means of the optical sensor.

The method according to the invention and the device according to the invention are further characterized in that use or integration in a coordinate measuring machine takes place, preferably a multisensor coordinate measuring machine, together with additional sensors, preferably tactile, optical, tactile/optical, or computed-tomography sensors.

Further details, advantages, and features of the invention arise not only from the claims, the features to be found therein—as such and/or in combination—but also from the following description of the drawings.

Figure 2:
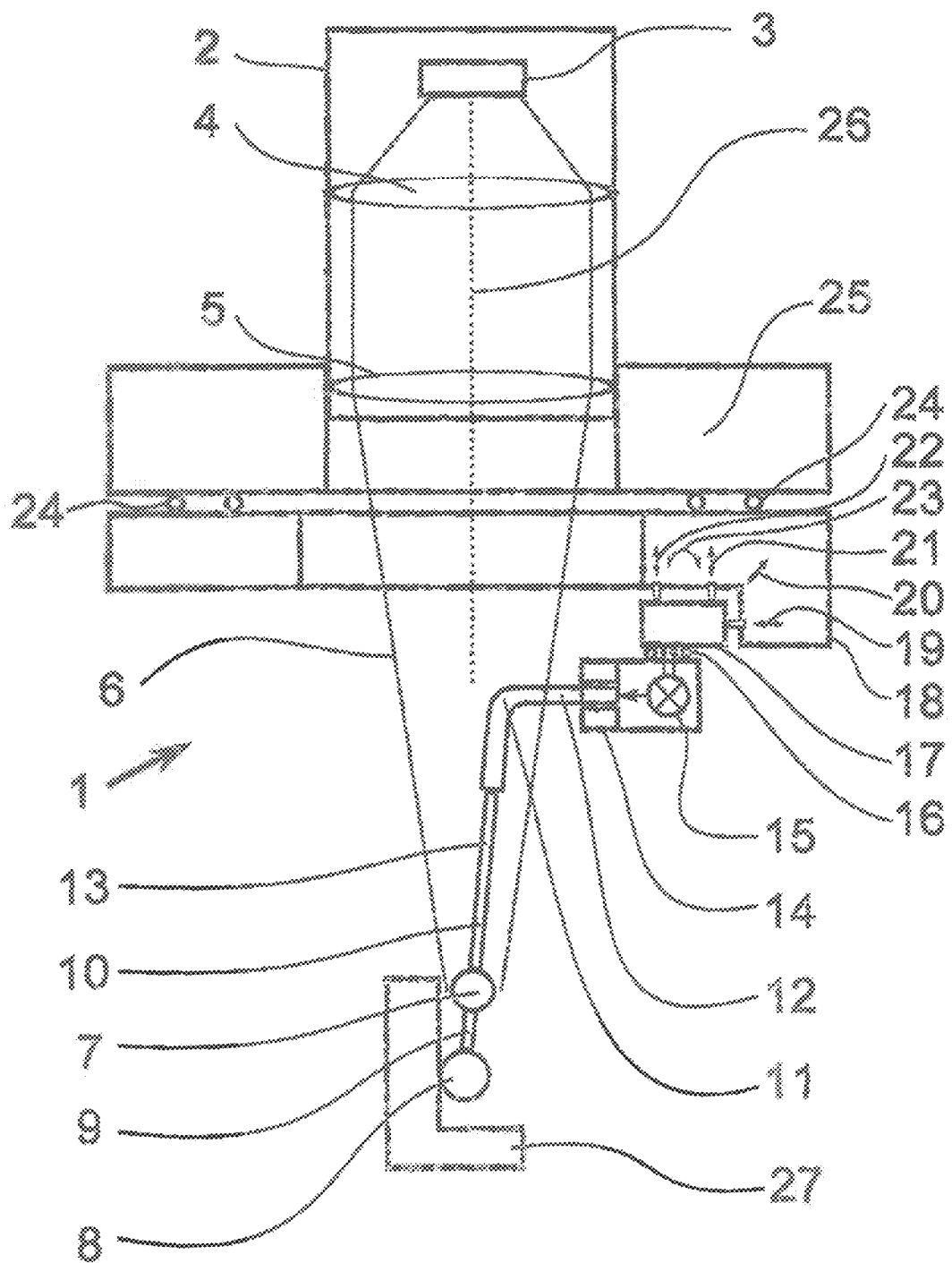
Figure 3:
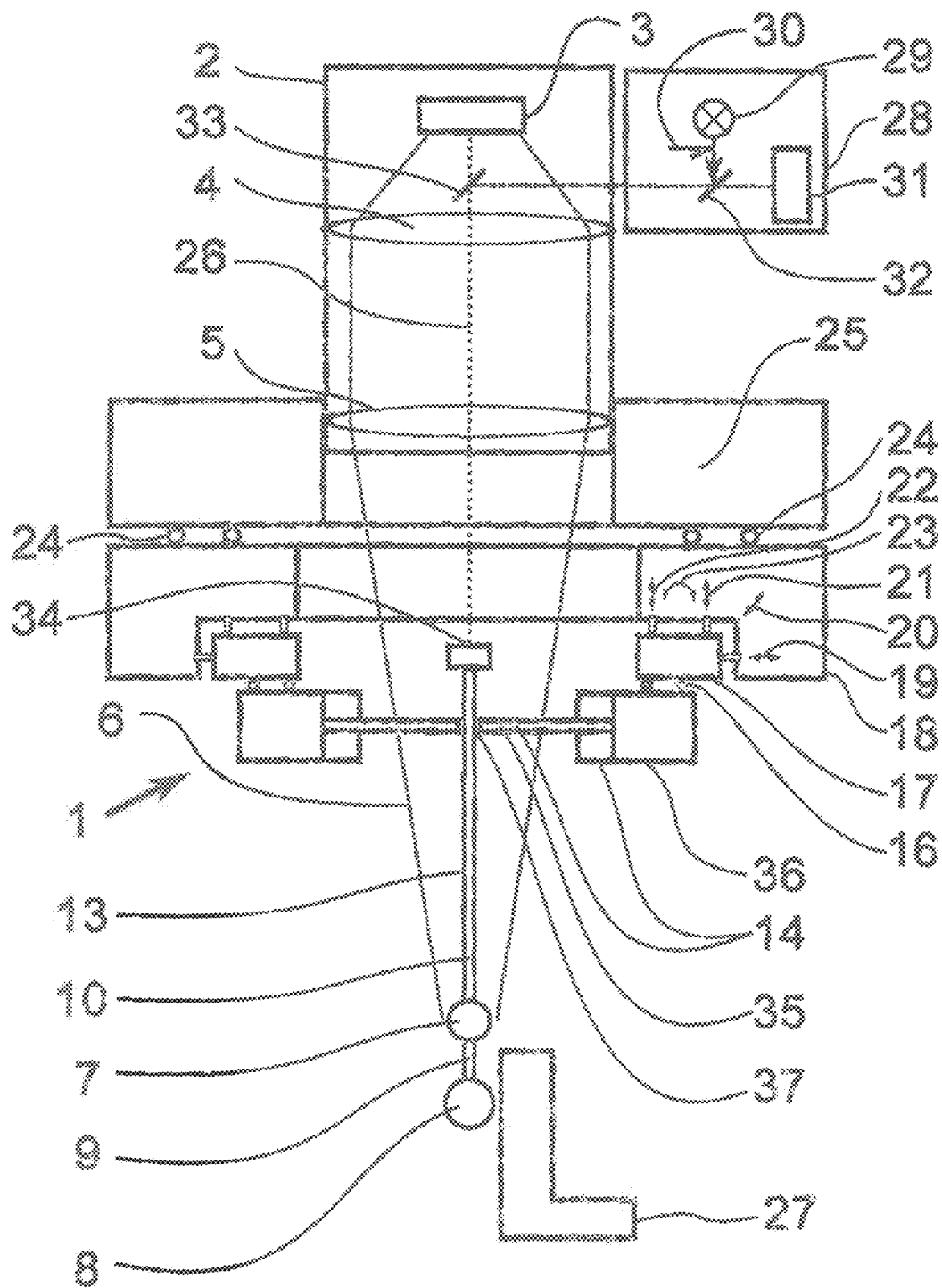
Figure 4A:
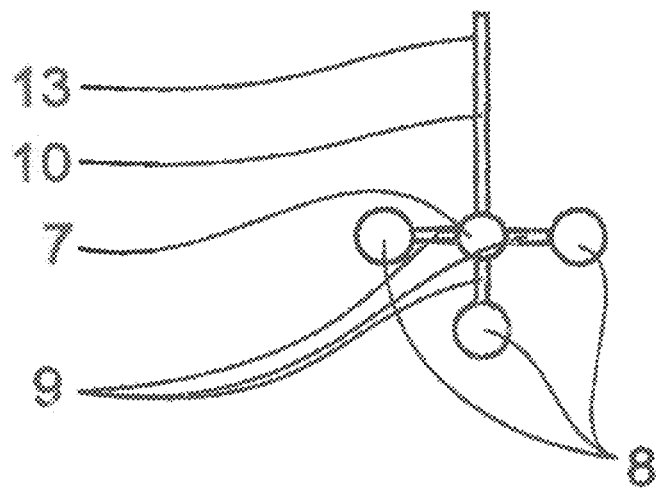
Figure 5A:
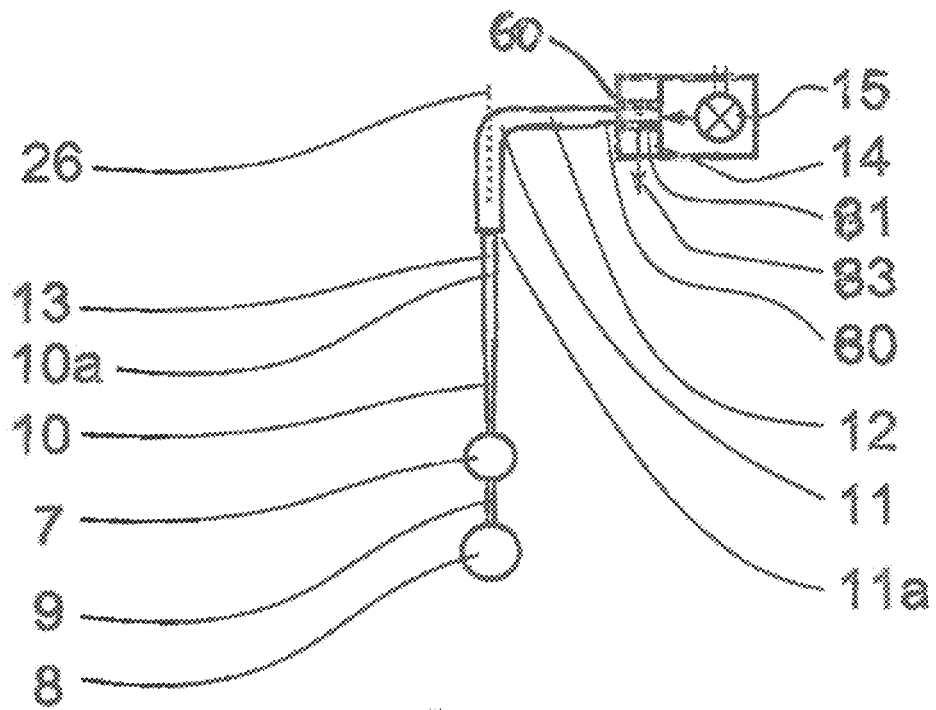
Figure 6:
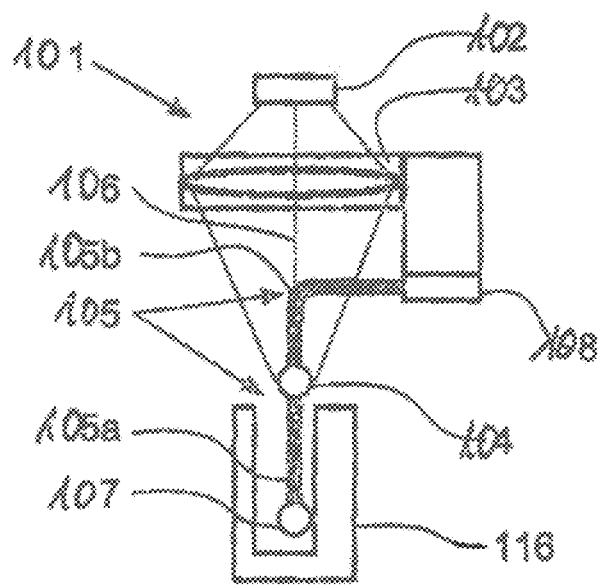
Figure 7A:
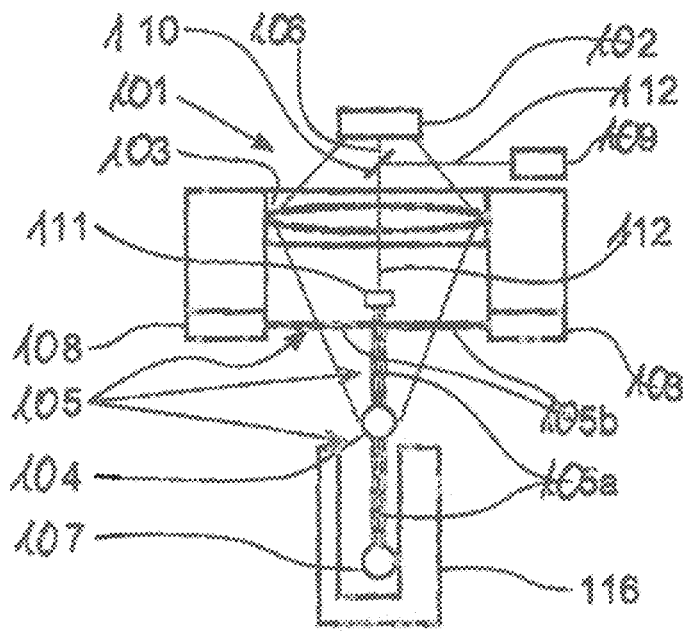
Figure 7B:
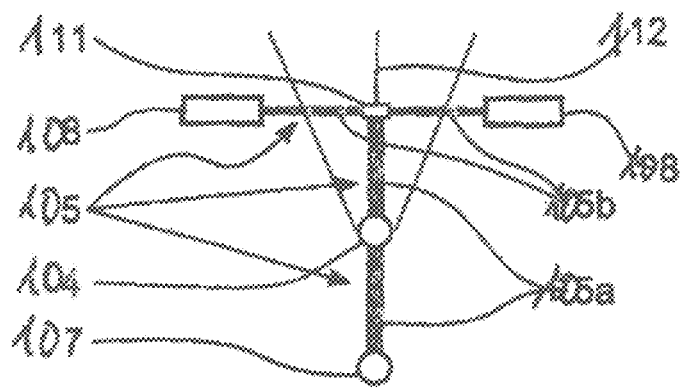
Figure 7C:
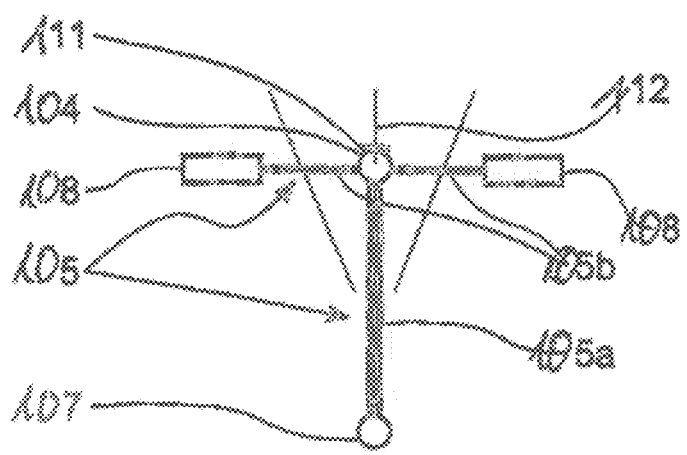
Figure 7D:
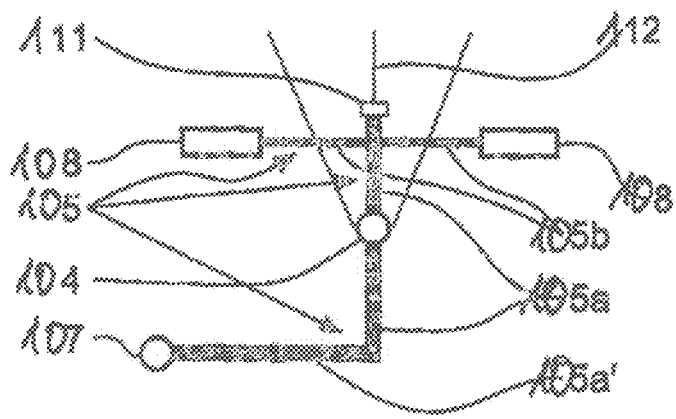
Figure 7E:
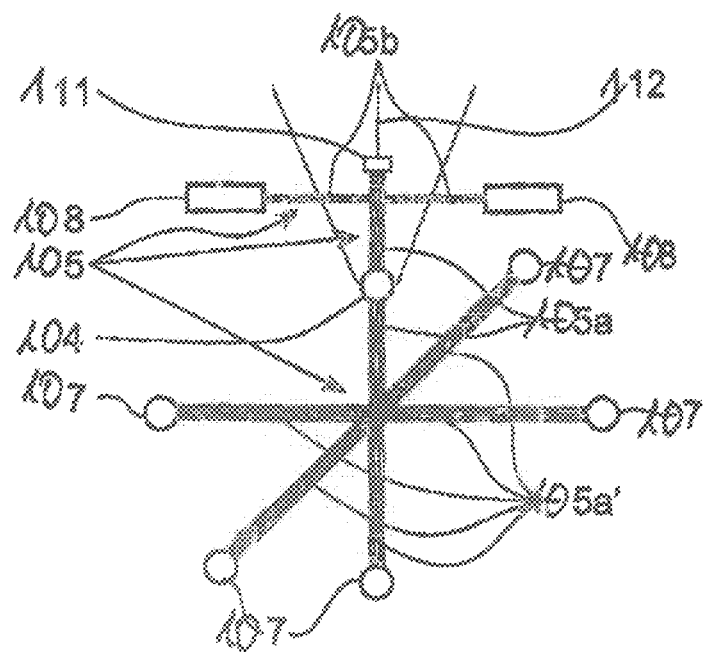
Figure 8:
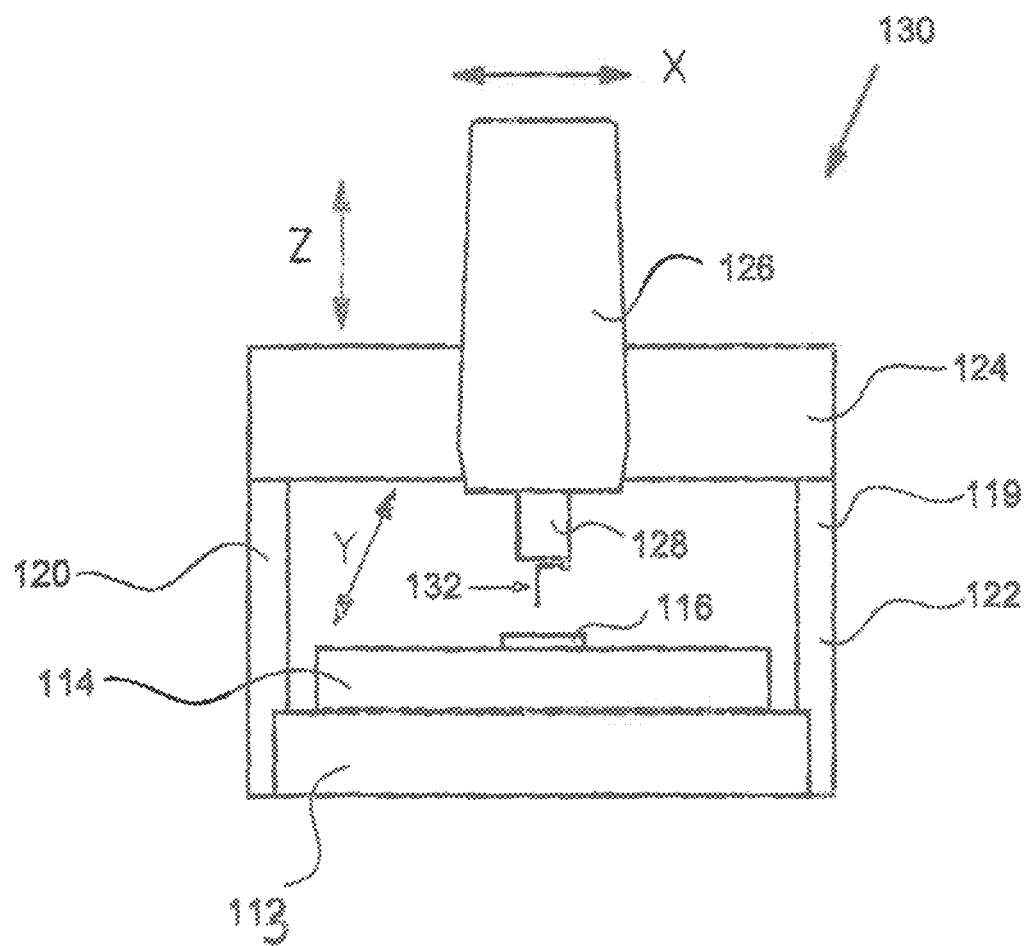
Figure 3:
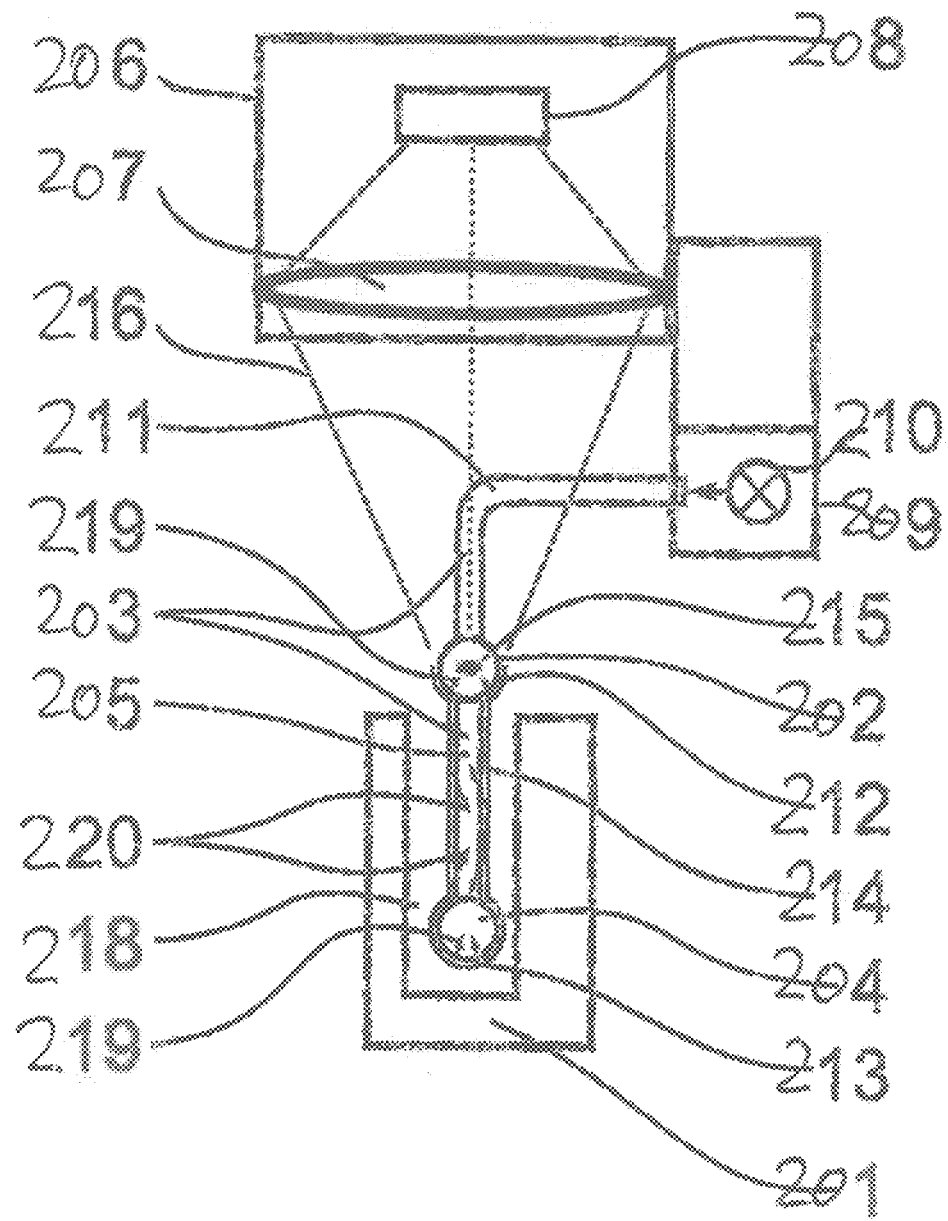
Figure 10:
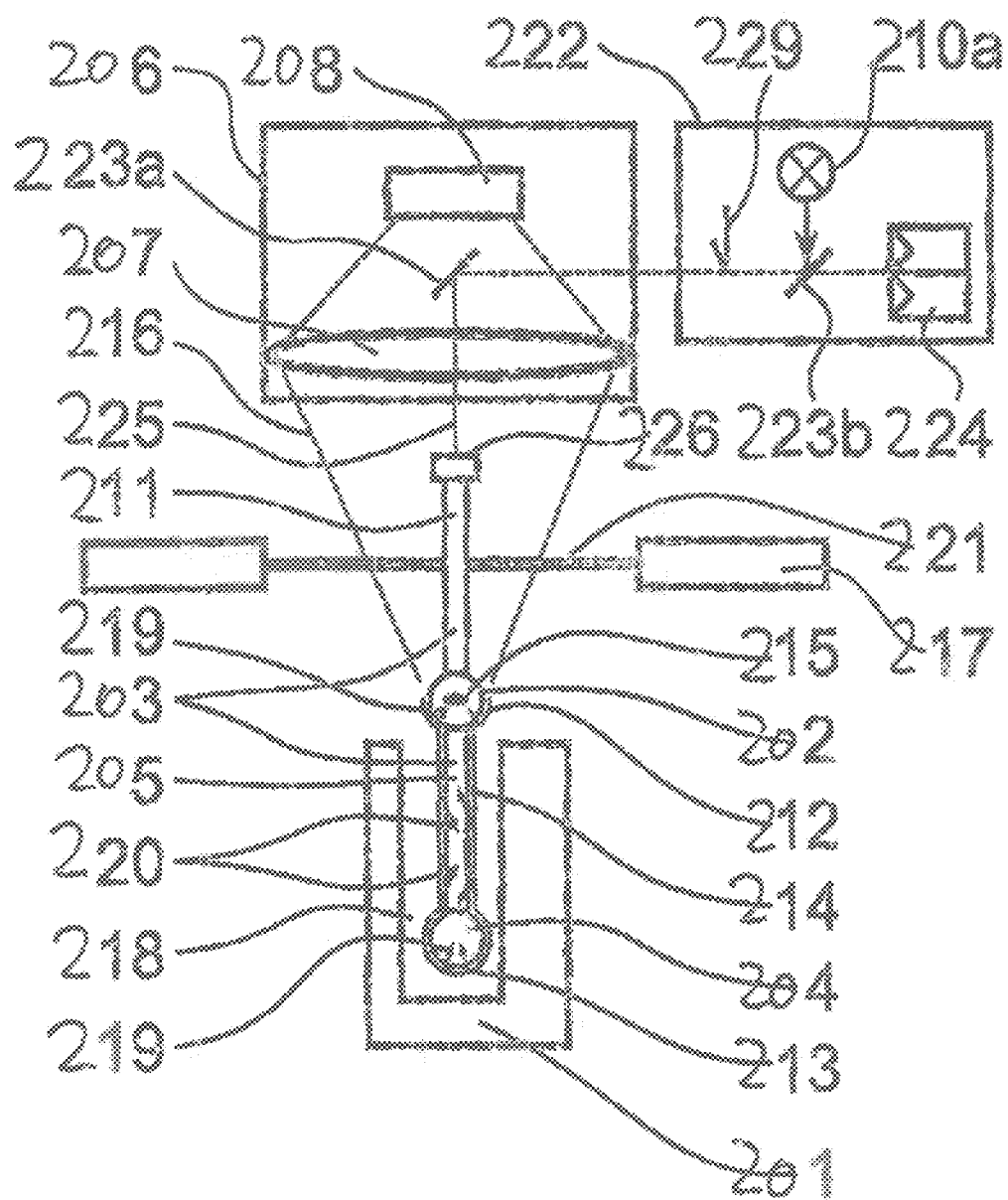
Figure 11:
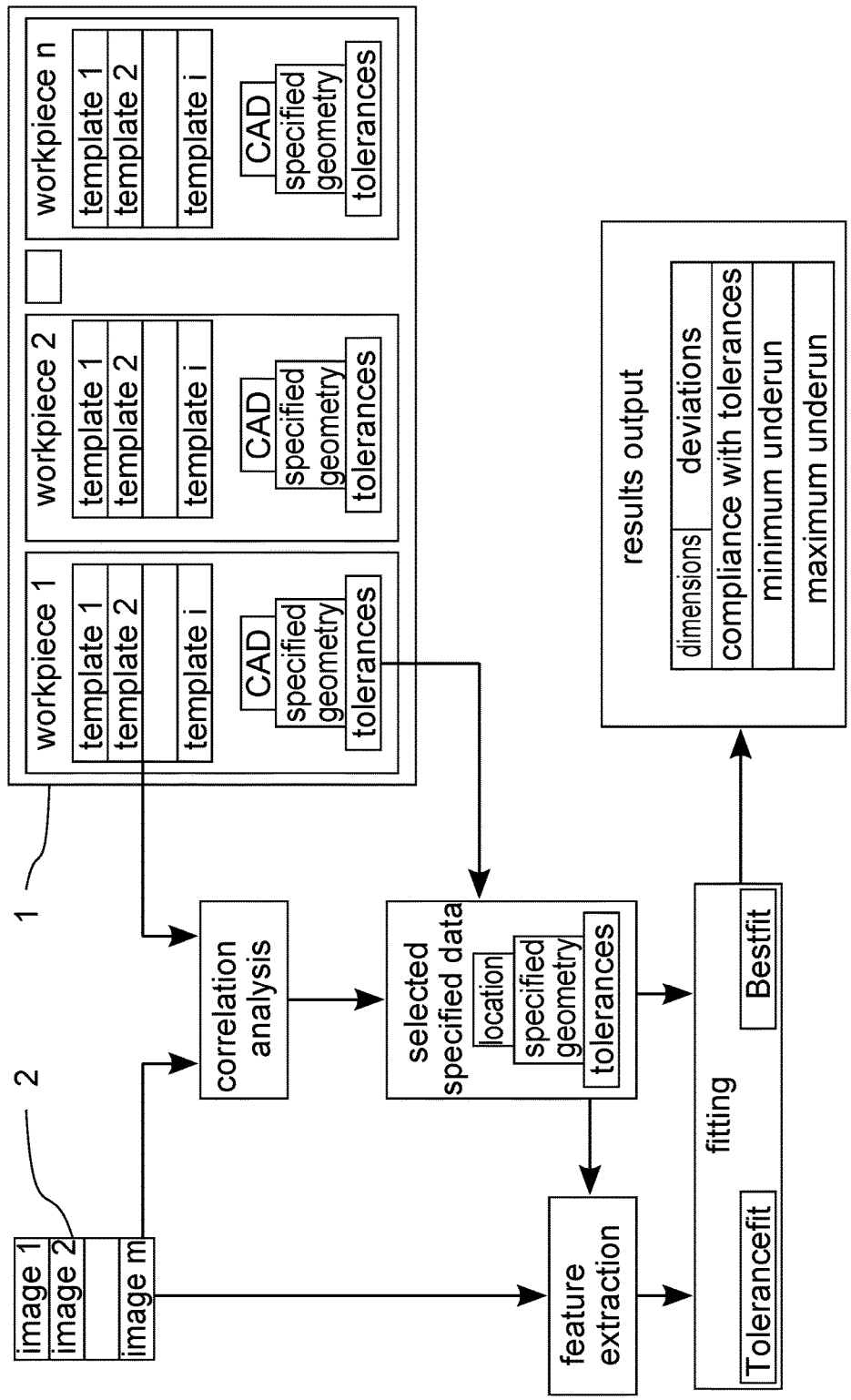
Figure 12:
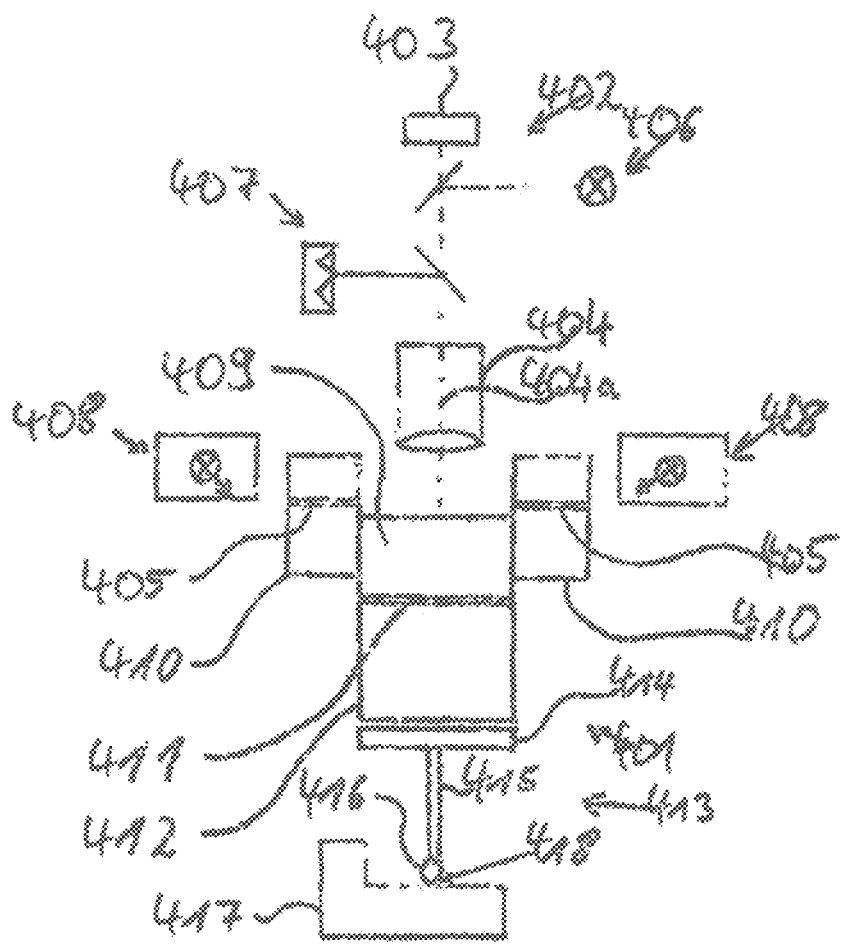
Figure 13:
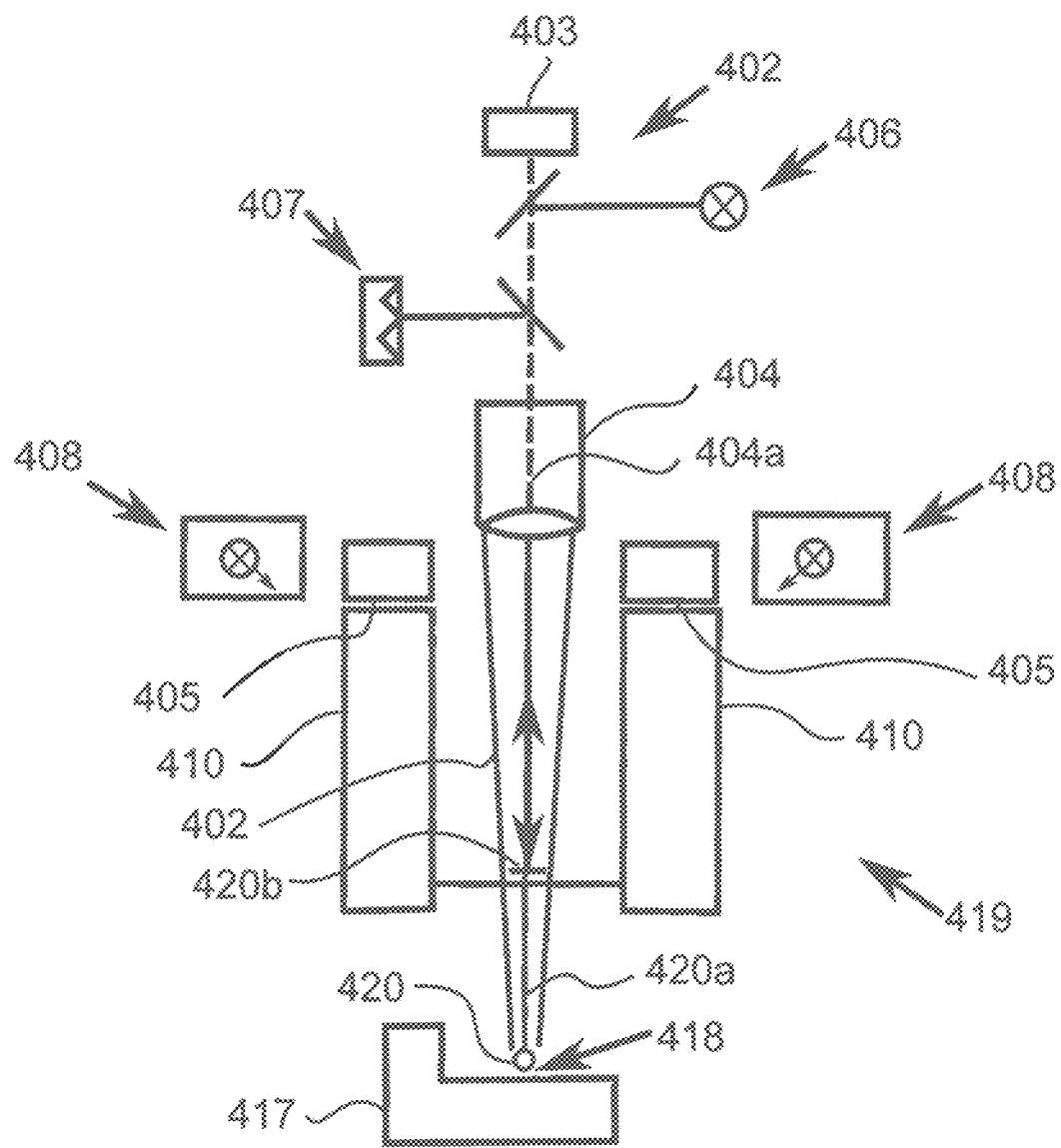
Figure 14:
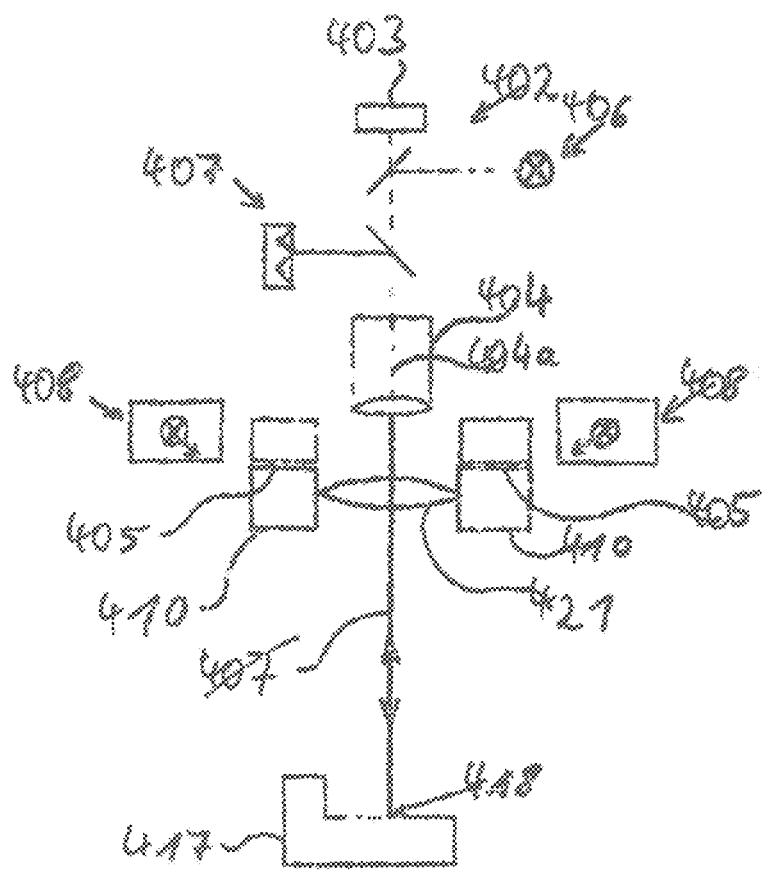
Figure 45:
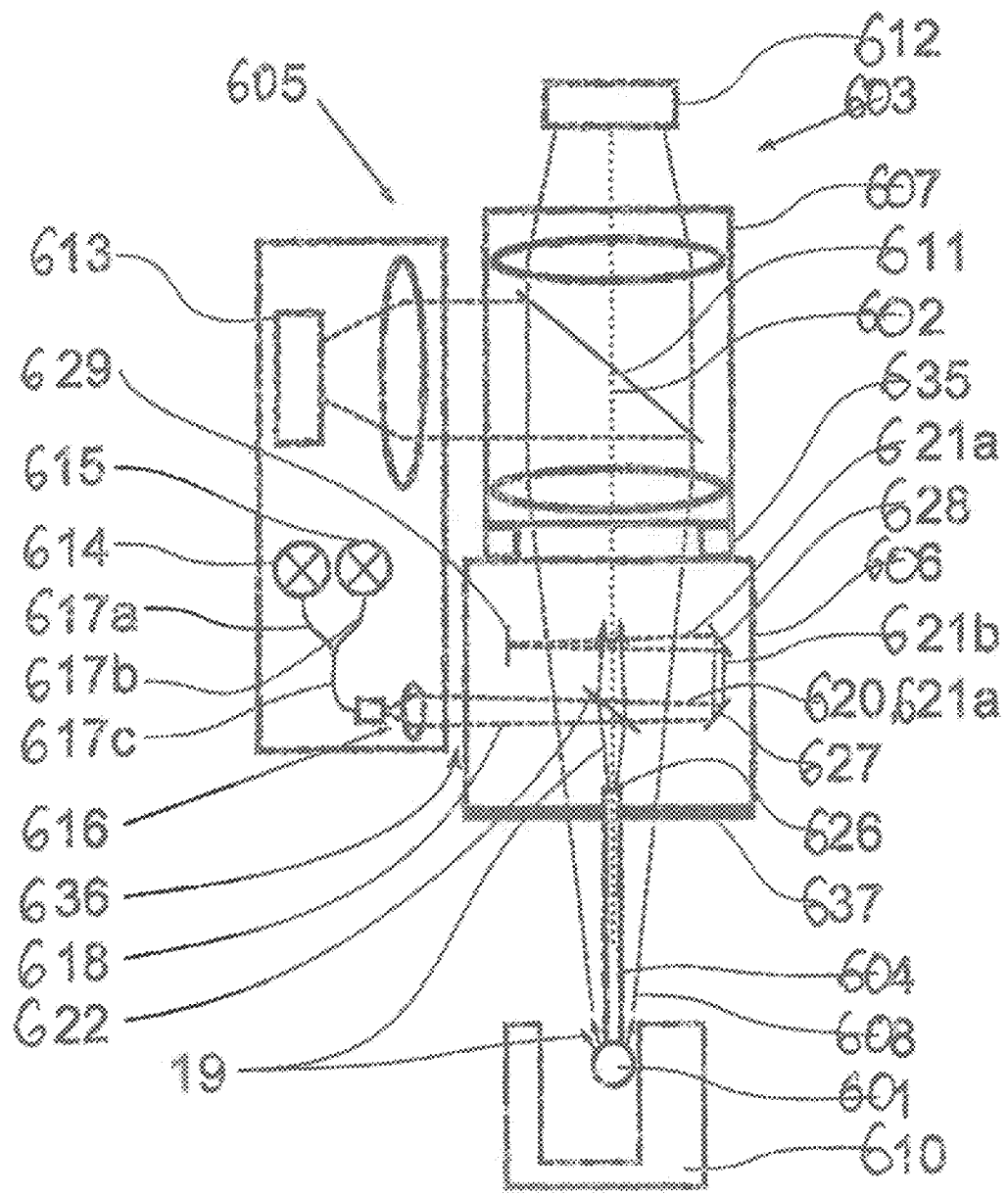
Figure 16:
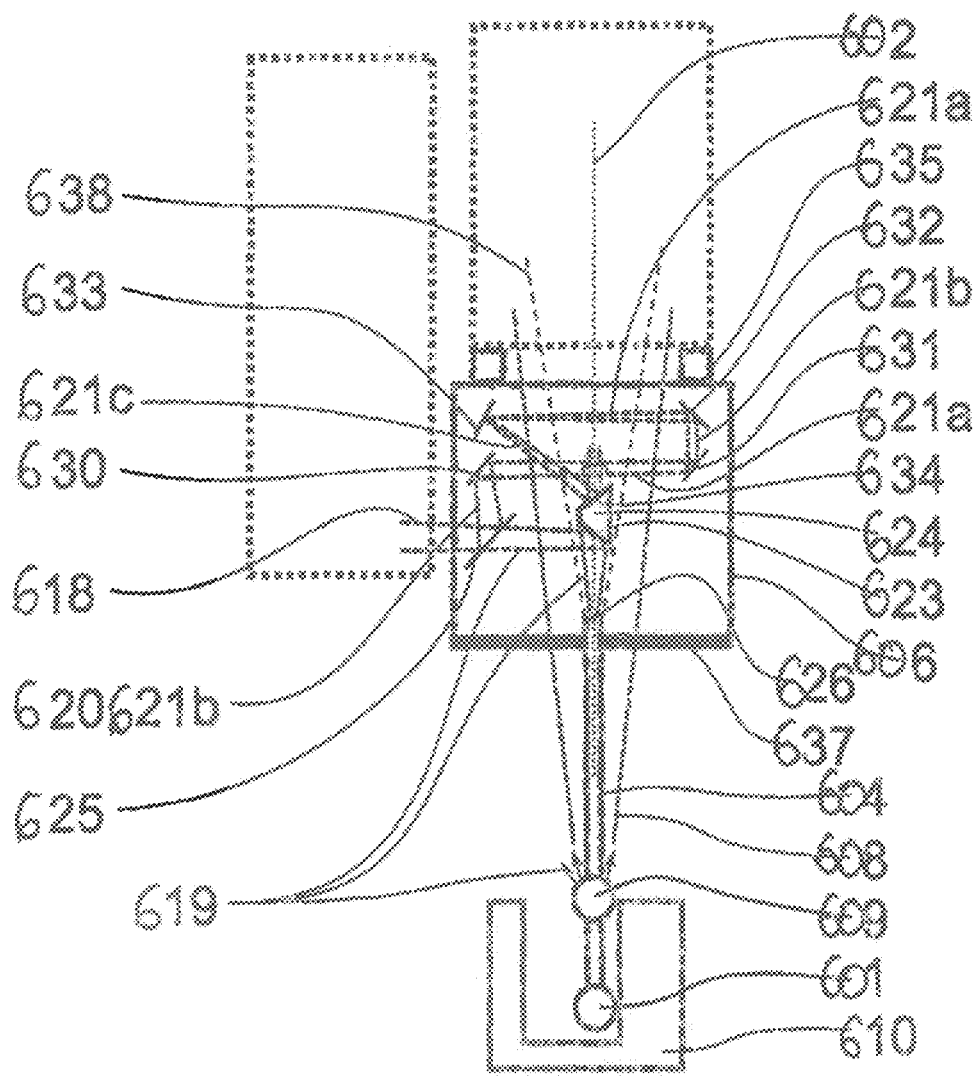
Figure 17:
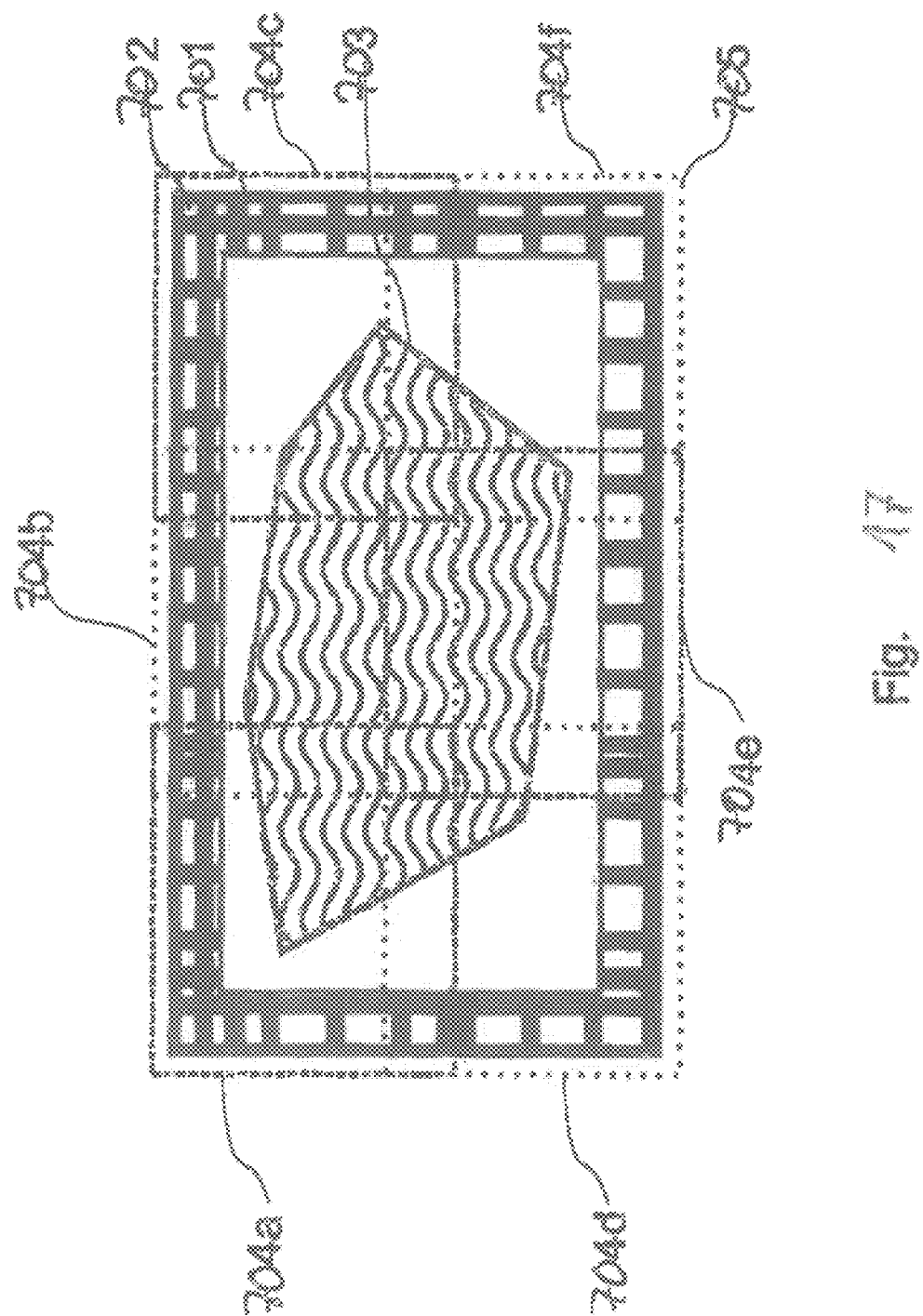

Shown are:

FIG. 1 A principal view of a device according to the invention in a first embodiment having a first probe extension according to the invention, FIG. 2 A principal view of a device according to the invention in a second embodiment having a second probe extension according to the invention, FIG. 3 A principle view of a device according to the invention in a third embodiment having a vertically measuring optical distance sensor, FIG. 4*a, b* Principle views of alternative probe extensions according to the invention, FIG. 5*a, b* Principle views of a probe extension according to the invention according to an independent idea, FIG. 6 A principle view of a device according to the invention in a first embodiment having a first laterally measuring optical sensor, FIG. 7*a* A principle view of a device according to the invention in a second embodiment having a first laterally measuring optical sensor and a second optical distance sensor in a first and particularly preferred embodiment of the probe extension, FIG. 7*b* A principle view of a device according to the invention in the second embodiment having a first laterally measuring optical sensor and a second optical distance sensor in a second embodiment of the probe extension, FIG. 7*c* A principle view of a device according to the invention in the second embodiment having a first laterally measuring optical sensor and a second optical distance sensor in a third embodiment of the probe extension, FIG. 7*d* A principle view of a device according to the invention in the second embodiment having a first laterally measuring optical sensor and a second optical distance sensor in a first particular embodiment of the probe extension in an L shape, FIG. 7*e* A principle view of a device according to the invention in the second embodiment having a first laterally measuring optical sensor and a second optical distance sensor in a second particular embodiment of the probe extension as a star probe, and FIG. 8 A principle view of a coordinate measuring machine comprising the arrangement according to the invention, FIG. 9 A principle view of a device according to the invention in a first embodiment having a first sensor, being a laterally measuring optical sensor, FIG. 10 A principle view of a device according to the invention in a second embodiment having the first sensor, being a laterally measuring optical sensor, and a second sensor, being a distance sensor, FIG. 11 A flow diagram of a preferred embodiment of the method according to the invention, FIG. 12 A preferred embodiment of the device according to the invention having a changed-in tactile sensor head, FIG. 13 A preferred embodiment of the device according to the invention having a changed-in tactile/optical sensor head, FIG. 14 A preferred embodiment of the device according to the invention having a changed-in auxiliary lens, FIG. 15 A principle view of a device according to the invention in a first embodiment, FIG. 16 A principle view of a device according to the invention in a second embodiment, and FIG. 17 A preferred embodiment of structures on a measurement bench corresponding to the device according to the invention.

Various embodiments of one of the teachings according to the invention can be seen in the figures, wherein the same reference numerals are fundamentally used for the same elements in FIG. 1 through 5*b*.

FIG. 1 shows a first embodiment of an arrangement according to the invention for determining geometric features and structures of a workpiece 27 having a tactile/optical sensor 1. Said sensor is made of a laterally measuring optical sensor, here an image processing sensor 2, a probe extension 13, a fiber receptacle 14, adjusting means 18, a holder 25, and two changeout interfaces 16 and 24.

The image processing sensor 2 is made of a camera 3 and an optic having lenses 4 and 5, wherein the optic comprises the optical axis 26 and a target mark 7 of the probe extension 13 is captured by means of the beam path 6.

The probe extension 13 comprises a flexurally elastic part or segment 10 from which the target mark 7 emerges. Said segment is preferably implemented having a continuously tapering diameter, particularly preferably conical, by means of a drawing process. The drawings also provide clarification in principle.

A flexurally rigid part or segment 9 to which the contact shape element 8 is attached emerges from the target mark 7 and is deflected when contacting the workpiece 27 to be measured.

Alternatively, the contact shape element 8 emerges directly from the flexurally elastic part 10 and the deflection of the contact shape element 8 is captured by the beam path 6 and determined by the image processing sensor 2. The probe extension 13 is further connected to the fiber receptacle 14.

Flexurally rigid segments or parts 11, 12 are further connected to the flexurally elastic part 10, comprising a 90° bend in the region of the part or segment 11 in the 2D sensor design shown here and running into the fiber receptacle 14 at approximately a right angle to the optical axis 26 in the region of the part 12. A more flexurally rigid and thus practically also flexurally rigid segment 10a can be present between segments 10 and 11 or 12, from which the segment 10 has been tapered by means of drawing. The flexurally rigid part 11, 12 is a metal tube having a cylindrical cross section and bent in segments, for example, the flexurally elastic part 10 or more flexurally rigid part 10a being guided in the interior thereof. The flexurally elastic part 10 or the more flexurally rigid part 10a is preferably adhered to the point of exit 11a from the metal tube.

The least diameter should not be less than 5 µm. The diameter in the flexurally rigid region (segment 10a) should not be less than 30 µm.

The fiber receptacle 14 comprises a light source 15 feeding light into the probe extension 13 and illuminating the target mark 7. The fiber receptacle 14 is further connected to a displaceable part or element 17 of the adjusting means 18 by means of a magnetic changeout interface 16. To this end, the changeout interface 16 also comprises electrical contacts for supplying power to the light source 15 in addition to mechanical contacts. The entire unit comprising the light source 15, fiber receptacle 14, and probe extension 13 can be changed out automatically according to the invention.

The adjusting means 18 provides means for adjusting. Using motorized drives, translational adjusting of the probe extension 13 is possible along the arrows 19 through 22. The arrow 20 indicates that the adjusting occurs in the direction perpendicular to the plane of the drawing. By adjusting differently in the directions of the arrows 21 and 22, a rotation in the direction of the arrow 23 is further implemented. The adjusting means 18 is connected to a holder 25 by means of a magnetic changeout interface 24, thereby producing the indirect connection to the image processing sensor 2. For example, darkfield incident light sources, not shown, are mounted in the holder 25 and serve for illuminating the workpiece. According to the invention, the entire unit of the adjusting means 18, fiber receptacle 14, and probe extension 13 can be changed out automatically by means of the changeout interface 24. It is particularly provided that the changeout interface 24 allows mounting the adjusting means 18 in four positions each rotated or offset 90° about the optical axis 26. The corresponding mechanical and electrical connecting elements are thereby present offset from each other in increments of 90°. Only the connecting elements offset by 180° are shown as examples in the section view of FIG. 1.

FIG. 2 fundamentally shows the device from FIG. 1, but having an alternative design for the probe extension 13. Said design comprises a modified bend in the region of the flexurally rigid part or segment 11, so that the probe extension 13 runs at a slight angle to the optical axis 26 in the region of the segments 10 and 9. Measurements can thereby be taken on the workpiece 27 at greater depth, without shadowing the beam path 6 or shaft contact (contact of the flexurally elastic part or segment 10 or the part or segment 9 with the workpiece 27). This construction is sensible, particularly for measuring roughness, because particularly small contact shape elements 9 must be used for measuring, whereby the probe extension must be particularly thin and thus flexurally elastic in the region of the segments 9 and 10. In the example shown in FIG. 2, measurement of the surface of the workpiece 27 oriented toward the right in the plane of the drawing is intended. Surfaces oriented in other directions are measured according to the invention in that the direction of tile of the probe extension is modified correspondingly. This is preferably done in that the adjusting means 18 and thus also the probe extension 13 is rotated correspondingly when attaching to the changeout interface 24. Alternatively, a unit comprising the fiber receptacle 14 and probe extension 13 can be changed in at the changeout interface 16, comprising a region or segment 11 bent in the corresponding direction.

FIG. 3 shows a third embodiment of the arrangement according to the invention, wherein the vertical deflection of the contact shape element 8 is additionally determined by means of the vertically measuring optical distance sensor 28 by determining the displacement of a reflector 34 mounted on the probe extension and serving as a further target mark. This is thus the 3D sensor type.

The distance sensor 28 comprises at least a light source 29, the light thereof being introduced into the beam path of the image processing sensor 2 approximately along the optical axis 26 past a Foucault gate 30 via deflecting mirrors 32 and 33. The light reflected at the reflector 34 is guided to a detection unit 31 by the deflecting mirror 33. The detection unit 31 is not implemented as a differential diode, contrary to the prior art, but rather as a position-sensitive sensor (PSD) or camera, whereby the measureable range of the displacement of the reflector 34 along the optical axis 26 and the tilting thereof about the same are increased. The reflector 34 is further provided for introducing part of the impinging light into the probe extension 13 in order to illuminate the target mark 7. Said light can originate from the light source 29 and the reflector 34 is partially reflective in design, or said light originates from a different light source, not shown, of deviating wavelength and the reflector 34 is color-sensitive when reflecting.

The fiber receptacle 14 comprises a flexurally elastic element 35 and a rigid retaining element 36. The flexurally elastic element 35 is a plurality of thin leaf spring elements distributed about the optical axis 26. Said elements are defocused in the beam path 26, that is, outside of the focal plane present in the region of the target mark 7, and comprise a chucking point 37 in the center to which the probe extension 13 is attached. In the example shown, the probe extension 13 is chucked at a right angle in leaf springs running perpendicular to the optical axis 26 as the flexurally elastic elements 35. Alternatively, the attachment can also be slightly tilted relative to the optical axis 26, in order to achieve the advantages explained with respect to FIG. 2. Attaching at positions rotated or offset by 90°, for example, is possible in turn by means of the changeout interface 24. This is possible even if the adjusting means 18 is eliminated in the course of an alternative embodiment of the device according to FIG. 3 and the fiber receptacle 14, particularly the retaining element 36, is attached directly to the changeout interface 24.

Figure 4B:
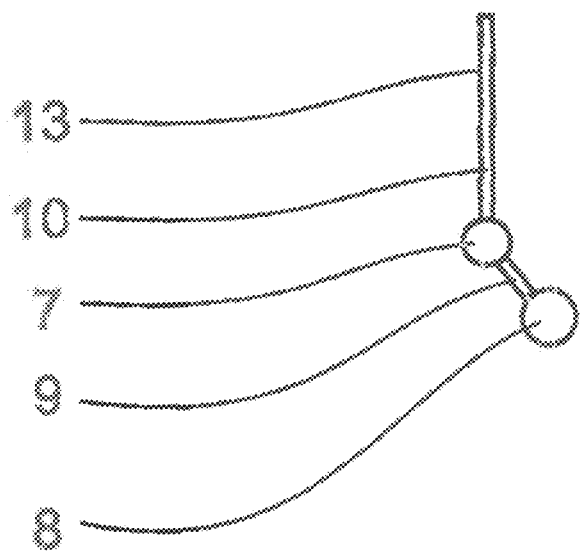

FIGS. 4a and 4b show principle views of alternative probe extensions 13 according to the invention. For example, in FIG. 4a the regions or segments 9 of the probe extension 13 run from the target mark 7 in star-shaped directions to one contact shape element 8 each. Not shown are contact shape elements 8 and corresponding regions or segment 9 perpendicular to the drawing plane. The branching to the plurality of contact shape elements alternatively occurs below the target mark 7. FIG. 4*b* shows an alternative having a laterally protruding region 9 and contact shape element 8 attached thereto, wherein the angle to the optical axis 26 is not 90° but rather an angle of approximately 45° is present. Alternatively, all angles can be implemented between 0° (straight embodiment) and approximately 150°.

According to a proposal of the invention, the probe extension 13 or the hollow cylinder receiving the same is geometrically designed as a rotational lock with respect to a segment 60 running in the receptacle 14 and thus also designated as a mounting segment. This is made possible in that the peripheral geometry of the mounting segment 60 deviates from a circular geometry and the receptacle or fiber receptacle 14 is correspondingly geometrically adapted, so that the mounting segment 14 of the probe extension 13 can be received by the receptacle 14 and fixed therein.

Figure 5B:
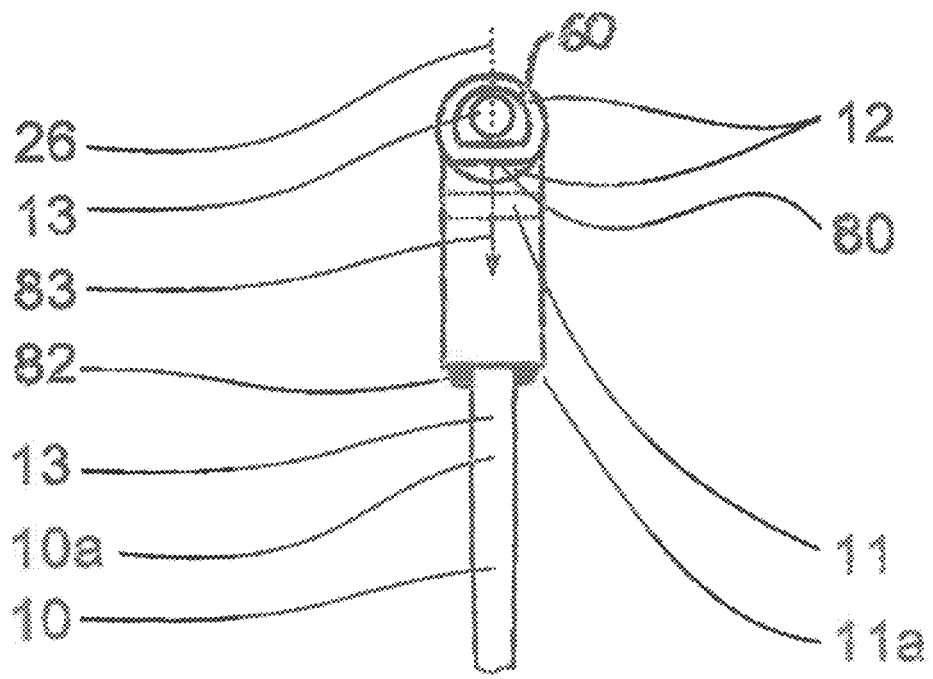

The mounting segment 60 comprises both a solution wherein the probe extension 13 is not enclosed by the hollow cylinder (11, 12) shown in the drawing views in FIGS. 5*a* and 5*b*, that is, the end segment of the probe extension 13 forming the mounting segment 60 is directly mounted in the receptacle 14 without the hollow cylinder, as well as a solution in which the probe extension 13 is received by the hollow cylinder and said cylinder is mounted in the receptacle 14.

If the probe extension 13 is enclosed by the hollow cylinder or if the probe extension 13 emerges from the same, then the segment of the hollow cylinder running within the receptacle 14 is designed the same as the mounting segment 60.

If the probe extension 13 preferably extends within the hollow cylinder to the mounting segment 60 acting as a rotational lock, then this is not a mandatory feature. Rather, the probe extension 13 can run exclusively in the segment 11 running vertically in the drawing, for example, or can end in the horizontal segment 12 prior to the mounting segment 60.

FIGS. 5*a* and 5*b* shows principle views of the probe extension 13 according to the invention for providing a flat area 80 on the same. The flat area 80 is, as shown in FIG. 5*a*, implemented on the hollow cylinder 12 enclosing the probe extension 13 in the region of the chucking point, that is, in the region of the fiber receptacle 14. The fiber receptacle 14 comprises a contact surface 81, also flat, with which the flat area 80 of the probe extension 13 makes contact.

FIG. 5*b* shows a side view of FIG. 5*a* in a magnified view, wherein the fiber receptacle 14 and light source 15 are not shown and the region of the probe extension 13 facing toward the workpiece 27 and comprising the contact shape element 8 and optionally the target mark 7 is shown only partially, that is, up to the beginning of the drawn region 10. The fiber of the probe extension 13 running in the interior of the hollow cylinder 12 is shown in the above part. The normal direction 83 of the flat area 80 runs parallel to the optical axis 26 or to the region of the probe extension 13 comprising the contact shape element 8 and optionally the target mark 7, and is therefore pointed downward in the figure. Alternatively, the flat area can also be implemented at any other point on the periphery of the hollow cylinder. The fiber of the probe extension 13 exits the hollow cylinder 11, 12 at the exit point 11*a* and is fixed thereto by the adhesion. Alternatively, the hollow cylinder can be eliminated and the fiber of the probe extension 13 itself is flattened in regions. The coupling efficiency of the light source 15, however, is limited by said embodiment.

According to the prior art cited above, the entire arrangement of FIGS. 1 through 3 is preferably integrated as a sensor in a coordinate measuring machine. For example, reference is made to this end to FIG. 1 of DE 10 2004 022 314 or FIG. 12 of DE 10 2010 060 833.

FIG. 6 shows a principle view of a device according to an independent invention in a first embodiment having a first laterally measuring optical sensor implemented as an image processing sensor 101 and comprising a CCD or CMOS camera 102 associated with an optic 103, such as an optic having fixed magnification and working distance or a zoom optic having a fixed or adjustable working distance, comprising a plurality of optionally displaceable lenses. The optical sensor 101 captures the position and thus the deflection of a target mark 104 emerging from a probe extension 105 in the lateral direction or in the two lateral directions perpendicular to the optical axis 106 of the optical sensor 101. A contact shape element 107 is present on the object-side end of the probe extension 105 and is spherical in design and is brought into contact with the measured object or workpiece 116 for measuring and is thereby deflected. In order for the deflection of the contact shape element 107 to be able to be captured as fully as possible by the optical sensor 101, the deflection of the contact shape element 107 must be transferred as fully as possible to the target mark 104. To this end, a first region 105*a* of the probe extension 105 is implemented having as high a rigidity as possible. Said region connects the contact shape element 107 to the target mark 104, wherein the contact shape element 107 and the target mark 104 can optionally be integrally designed with the first region 105*a*. In order that very low contact forces are achieved for protecting the workpiece 116 against damage, a second region 105*b* of the probe extension 105 is implemented having a significantly lower rigidity than the region 105*a*. The second region 105*b* emerges from the target mark 104 and runs facing away from the contact shape element 107. A preferred solution for implementing the same is to select the elastic modulus E of the region 105*a* to be significantly greater than the elastic modulus of the region 105*b*. This can be done, for example, by hardening the region 105*a* or by appropriate material selection. Potential materials according to the invention for the region 105*a* include hard materials such as steel, diamond, graphene, or tungsten, for example, and for the region 105*b*, soft materials such as glass, glass fiber, plastic, or plastic fiber such as polyethylene, polypropylene, polyvinylchloride, or polyethylene terephthalate. In order to connect the first or second region 105*a* and 105*b* to the target mark 104 or the contact shape element 107, adhesion, welding, or splicing is provided according to the invention. Alternatively, the region 105*b* having the target mark 104 and the region 105*a* having the contact shape element 107 can form a unit, for example produced by splicing or generally by forming, for example in a heated state. In a further alternative, the region 105*a* can also form a unit with the contact shape element 107 and the target mark 104.

According to an alternative solution for the object of the invention, the dimensions of the region 105*a*, particularly the length and thickness, or diameter, are implemented so as to have a greater rigidity. This is possible only within certain limits, however, as a greater diameter means that the contact shape element 107 must be implemented having a greater diameter as well, and particularly holes of small diameter can thereby no longer be measured. Reducing the length of the region 105*a* has the result that measurements can no longer be taken at great depths in a hole.

The side of the probe extension 105 further from the object emerges from a mounting element 108, for example means for adjusting the location of the probe extension 105 or a changeout interface for placing the probe extension, as can be found in the prior art described above, and connected to the optical sensor 101. The arrangement according to the invention is thereby a sensor integrated in a coordinate measuring machine 130, as is labeled in FIG. 8 as reference numerals 132 and 128, for example.

FIG. 7a shows a principle view of a device according to the invention in a second embodiment. In addition to the image processing sensor 101, a distance sensor 109 is integrated, the measurement beam 112 thereof being coupled into the beam path of the image processing sensor 101 in the direction of the optical axis 106 by means of a semi-transparent deflecting mirror 110 and reflected by a second target mark 111 mirrored on the side thereof facing toward the sensor. The target mark 111 can, as previously explained with respect to the first target mark 104, be connected to the first region 105a by means of adhesion, welding, or splicing, or can form a unit with the same and optionally also the first target mark 104 and optionally also the first region 105a present between the first target mark 104 and the contact shape element 107, and optionally also with the contact shape element 107.

In order that the deflection of the contact shape element 107 is transferred as fully as possible to the first target mark 104 and to the second target mark 111, the first region 105a of the probe extension 105 extends between the contact shape element 107, the first target mark 104, and the second target mark 111. The second region 105b of the probe extension 105 is formed by one or more flexible connecting elements, as can be seen in DE102010060833 in FIGS. 8-10, for example. The second region 105b thereby emerges from the mounting element 108 and ends at the first region 105a at a point between the first target mark 104 and the second target mark 111. Alternatively, the second region 105b ends directly at the second target mark 111, as shown in excerpts in FIG. 7b and self-explanatory to this extent. It is further provided according to the invention that the first target mark 104 simultaneously takes on the function of the second target mark 111 in that the first target mark 104 is mirrored on the side thereof facing the sensor, as shown in excerpts in FIG. 7c.

It is thus also possible by means of the invention to implement very long probe pins or probe extensions of a plurality of millimeters in length, for example greater than 5 mm, up to a few centimeters in length, for example 3-15 cm.

The first region 105a should have a length greater than 5 mm, preferably up to 10 cm. The diameter of the first region 105a should be between 10 μm and 500 μm.

With respect to the second region 105b, preferred values for the length are 10 mm to 100 mm, and/or for the diameter are 10 μm to 1 mm. When selecting the dimensions, however, it must be considered according to the previous embodiment that the first region 105a has a greater rigidity than the second region 105b according to the teaching according to the invention and the specifications in this context.

Additional potential special designs are shown in FIGS. 7d and 7e. FIG. 7d shows a probe extension 105 in an L shape, that is, having a protruding region 105a', at which the contact shape element 107 is present. FIG. 7e shows a probe extension 105 in the form of a star probe. One contact shape element 107 for contacting the workpiece is present at each of the plurality of regions 105a'. The regions 105a' can thereby also comprise greater lengths of a plurality of millimeters up to a few centimeters. The regions 105a' shown in FIGS. 7d and 7e have the greater rigidity corresponding to the region 105a to this end.

The sufficiently known principle, shown again in FIG. 8, of a coordinate measuring machine 130 comprises a base frame 113 made of granite, for example, and having a measurement bench 114 on which an object or workpiece 116 to be measured is positioned in order to measure the surface properties thereof, that is, features or structures thereof.

A portal 119 is adjustable in the Y direction along the base frame 112. To this end, columns or stands 120, 122 are slidingly supported on the base frame 112. A traverse 124 emerges from the columns 120, 122, along which a carriage is displaceable, said carriage in turn receiving a ram or column 126 adjustable in the Z direction. A sensor or measurement system 132 emerges from the ram 126 or optionally from a changeout interface 128 connected to the ram and can be implemented as a tactile sensor and, if the ram 126 comprises an image processing sensor, measures in a tactile/optical manner Reference is made, however, to sufficiently known techniques, as well as with respect to further sensors used such as laser distance sensors, white light interferometers, image processing sensors, X-ray sensors, or chromatic focal sensors or a confocal scanning measurement head, without thereby limiting the teaching according to the invention. With respect to the tactile/optical measurement, reference is made in particular to the disclosure in EP-B-988 505 (WO98/57121), the contents of which are referenced.

The sensor or sensors are selected and used according to the measurement task, in order to optimally configure the coordinate measuring machine 130, then also referred to as a multisensor coordinate measuring machine, for the particular measurement task. Problems occurring in typical coordinate measuring machines are solved at the same time.

In order to be able to use the coordinate measuring machine 130 having the suitable sensor, the coordinate measuring machine can comprise a sensor changeout unit. A plurality of sensors can thus be selectively loaded to the coordinate measuring machine 130 by means of a changeout interface and can be changed out by hand or by automatically retrieving from a parking station.

FIG. 9 shows a first embodiment of an independent arrangement according to the invention for determining geometric features and structures, for example here the diameter of a hole 218, on a the workpiece 201. The determining is done by means of the tactile/optical sensor according to the invention, comprising at least the flexurally elastic probe extension 203, from which a contact shape element 204 emerges on one side and a first target mark 202 emerges on the other side, said extension being attached to a mounting element 209, wherein by coupling to the light source 210 light, such as from an LED or a laser light source, is introduced into the probe extension 203, and by means of the laterally measuring optical sensor 206, comprising at least one imaging lens 207 and one receiver 208 such as a CCD or CMOS sensor, in that when the contact shape element 204 contacts the workpiece 201, the resulting lateral deflection of the target mark 202 associated with the contact shape element 204 is captured by the beam path 216 of the laterally measuring optical sensor 206 and is imaged on the receiver 208 by means of the imaging lens 207. The laterally measuring optical sensor 206 is implemented as an image processing sensor and determines the magnitude and direction of the deflection of the target mark 202, particularly by determining the deflection of the light spot 215. The light spot 215 is formed by the light 219 from the light source 210 reflected within the probe extension 203. The reflections thereby occur at the layer or coating 213 of the contact shape element 204 and the layer or coating 212 of the target mark 202. The target mark 202, however, is particularly preferably coated only on the side thereof facing toward the laterally measuring optical sensor 206, particularly to the equator of the spherical target mark 202, so that the light spot 215 is visible to the laterally measuring optical sensor 206, that is, can be imaged on the detector 208 by the lens 207. The light from the light source 210 is further reflected once or a plurality of times at the coating 214 of the region 205 of the shaft of the probe extension 203 running between the target mark 202 and the contact shape element 204, and thus retained within the shaft, shown by the arrow 220. In order to avoid light losses in the region between the mounting element 209 and the target mark 202 as well, of course said region of the probe extension 203, that is, the region 211, can also have a reflective or fluorescing layer.

The layer 213 of the contact shape element 204, in particular, can also be covered by means of a hard-surface or wear-resistant protective layer such as a silicon nitride layer applied to the outside of the contact shape element 204 over the reflecting or fluorescing layer 213.

FIG. 10 shows an arrangement according to the invention wherein a second sensor 221 is additionally used for indirectly determining the deflection of the contact shape element 204. In order to provide a sensor system for measuring in three dimensions, the second sensor is implemented as a distance sensor and determines the deflection of the contact shape element 204 by determining the change in position of the second target mark 226 in the direction of the measurement beam 225 of the distance sensor 221, in the direction perpendicular to the deflection of the contact shape element 204 determined by the laterally measuring optical sensor 206.

To this end, the distance sensor 221 comprises the light source 210a, preferably generating a light beam directed toward the second target mark 226 by means of the partially transparent deflecting mirrors 223b and 223a and the lens 207 and reflected by the same. The distance sensor is preferably implemented as a Foucault sensor in which a gate 229 is used. The measurement beam 225 reflected by the second target mark 226 is deflected onto the differential diodes 224 for analysis after reflecting at the partially transparent deflecting mirror 223a.

The probe extension 203 is preferably attached to a mounting element 217 in the region between the first target mark 202 and the second target mark 226 by means of one or more flexible retaining elements 221, in order to allow the probe extension to deflect in the measurement direction of the distance sensor. The mounting element 217 is preferably connected to a coordinate measuring machine, preferably to the same component as the first and second sensors 206, 221. With respect to further embodiments for the probe extension 203, first and second target marks 202, 226, retaining elements 221, and the region in which the retaining elements 221 are connected to the probe extension 203, reference is made to the disclosed contents of DE 10 2010 060 833.

According to the prior art cited above, the entire arrangement of FIGS. 9 and 10 is preferably integrated as a sensor in a coordinate measuring machine. For example, reference is made to this end to FIG. 9 of DE 10 2004 022 314 or FIG. 12 of DE 10 2010 060 833.

FIG. 11 shows the sequence of the steps in principle according to the invention of the independent invention for automatically measuring geometric features or contours in a preferred embodiment. Prior to actually measuring the workpiece, the specified data 301 of all eligible workpieces ("Workpiece 1", "Workpiece 2", through "Workpiece n") are recorded and saved. The specified data thereby comprise "specified geometries" taken from the technical drawings and saved in a CAD file ("CAD"), for example. The "tolerances" associated with the features are further saved in said file or a separate file. The association of features and tolerances can also be present in the form of an inspection plan. The specified data further comprise the template images or templates ("Template 1", "Template 2", through "Template i") of the eligible workpieces 1, 2, through n, each recorded under different light settings.

For the actual measuring of the workpiece, an image 302 or an overall image merged from a plurality of individual images ("Image 1", "Image 2", through "Image m") is recorded by means of an optical sensor, preferably an image processing sensor comprising at least an optic and a camera. Said image is referred to below as the image.

The image 302 is compared with all template images ("Template 1", "Template 2", through "Template i") of the specified data 101 by means of the step "Correlation analysis". The specified data associated with the template having the greatest match, particularly the CAD data ("CAD") and "tolerances" are processed further, together with the determined "location" of the workpiece with respect to the specified data, as "selected specified data", particularly "specified geometries", in the next step. A rough fit of the image 1 with respect to the "specified geometries", not shown, is performed using the "location" of the "selected specified data." Then the measurement window for the step of "feature extraction" of the features or contours from the image is defined. In addition, the "selected specified data" are used in the "fitting" step for fitting the extracted features to the specified data, particularly to the "specified geometries."

The fitting can thereby be performed with respect to the specified geometries in the form of a "BestFit" fitting or additionally considering the tolerances in the form of a so-called "ToleranceFit" fitting.

The last step presents the "results output", wherein the "dimensions" determined for features and optionally the "deviations" from the specified values are indicated and preferably additionally the "compliance with tolerances" and the dimensions of "minimum underrun" or "maximum overrun" of the tolerances or specified values are output.

FIG. 12 shows an arrangement of the multisensor system having a tactile sensor head 401 changed in, explaining an independent invention. An optical sensor 402 comprising at least a camera 403 and an optic 404 (having an optical axis 404a) and a first changeout interface 405 are fixedly disposed on a coordinate measuring machine, for example. Brightfield lighting 406 and a beam path of a laser distance sensor 407, for example using the Foucault principle, are further reflected into the beam path (optical axis 404a) of the optical sensor 402, and darkfield lighting 408 disposed externally around the optic 404 and the first changeout interface 405 are also shown.

An adapter 410 is interchangeably disposed at the first changeout interface 405 and comprises a base element 409 of a tactile probe system or tactile sensor. The base element 409 comprises a second changeout interface 411 on which the measurement system 412 of the tactile sensor head 401 is interchangeably attached, and is in turn connected to a probe insert 413, preferably interchangeably connected, said insert in turn comprising a plate 414, a probe pin 415, and a probe element 416. A workpiece 417 is contacted at a measurement location 418 by means of the probe element 416 and measured in that the deflection is determined by the measuring system 412. Adapters 410 having a tactile sensor head 401 can be placed in a first parking station, not shown. The measurement system 412 can be placed in a second parking station, not shown. The probe insert 413 can be changed out manually or placed in a further parking station automatically.

FIG. 13 shows the tactile sensor, that is, the adapter 40 having the base element 409 and the tactile sensor head 401 attached thereto, placed in the first parking station, not shown. A tactile/optical sensor 419 is now attached at the first changeout interface 405. The deflection of a probe element 420 mounted on a flexurally elastic probe extension 420a is captured directly by the optical sensor 402, preferably implemented as an image processing sensor, and indirectly by the distance sensor 407 by means of a reflector 420b mounted on the flexurally elastic probe extension 420a The probe element 420 contacts the workpiece at the measurement point 418.

FIG. 14 shows an auxiliary lens 421 changed in at the first changeout interface 405 in place of the tactile/optical sensor 419, said lens being used for optimally directly measuring the workpiece 417 by means of the distance sensor 407 at the measurement location 418. If the auxiliary lens 421 is placed in the first parking station, then the direct measuring of the workpiece 417 by the optical sensor 403 is implemented, wherein the center of the measurement range captured by the camera 403 defines the measurement location 418. In this case, the auxiliary lens 421 can be understood as the sensor head of the distance sensor 407.

FIG. 15 shows a first embodiment of an independent arrangement according to the invention for determining geometric features and structures of a workpiece 610. Measurements on the workpiece 610 are thereby performed by contacting by means of a contact shape element 601 being deflected when contacting the workpiece 610 and emerging from a flexurally elastic probe extension 604. The deflection is determined by two sensors, a laterally measuring optical sensor 603, preferably an image processing sensor, determining the deflection perpendicular to the optical axis 602 thereof, as is sufficiently described in the prior art, and a vertically measuring interferometric distance sensor 605 determining the deflection in the direction of the optical axis 602. Together with the flexurally elastic probe extension 604 and additional parts of a preferably interchangeable unit 606 described below, said two sensors form the tactile/optical sensor according to the invention.

The tactile/optical sensor preferably comprises an imaging optic 607 made primarily of a plurality of lenses and also potentially implemented as a zoom optic, in order to form a beam path 608 along the optical axis 602, and focused on the contact shape element 601 or a target mark 609 associated therewith. The optical axis 602, the imaging optic 607, and the beam path 608 are first associated with the laterally measuring optical sensor 603, but are then also used for the interferometric distance sensor 605.

As previously found thoroughly in the prior art, the shadowing of the contact shape element 601 or the target mark 609 under transmitted light illumination or the self-illuminated contact shape element 601 or the self-illuminated target mark 609 can be captured. In the context of the present specification, the second variant, know as self-illumination, is preferably used. Said self-illumination is generated in that light on the side 626 of the probe extension 604 facing away from the workpiece, that is, on the side of the probe extension further away from or facing away from the contact element, is coupled into the same and transmitted therein to the contact shape element 601 or, if present, to the target mark 609. To this end, the probe extension 604 is implemented for at least partially transmitting light, for example as a glass or plastic fiber. The contact shape element 601 and target mark 609 are implemented by a coating according to the prior art, so as to emit the infed light, said light being captured by the imaging optics 607 and imaged in the direction of the analysis units 612, 613 of the sensors 603 and 605. To this end, the beam paths of both sensors run jointly to an optical splitter 611 and are guided thereby on one side in the direction of the analysis unit 612 of the laterally measuring sensor 3 and on the other side in the direction of the analysis unit 613 of the interferometric sensor 605. The optical splitter 611 is implemented as a semitransparent film (pellicle) or as a splitter cube, for example. The analysis units 612, 613 are cameras having preferably planar receiver surfaces, such as CCD or CMOS cameras, for example, and optionally have additional imaging lenses connected upstream thereof.

The vertically measuring interferometric distance sensor 605 comprises, in addition to the imaging optic 607 and the analysis unit 613, the light sources 614 and 615, the optical fibers 617a, 617b, and 617c, and a coupling arrangement 616. The latter typically comprises a fiber end having a beam-shaping optic connected upstream and couples the beam 618 from the light sources 614 and 615 out of the optical fiber 617c, so that coupling into the probe extension 604 is made possible. The light from the two light sources 614 and 615 is combined by a Y-coupler connecting the optical fibers 617a and 617b to the optical fiber 617c. The light sources 614 and 615, the optical fibers 617a, 617b, and 617c, and the coupling arrangement 616 can alternatively be disposed directly in the unit 606.

The preferably interchangeable or changeable unit 606 further comprises the probe extension 604, means 637 for attaching the probe extension, means 622, 625 for splitting the beam 618 into the measurement beam 619 and the reference beam 620, means 622, 623, 624 for deflecting the measurement beam 619 in the direction of the side 626 of the probe extension 604 facing away from the workpiece 610, and means 627, 628, 629, 630, 631, 632, 633, 634 such as reflectors for forming a reference beam path 621a, 621b, 621c. To this extent express reference is made to the self-explanatory figures. The unit 606 further comprises means, not shown, such as permanent magnets, for releasably mounting on a changeout interface 635. The coupling of the beam 618 preferably takes place laterally to the unit 606 at an interface 636 implemented as an opening, for example, but can also take place within the changeout interface 635. An additional deflection of the beam 618 may then be necessary. If the light sources 614 and 615, the optical fibers 617a, 617b, and 617c, and the coupling arrangement 16 are disposed directly in the unit 6, then the required electrical feeds to the light sources 614 and 615 are guided by means of the changeout interface 635.

In the first arrangement according to the invention shown in FIG. 15, the contact shape element 601 emerges from the probe extension 604; the beam 618 is split into the measurement beam 619 and the reference beam 620 at the optical splitting layer 622, wherein the optical splitting layer 622 simultaneously deflects the measurement beam 619 in the direction of the side 626 of the probe extension 604 facing away from the workpiece, whereby the measurement beam 619 is coupled into the probe extension 604; and the reference beam 620 is deflected by the reflectors 627 and 628 to the reference mirror 629, reflected by the same, and again deflected onto the optical splitting layer 622 and imaged by the same in the direction of the imaging optic 607 and thus in the direction of the analysis unit 613. The reference beam path thereby runs partially at an angle, particularly a right angle, to the optical axis (segments 621a) and partially parallel to the optical axis (segment 621b), and thus is folded (deflected) a plurality of times. The reflectors 627, 628, and 629 are thereby present outside of the beam path 608, particularly laterally adjacent to the optical beam path 608.

In the arrangements according to the invention shown in segments in FIG. 16, in which solely the unit 606 modified in comparison with FIG. 17 is shown, the contact shape element 601 and the target mark 609 emerge from the probe extension 604; the beam 618 is split into the measurement beam 619 and the reference beam 620 at the optical splitting layer 625, the measurement beam 619 is deflected in the direction of the side 626 of the probe extension 604 facing away from the workpiece by the surface of a deflecting device 624 implemented as a reflector 623 such as a mirrored prism, whereby the measurement beam 619 is coupled into the probe extension 604; and the reference beam 620 is imaged in the direction of the imaging optic 607 and thus in the direction of the analysis unit 613 by the reflectors 630, 631, 632, 633, and 634. The last reflector 634 passed through, as shown, is preferably formed by a further mirrored surface of the deflecting device 624. The reference beam path thereby runs partially at a right angle to the optical axis (segment 621a), partially at an angle to the optical axis (segment 621c) and partially parallel to the optical axis (segment 621b), and thus is folded (deflected) a plurality of times. The reflectors 630, 631, 632, and 633 and the optical splitter layer 625 are thereby present outside of the beam path 608, particularly laterally adjacent to the optical beam path 608.

Also partially shown in FIG. 16 as an example is the optionally usable additional distance sensor. The beam path 638 of the further distance sensor, for example, is reflected into the beam path 608 by a further optical splitter, comparable to the optical splitter 611. Corresponding lenses disposed upstream, however, cause the imaging optic 607 to focus the beam path 638 not on the contact shape element 601 or the target mark 609, but rather on the additional target mark implemented as a reflector on the end 626 of the probe extension 604 facing away from the workpiece. Said reflector 626 is preferably only partially mirrored, in order to transmit the measurement beam 619 at least partially and to optionally allow self-illumination of the contact shape element 601 or the target mark 609 by the light of the beam path 638, whereby the function of the additional distance sensor is possible regardless of the switched state of the interferometric distance sensor 605. Said operating mode is described in DE 10 2010 060 833, for example.

By modifying the arrangement of the positions, particularly the spacing of the reflectors in the reference beam paths according to FIG. 15 or 16, the optical path distance of the reference beam path can be adapted to the optical path length of the measurement beam path travelled by the measurement beam 619. Probe extensions 604 having different lengths can thereby be implemented.

According to the prior art cited above, the entire arrangement of FIGS. 15 and 16 is preferably integrated as a sensor in a coordinate measuring machine. For example, reference is made to this end to FIG. 1 of DE 10 2004 022 314 or FIG. 12 of DE 10 2010 060 833.

FIG. 17 shows a measurement bench 701 and structures 702 mounted thereon corresponding to the independent gage or device according to the invention. The structures 702 are lines spaced apart at irregular intervals and mounted on the entire edge region of the measurement bench 701 and not completely covered by the workpiece 703 in any of the adjacent overlapping individual images 704 through 704f. The individual images 704a through 704f are recorded one after the other by means of an image processing sensor, not shown, and then merged into an overall image 705 comprising the complete workpiece 703. The exact position taken by the image processing sensor during the recording of the individual images 704a through 704f relative to the workpiece 703 does not need to be known according to the invention, because the structures 702 are captured at least partially in all individual images 704a through 704f and the location of each individual image 704a through 704f can be derived therefrom. Manual or motorized axis drives are used for displacing the sensor and/or the workpiece relative to each other, wherein preferably no measuring axes are present. Alternatively, the segment of the workpiece imaged in the individual images can also be varied by deflecting the beam path of the optical sensor internally in the sensor or externally, for example by deflecting and/or refracting the measurement beam of the sensor, or by tilting the sensor.

The invention claimed is:

1. In combination, a receptacle and a probe for a tactile/optical sensor,
   the probe comprising:
   a probe extension and a mounting element; and
   a mounting segment extending from the mounting element;
   wherein the probe extension is partially flexurally elastic; and
   wherein the mounting segment is configured as a rotational lock that corresponds to a segment running in the receptacle, to allow the mounting segment to be precisely aligned with, and fixed to, the receptacle.

2. The combination according to claim 1, wherein the mounting segment comprises an external geometry deviating from a circular geometry, at least in regions in a plane running perpendicular to the longitudinal axis thereof.

3. The combination according to claim 2, wherein the external geometry deviating from a circular geometry is formed by a member selected from the group consisting of a flat area of the mounting segment, a protrusion protruding out of the mounting segment, a cutout in the mounting segment, a recess running in the longitudinal direction of the segment, and a polygonal design of the mounting segment.

4. The combination according to claim 2, wherein a normal is associated with the external geometry deviating from a circular geometry, said normal running parallel, or at an angle α, where α≤+/−5°, to a region of the probe extension from which a contact shape element extends.

5. The combination according to claim 1, wherein the mounting element is configured as a hollow cylinder having an L-shaped geometry.

6. The combination according to claim 5, wherein the probe extension runs at least in segments in an interior of the mounting element, wherein the mounting element comprises a bend having an angle of 85° to 95°, wherein only non drawn regions of the probe extension run within the hollow cylinder, and the probe extension and the hollow cylinder are adhered together at a point facing the contact shape element where the probe extension exits the mounting element.

7. The combination according to claim 1, wherein the receptacle comprises a contact surface for the mounting segment and adapted to the mounting segment, and wherein the contact surface is flat.

8. The probe according to claim 1, wherein the probe extension is a fiber probe extension.

9. A device for determining geometric features and structures on a workpiece by means of a tactile/optical sensor, the device comprising:
a laterally measuring optical sensor, and
a partially flexurally elastic probe extension,
wherein the following extend from the probe extension:
a contact shape element that deflects when contacting the workpiece, and optionally,
a target mark associated with the contact shape element that deflects when the contact shape element contacts the workpiece,
wherein a lateral deflection of the contact shape element, or of the target mark if present, perpendicular to the optical axis of the optical sensor can be captured by the optical sensor, and
wherein the probe extension extends from a fiber receptacle to which a flexurally elastic part is directly or indirectly connected, to which the contact shape element is directly or indirectly connected, wherein the part of the probe extension running between the optional target mark, if present, and the contact shape element is flexurally rigid relative to the flexurally elastic part.

10. The device according to claim 9, wherein the probe extension comprises a part that is flexurally rigid relative to the flexurally elastic part, at least in the region of the fiber receptacle.

11. The device according to claim 10, wherein a diameter of the probe extension is enlarged relative to the flexurally elastic part, or the probe extension, and runs in the interior of a hollow cylinder.

12. The device according to claim 9,
wherein, in a region of the fiber receptacle, the probe extension runs at an angle of about 90° relative to the optical axis of the laterally measuring optical sensor, and
wherein the probe extension comprises a segment having a bend between the region of the fiber receptacle and the region comprising the contact shape element, wherein the segment is configured as a flexurally rigid segment, relative to the flexurally elastic part.

13. The device according to claim 9, wherein the fiber receptacle comprises a flexurally elastic element, and wherein the flexurally elastic element extends from a retaining element disposed outside of the beam path of the laterally measuring optical sensor, and
runs nearly perpendicular to the optical axis of the laterally measuring optical sensor, and
comprises a clamping point for receiving the probe extension, and
is transparent or is disposed out of focus relative to the beam path of the laterally measuring optical sensor.

14. The device according to claim 13, wherein the retaining element comprises a changeout interface, a magnetic interface for attaching to the laterally measuring optical sensor, or to a holder associated with the same, and wherein the retaining element is attachable in a plurality of rotated positions about the optical axis of the laterally measuring optical sensor.

15. The device according to claim 14, wherein the retaining element is attachable in four rotated positions at 90° each about the optical axis.

16. The device according to claim 13, wherein the flexurally elastic element is a leaf spring or a leaf spring arrangement.

17. The device according to claim 9, comprising a means for adjusting the probe extension together with the fiber receptacle, relative to the laterally measuring optical sensor, the means for adjusting comprising a manually driven or motorized translational or rotational adjusting mechanism.

18. The device according to claim 17, wherein the means for adjusting comprises a changeout interface for mounting the fiber receptacles.

19. The device according to claim 18, wherein a light source is fixedly connected to the fiber receptacle and the changeout interface for mounting the fiber receptacle comprises contacts for transmitting the signals for actuating the light source.

20. The device according to claim 17, wherein the means for adjusting comprises an additional changeout interface, for attaching to the laterally measuring optical sensor, or to a holder associated with the laterally measuring optical sensor.

21. The device according to claim 20, wherein the means for adjusting is attached in a plurality of rotated positions about the optical axis of the laterally measuring optical sensor.

22. The device according to claim 21, wherein the means for adjusting is attachable in four rotated positions at 90° each about the optical axis.

23. The device according to claim 9, wherein an angle of 0°, or an angle of $0°<\alpha<15°$, is present between a region of the probe extension comprising the contact shape element and the optical axis of the laterally measuring optical sensor.

24. The device according to claim 9, wherein the probe extension runs in a modified direction between the target mark and the contact shape element or comprises a branching to a plurality of contact shape elements.

25. The device according to claim 24, wherein the torsional rigidity of the probe extension about the axis running along the optical axis of the image processing sensor is selected, by selecting the diameter and length thereof in the regions above the target mark and between the target mark and the contact shape element, to be great enough that the deflection of the contact shape element in the direction running perpendicular to the optical axis, and perpendicular to the modified direction, is transferred at least 50% to the target mark.

26. The device according to claim 9, wherein a telecentric optic having a fixed imaging scale, or a zoom optic having an adjustable working distance independent of the imaging scale, is used for at least one of the laterally measuring optical sensor, and the vertically measuring optical distance sensor, wherein the zoom optic comprises more than one zoom stage bringing about a telecentric image.

27. The device according to claim 9, wherein the laterally measuring sensor and the vertically measuring distance sensor at least partially have a common beam path in the region of the optic facing the workpiece, wherein the distance sensor is a distance sensor using the Foucault principle, or a focus sensor, or a chromatic confocal sensor.

28. The device according to claim 9, wherein the vertically measuring optical distance sensor is a sensor using the Foucault principle, wherein the lighting source illuminates only a limited part of the aperture of the optic used for imaging on the workpiece, and wherein a linear or planar detection unit is used for determining the location of the lighting reflected by the workpiece.

29. The device according to claim 9, wherein the tactile/optical sensor is integrated in a coordinate measuring machine, together with other sensors, such that the laterally measuring optical sensor and the vertically measuring optical distance sensor can be operated independently of the tactile/optical sensor.

30. The device according to claim 9, wherein the laterally measuring optical sensor is an image processing sensor.

31. The device according to claim 9, wherein a vertical deflection of the contact shape element, or of the target mark if present, along the optical axis of the laterally measuring optical sensor can be captured by the distance sensor.

32. A method for determining geometric features and structures on a workpiece using a probe of a tactile/optical sensor comprising a probe extension flexurally elastic at least in segments, and having a mounting segment for inserting into a receptacle, the mounting segment being a segment of the probe extension, or a segment of the mounting element receiving the probe extension, wherein the mounting segment is configured as a rotational lock.

33. The method according to claim 32, wherein the mounting segment has an external geometry deviating at least in segments from a circular geometry in the region thereof running in the receptacle in a plane running perpendicular to the longitudinal axis of the mounting segment, to which geometry, the internal geometry of the receptacle is adapted.

34. The method according to claim 32, wherein the external geometry deviating from the circular geometry is formed by a member selected from the group consisting of a flat area of the mounting segment, a protrusion protruding out of the mounting segment, a cutout running in the mounting segment, a recess running in the longitudinal direction of the segment, and a polygonal design of the mounting segment.

35. A method for determining geometric features and structures on a workpiece by means of a tactile/optical sensor comprising a laterally measuring optical sensor, and a partially flexurally elastic probe extension,
wherein at least the following extend from the probe extension:
a contact shape element that deflects when contacting the workpiece, and optionally,
a target mark associated with the contact shape element that deflects when the contact shape element contacts the workpiece,
wherein a lateral deflection of the contact shape element, or of the target mark if present, perpendicular to the optical axis of the laterally measuring optical sensor, is being captured by the laterally measuring optical sensor, and
wherein a probe extension extends from a fiber receptacle to which a flexurally elastic part is directly or indirectly connected, to which part the contact shape element is directly or indirectly connected.

36. The method according to claim 35, wherein a probe extension is changed manually or automatically by means of which measurement points on the workpiece can each be determined in single-point mode, wherein the following steps are carried out:
the contact shape element and workpiece are displaced toward each other relative to each other until a predefined deflection of the contact shape element or the target mark has been achieved;
the contact shape element and workpiece are displaced away from each other relative to each other at least until the contact shape element or the target mark is no longer deflected;
the deflection of at least one of the contact shape element and the target mark is determined during at least one of the displacement toward each other, during the displacement away from each other, and between the two displacements,
one measurement point each is calculated from the one or more determined deflections and the location of the tactile/optical sensor relative to the workpiece in each case, using the positions of the measurement axes of a coordinate measuring machine.

37. The method according to claim 35, wherein a probe extension is changed manually or automatically by means of which a plurality of measurement points, offset from each other, on the workpiece can each be determined in scanning mode, wherein the following steps are carried out:
the contact shape element and workpiece are displaced toward each other relative to each other until a predefined deflection of the contact shape element or the target mark has been achieved;
the contact shape element and workpiece are displaced relative to each other along a path, wherein the contact shape element and the workpiece remain in contact, and wherein the deflection of at least one of the contact shape element and the target mark is determined cyclically during the displacement;
the contact shape element and workpiece are displaced relative to each other away from each other at least until the contact shape element or the target mark is no longer deflected;
the plurality of measurement points are calculated from the plurality of determined deflections and the location of the tactile/optical sensor relative to the workpiece in each case, using the positions of the measurement axes of a coordinate measuring machine.

38. The method according to claim 35, wherein a vertical deflection of the contact shape element, or of the target mark if present, along the optical axis of the optical sensor can be captured by the distance sensor.

* * * * *